(12) United States Patent
Kang et al.

(10) Patent No.: US 10,609,284 B2
(45) Date of Patent: Mar. 31, 2020

(54) CONTROLLING GENERATION OF HYPERLAPSE FROM WIDE-ANGLED, PANORAMIC VIDEOS

(71) Applicant: Microsoft Technology Licensing, LLC, Redmond, WA (US)

(72) Inventors: Sing Bing Kang, Redmond, WA (US); Neel Suresh Joshi, Seattle, WA (US); Christopher J. Buehler, Redmond, WA (US); Wei-Sheng Lai, Merced, CA (US); Yujia Huang, Pittsburgh, PA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 295 days.

(21) Appl. No.: 15/480,240

(22) Filed: Apr. 5, 2017

(65) Prior Publication Data
US 2018/0115706 A1     Apr. 26, 2018

Related U.S. Application Data

(60) Provisional application No. 62/411,584, filed on Oct. 22, 2016.

(51) Int. Cl.
*H04N 5/232* (2006.01)
*G06T 5/00* (2006.01)
*G06T 7/20* (2017.01)

(52) U.S. Cl.
CPC .......... *H04N 5/23238* (2013.01); *G06T 5/00* (2013.01); *G06T 7/20* (2013.01); *H04N 5/23206* (2013.01); *H04N 5/23216* (2013.01); *H04N 5/23293* (2013.01)

(58) Field of Classification Search
CPC ........ H04N 5/23238; H04N 5/77; G06T 5/00; G06T 7/579
See application file for complete search history.

(56) References Cited

U.S. PATENT DOCUMENTS

| | | | | |
|---|---|---|---|---|
| 6,128,037 A | * | 10/2000 | Anderson | ............ H04N 1/0044 348/231.4 |
| 6,587,119 B1 | * | 7/2003 | Anderson | .......... H04N 5/23293 345/473 |
| 8,194,993 B1 | * | 6/2012 | Chen | ...................... G06T 5/006 348/231.6 |

(Continued)

OTHER PUBLICATIONS

The Technology behind Hyperlapse from Instagram; Instagram Co; Aug. 2014 (Year: 2014).*

(Continued)

*Primary Examiner* — Luis Perez-Fuentes
(74) *Attorney, Agent, or Firm* — Rainier Patents, P.S.

(57) ABSTRACT

Hyperlapse results are generated from wide-angled, panoramic video. A set of wide-angled, panoramic video data is obtained. Video stabilization is performed on the obtained set of wide-angled, panoramic video data. Without user intervention, a smoothed camera path is automatically determined using at least one region of interest that is determined using saliency detection and semantically segmented frames of stabilized video data resulting from the video stabilization. A set of frames is determined to vary the velocity of wide-angled, panoramic rendered display of the hyperlapse results.

17 Claims, 73 Drawing Sheets

(56) References Cited

U.S. PATENT DOCUMENTS

| | | | | |
|---|---|---|---|---|
| 8,340,453 | B1* | 12/2012 | Chen | G06T 5/002 |
| | | | | 382/254 |
| 8,368,773 | B1* | 2/2013 | Jin | G06K 9/3275 |
| | | | | 348/222.1 |
| 9,170,707 | B1 | 10/2015 | Laska et al. | |
| 9,313,556 | B1 | 4/2016 | Borel et al. | |
| 9,672,626 | B2* | 6/2017 | Peleg | G11B 27/00 |
| 2010/0135566 | A1 | 6/2010 | Joanidopoulos et al. | |
| 2012/0300019 | A1* | 11/2012 | Yang | H04N 5/23232 |
| | | | | 348/36 |
| 2013/0121525 | A1* | 5/2013 | Chen | G06T 3/0062 |
| | | | | 382/100 |
| 2013/0124471 | A1* | 5/2013 | Chen | H04N 5/23238 |
| | | | | 707/624 |
| 2014/0105564 | A1 | 4/2014 | Johar | |
| 2015/0221341 | A1 | 8/2015 | Akay | |
| 2015/0248916 | A1 | 9/2015 | Kopf et al. | |
| 2016/0093335 | A1 | 3/2016 | Doepke | |
| 2016/0112727 | A1 | 4/2016 | Mate et al. | |
| 2016/0163022 | A1 | 6/2016 | Peleg et al. | |
| 2017/0270677 | A1* | 9/2017 | Peleg | G11B 27/00 |
| 2017/0324941 | A1* | 11/2017 | Birkler | H04N 5/23296 |
| 2018/0063440 | A1* | 3/2018 | Kopf | H04N 5/23267 |
| 2018/0115706 | A1* | 4/2018 | Kang | H04N 5/23238 |

OTHER PUBLICATIONS

First person hyper-lapse videos; Kopf; Microsoft; 2014. (Year: 2014).*
The technology behind Hyperlapse from Instagram; Aug. 2014. (Year: 2014).*
Take smooth time-lapse video with Microsoft hyperlapse; Aug. 2016. (Year: 2016).*
Ramos, et al., "Fast-Forward Video Based on Semantic Extraction", Proceedings of IEEE International Conference on Image Processing, Retrieved on: Aug. 25, 2016, pp. 3334-3338, 5 pages.
Wood, David, "Microsoft Creates New Video Smoothing App", Published on: Aug. 12, 2014 Available at: http://www.televisual.com/blog-detail/Microsoft-creates-new-video-smoothing-app_bid-649.html, 2 pages.
Karpenko, Alex, "The Technology behind Hyperlapse from Instagram", Published on: Aug. 27, 2014 Available at: http://instagram-engineering.tumblr.com/post/95922900787/hyperlapse, 8 pages.
Thomas, Dallas, "Take Smooth Time-Lapse Videos with Microsoft's Hyperlapse", Published on: May 19, 2015 Available at: http://android.wonderhowto.com/how-to/take-smooth-time-lapse-videos-with-microsofts-hyperlapse-0161980/, 10 pages.
Kasahara, et al., "First Person Omnidirectional Video: System Design and Implications for Immersive Experience", In Proceedings of the ACM International Conference on Interactive Experiences for TV and Online Video, Jun. 3, 2015, pp. 33-42, 10 pages.
Achanta, et al., "Slic superpixels compared to state-of- the-art superpixel methods", In Journal of IEEE Transactions on Pattern Analysis and Machine Intelligence, vol. 34, Issue 11, Nov. 2012, pp. 2274-2281, 8 pages.
Agarwal et al., "Ceres Solver", Retrieved on: Sep. 7, 2016, Available at: http://ceres-solver.org/, 1 page.
Badrinarayanan, et al., "Segnet: A Deep Convolutional Encoder-Decoder Architecture for Image Segmentation", Journal of Computing Research Repository, May 2015, pp. 1-14, 14 pages.
Deselaers, et al., "Pan, Zoom, Scan—Time-coherent, Trained Automatic Video Cropping", Proceedings of IEEE Computer Society Conference on Computer Vision and Pattern Recognition, Jun. 24, 2008, 8 pages.
Goldstein, et al., "Video Stabilization Using Epipolar Geometry", Journal of ACM Transactions on Graphics, vol. 31, Issue 5, Aug. 2012, 10 pages.
Grundmann, et al., "Auto-directed Video Stabilization with Robust L1 Optimal Camera Paths", Proceedings of the IEEE Conference on Computer Vision and Pattern Recognition, Jun. 20, 2011, pp. 225-232, 8 pages.
Itti, et al., "A Model of Saliency Based Visual Attention for Rapid Scene Analysis", Journal of IEEE Transactions on Pattern Analysis and Machine Intelligence, vol. 20, No. 11, Nov. 1, 1998, pp. 1254-1259, 6 pages.
Joshi, et al., "Real-time Hyperlapse Creation Via Optimal Frame Selection", Journal of Journal of ACM Transactions on Graphics, vol. 34, Issue 4, Aug. 2015, 9 pages.
Joubert, et al., "An Interactive Tool for Designing Quadrotor Camera Shots", Journal of ACM Transactions on Graphics, vol. 34, Issue 6, Nov. 2015, 11 pages.
Karpenko, et al., "Digital Video Stabilization and Rolling Shutter Correction using Gyroscopes", Stanford Tech Report CTSR Mar. 2011, Mar. 2011, pp. 1-7, 7 pages.
Karpenko, Alex, "The Technology behind Hyperlapse from Instagram", Retrieved on: Sep. 7, 2016, Available at: http://instagram-engineering.tumblr.com/post/95922900787/hyperlapse, 8 pages.
Kopf, et al., "First-person Hyper-lapse Videos", Journal of ACM Transactions on Graphics, vol. 33, Issue 4, Jul. 2014, 10 pages.
Krahenbuhl, et al., "A System for Retargeting of Streaming Video", Journal of ACM Transactions on Graphics—Proceedings of ACM SIGGRAPH Asia, vol. 28, Issue 5, Dec. 2009, 10 pages.
Krizhevsky, et al., "Imagenet Classification with Deep Convolutional Neural Networks", Proceedings of 26th Annual Conference on Neural Information Processing Systems, Dec. 3, 2012, pp. 1097-1105, 9 pages.
Liu, et al., "Multiclass Semantic Video Segmentation with Object-level Active Inference", Proceedings of the IEEE Conference on Computer Vision and Pattern Recognition, Jun. 7, 2015, pp. 4286-4294, 9 pages.
Liu, et al., "Content-preserving Warps for 3d Video Stabilization", Journal of ACM Transactions on Graphics—Proceedings of ACM SIGGRAPH, vol. 28, Issue 3, Aug. 2009, 10 pages.
Liu, et al., "Subspace Video Stabilization", Journal of ACM Transactions on Graphics, vol. 30, Issue 1, Jan. 2011, 10 pages.
Liu, et al., "Bundled Camera Paths for Video Stabilization", Journal of ACM Transactions on Graphics—SIGGRAPH Conference Proceedings, vol. 32, Issue 4, Jul. 2013, 10 pages.
Long, et al., "Fully Convolutional Networks for Semantic Segmentation", Proceedings of IEEE Conference on Computer Vision and Pattern Recognition, Jun. 7, 2015, pp. 3431-3440, 10 pages.
Matsushita, et al., "Full-Frame Video Stabilization with Motion Inpainting", Journal of IEEE Transactions on Pattern Analysis and Machine Intelligence, vol. 28, No. 7, Jul. 2006, pp. 1150-1163, 14 pages.
Noh, et al., "Learning Deconvolution Network for Semantic Segmentation", Proceedings of IEEE International Conference on Computer Vision, Dec. 7, 2015, pp. 1520-1528, 9 pages.
Poleg, et al., "Egosampling: Fast-forward and Stereo for Egocentric Videos", Proceedings of IEEE Conference on Computer Vision and Pattern Recognition, Jun. 7, 2015, pp. 4768-4776, 9 pages.
Rubinstein, et al., "Improved Seam Carving for Video Retargeting", Journal of ACM Transactions on Graphics—Proceedings of ACM SIGGRAPH, vol. 27, Issue 3, Aug. 2008, 10 pages.
Shi, et al., "Good Features to Track", Proceedings of IEEE Computer Society Conference on Computer Vision and Pattern Recognition, Jun. 21, 1994, pp. 593-600, 8 pages.
Simonyan, et al., "Very Deep Convolutional Networks for Large-scale Image Recognition", Journal of the Computing Research Repository, Sep. 2014, pp. 1-14, 14 pages.
Snavely, et al., "Photo Tourism: Exploring Photo Collections in 3d", Proceedings of ACM Transactions on Graphics, vol. 25, Issue 3, Jul. 30, 2006, pp. 835-846, 12 pages.
Snavely, et al., "Finding Paths Through the World's Photos", Proceedings of ACM Transactions on Graphics, vol. 27, Issue 3, Aug. 2008, 12 pages.
Szegedy, et al., "Going Deeper with Convolutions", Proceedings of the IEEE Conference on Computer Vision and Pattern Recognition, Jun. 7, 2015, pp. 1-9, 9 pages.
Tu, et al., "Realtime Salient Object Detection with a Minimum Spanning Tree", Published on: Jun. 26, 2016, Available at: http://www.shengfenghe.com/uploads/1/5/1/3/15132160/cvpr16_mstsaliency.pdf, 9 pages.

(56) References Cited

OTHER PUBLICATIONS

Wang, et al., "Motion-aware Temporal Coherence for Video Resizing", Proceedings of ACM Transactions on Graphics, vol. 28, Issue 5, Dec. 2009, 10 pages.

Wang, et al., "Motion-based Video Retargeting with Optimized Crop-and-warp", Proceedings of ACM Transactions on Graphics, vol. 29, Issue 4, Jul. 2010, 9 pages.

Wang, et al., "Scalable and Coherent Video Resizing with Per-frame Optimization", Proceedings of ACM Transactions on Graphics, vol. 30, Issue 4, Jul. 2011, 7 pages.

Zhang, et al., "Panocontext: A Whole-room 3d Context Model for Panoramic Scene Understanding", Proceedings of 13th European Conference on Computer Vision, Sep. 6, 2014, pp. 668-686, 18 pages.

Zhang, et al., "Semantic Object Segmentation Via Detection in Weakly Labelled Video", Proceeding of IEEE Conference on Computer Vision and Pattern Recognition, Jun. 7, 2015, pp. 3641-3649, 9 pages.

Zhou, et al., "Time-mapping Using Space-time Saliency", Proceedings of the IEEE Conference on Computer Vision and Pattern Recognition, Jun. 24, 2014, pp. 3358-3365, 8 pages.

Lai et al., "Semantic-Driven Generation of Hyperlapse from 360 Degree Video," Mar. 2017, available at <<http://vllab1.ucmerced.edu/~wlai24/360hyperlapse>>, 12 pages.

\* cited by examiner

FIG. 1A1

FIG. 1A2

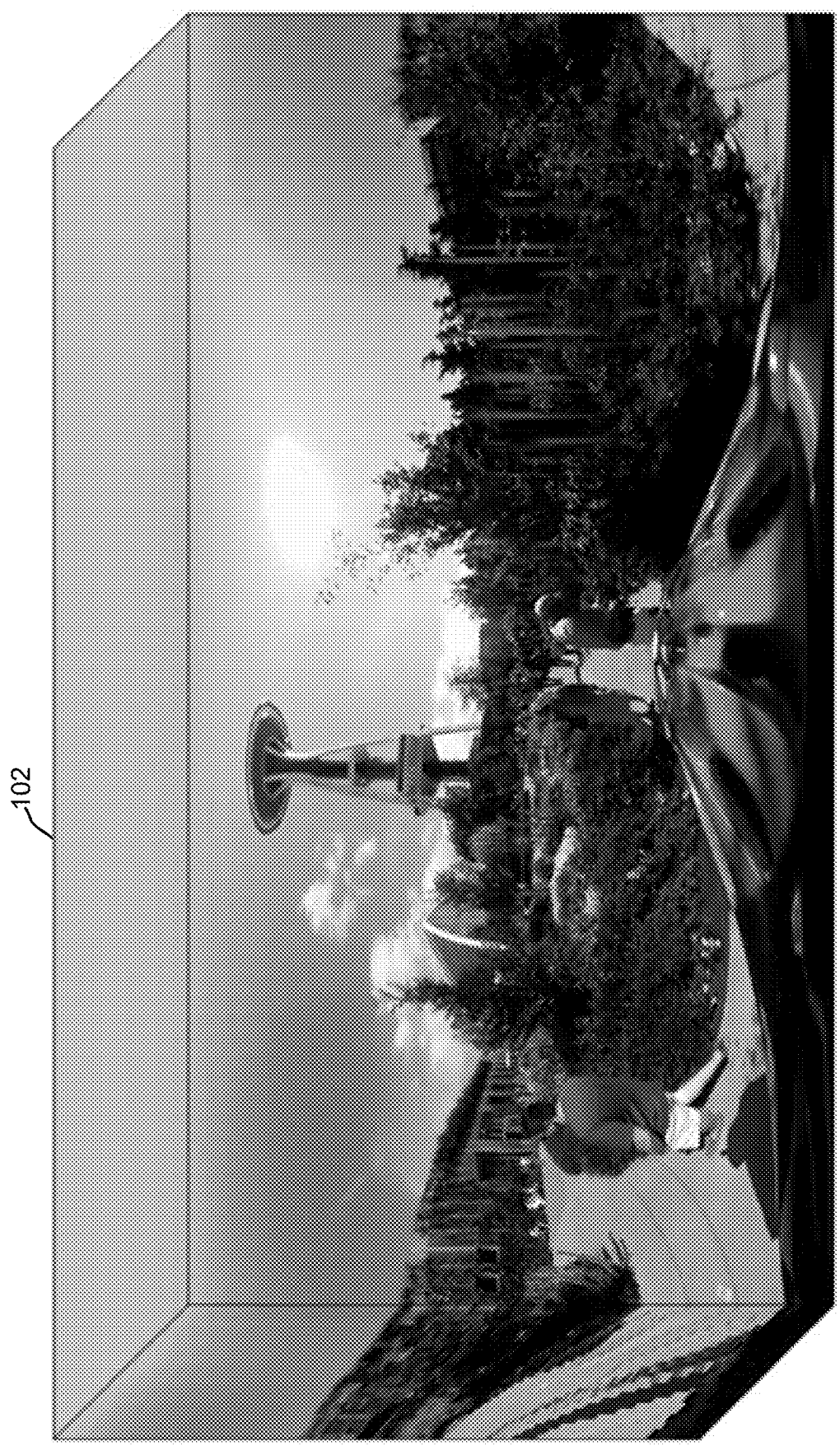
FIG. 1B1

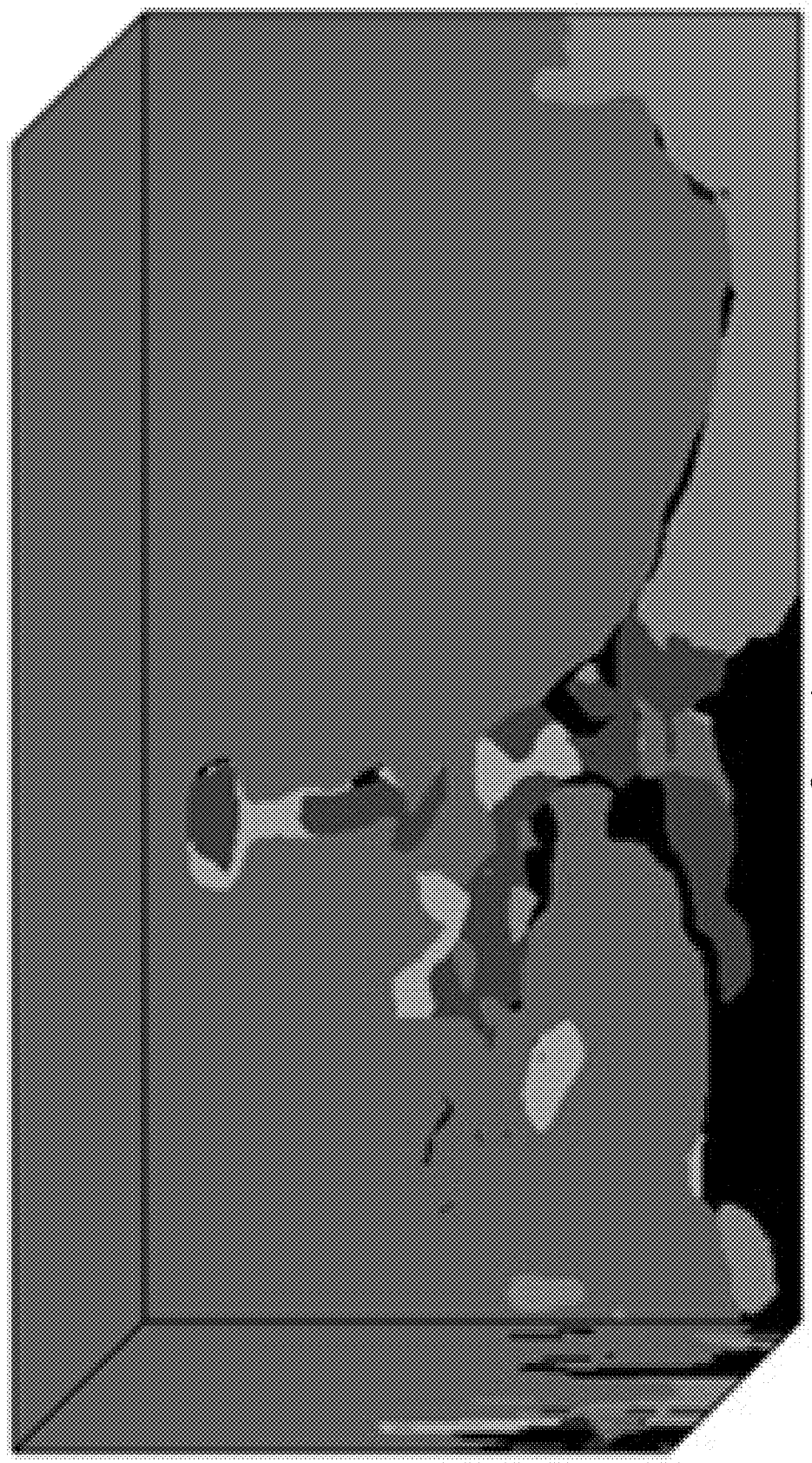
FIG. 1B2

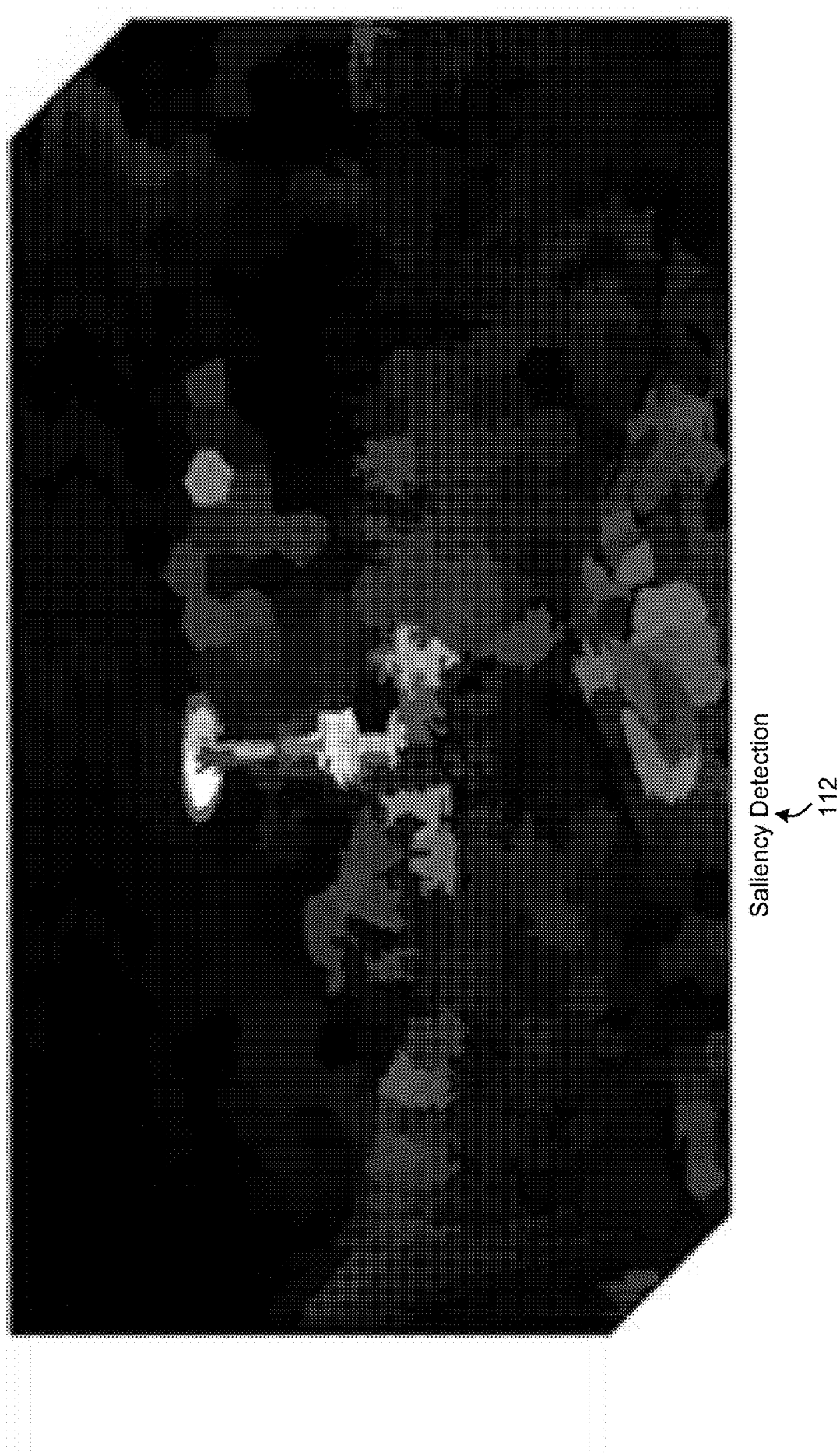
FIG. 1B3

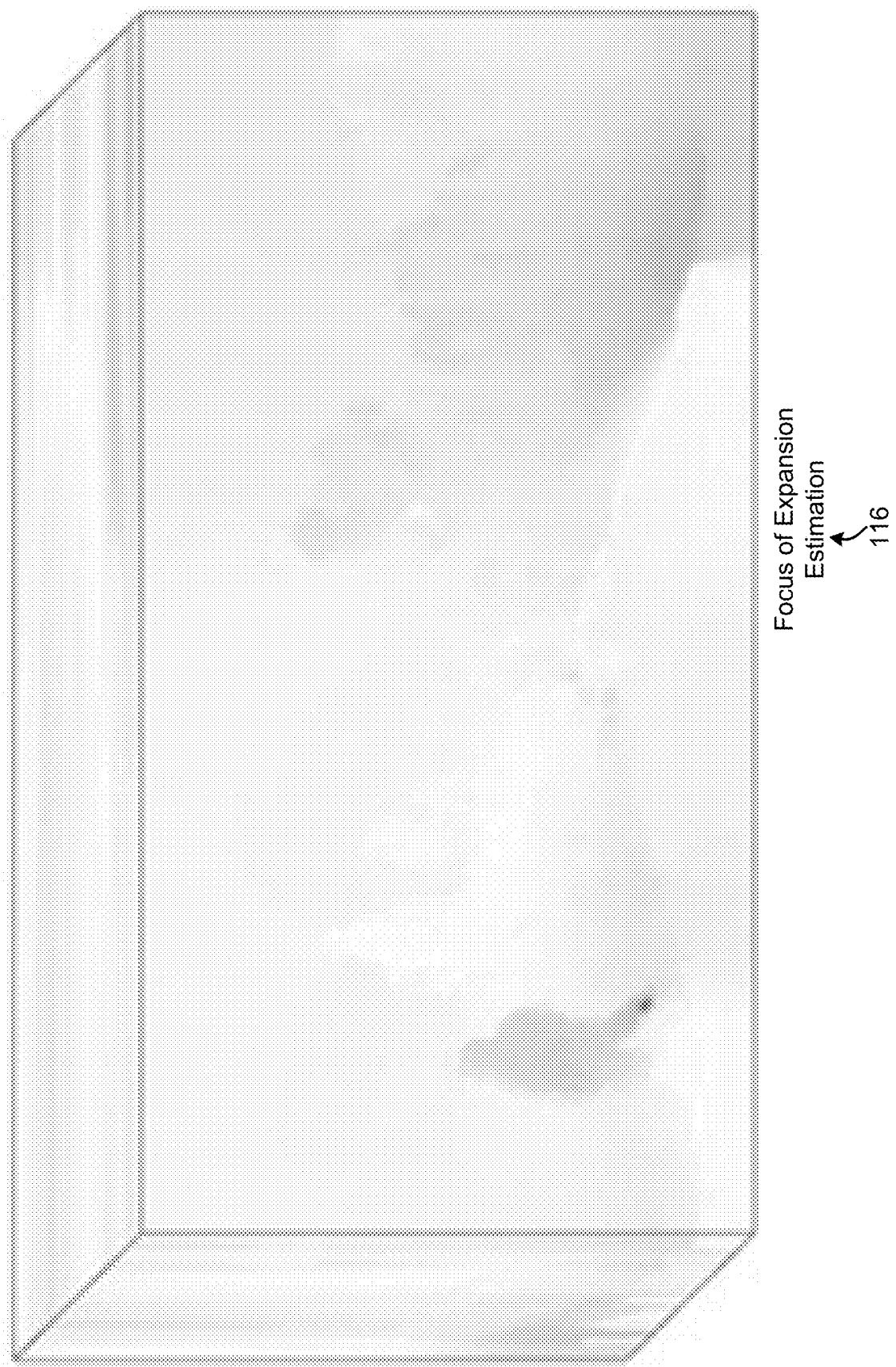
FIG. 1B4

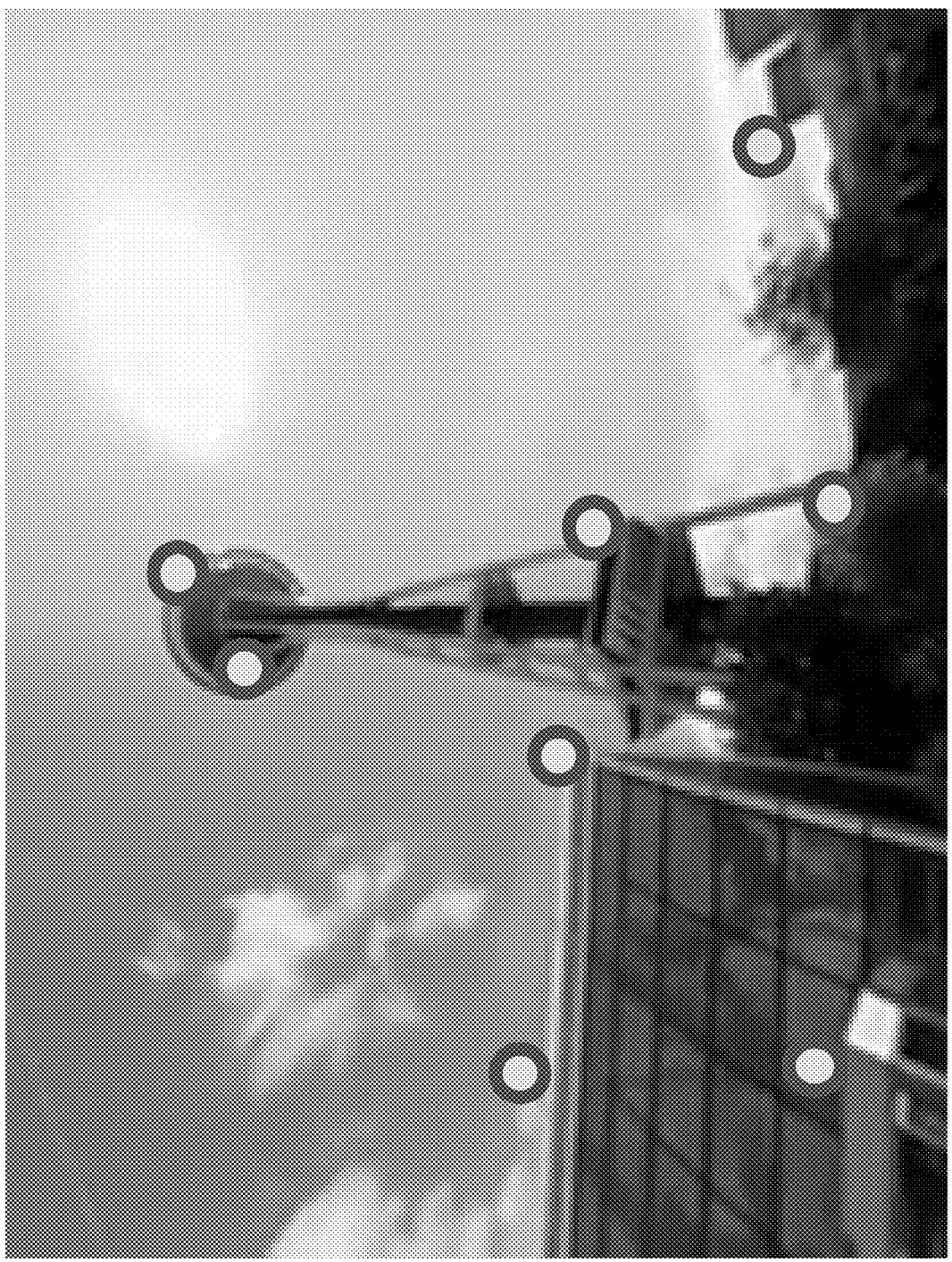
FIG. 1B5
Path smoothing
132

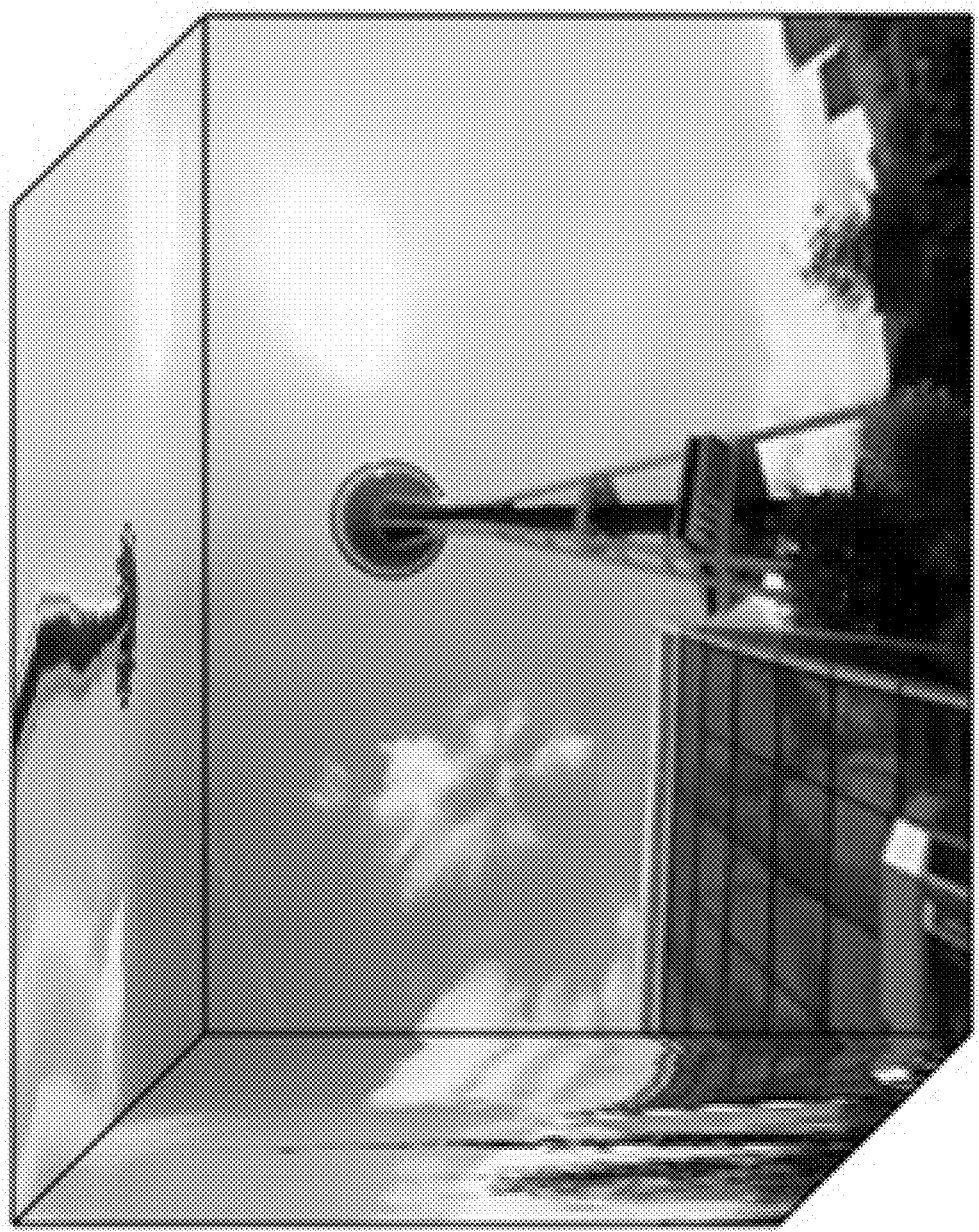
FIG. 1B6

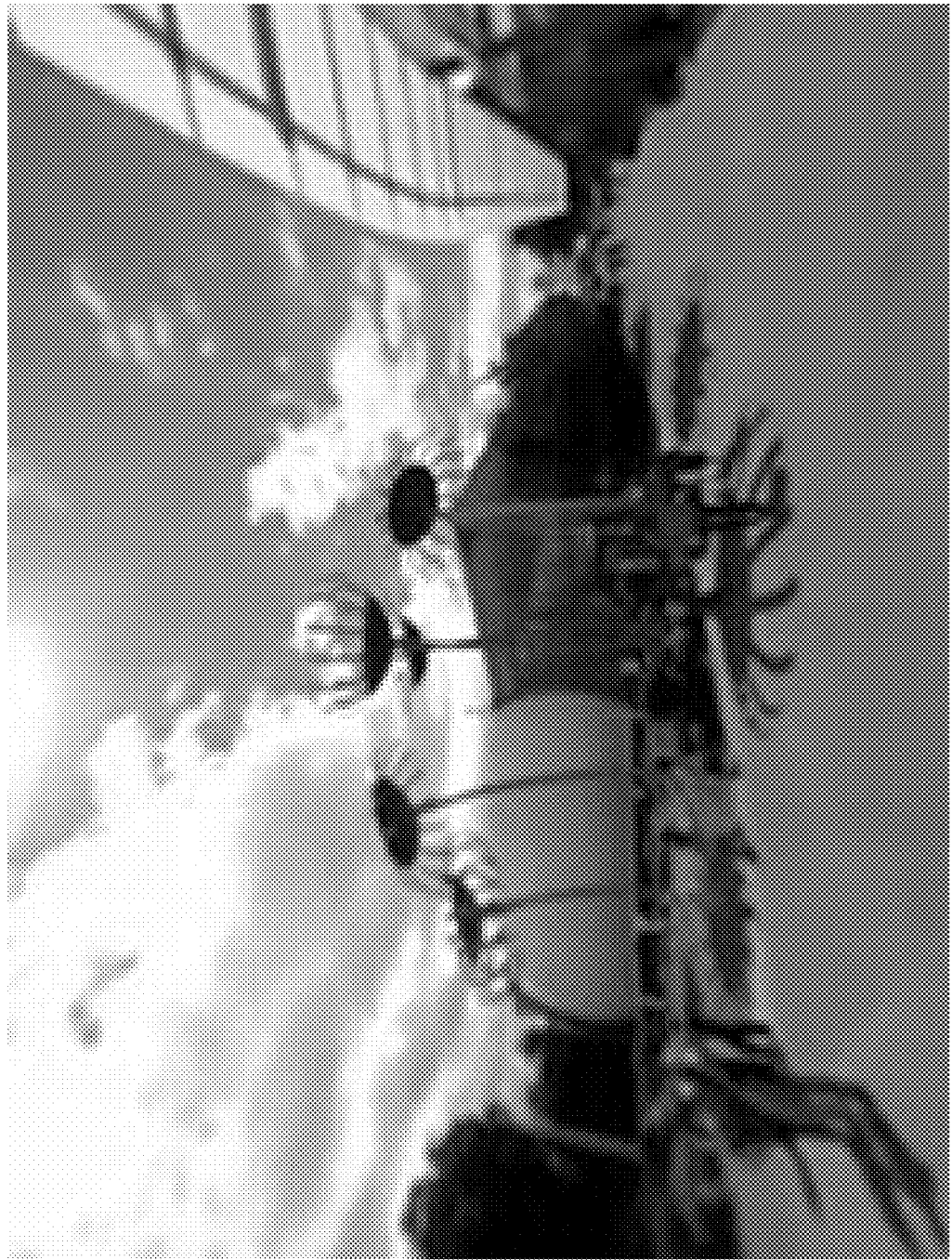
FIG. 6A1

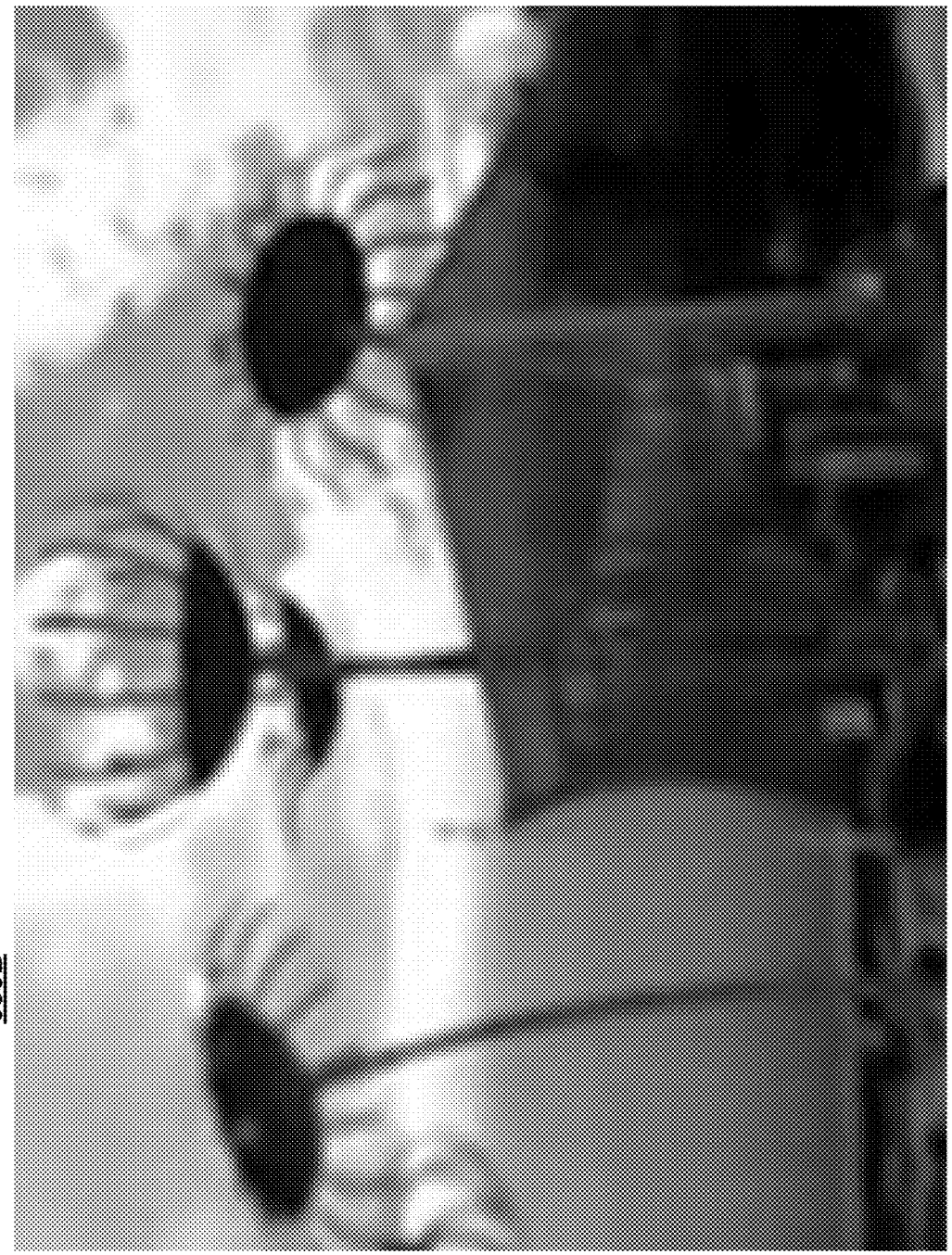
FIG. 6B1

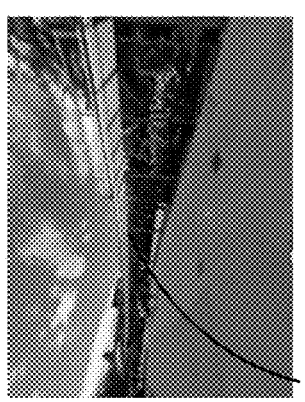
FIG. 7A
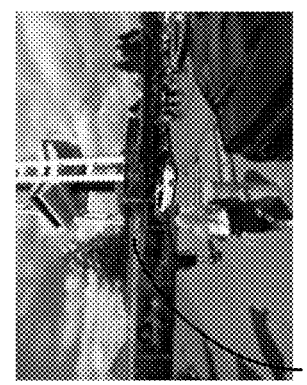
FIG. 7B
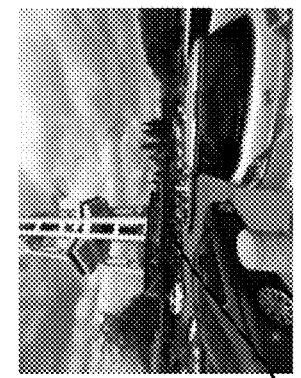
FIG. 7C
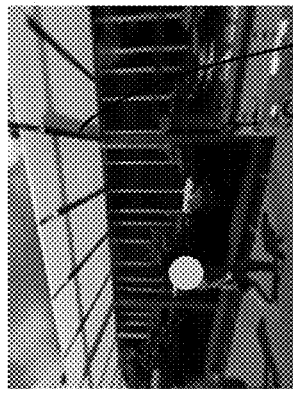
FIG. 7D
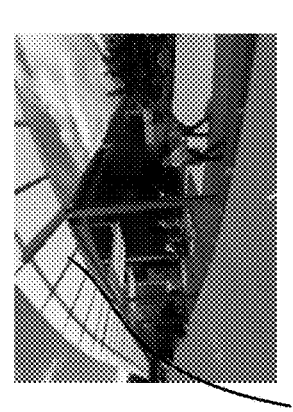
FIG. 7E
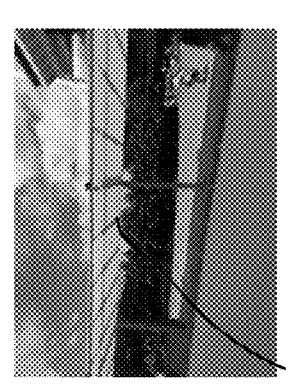
FIG. 7F
FIG. 7G
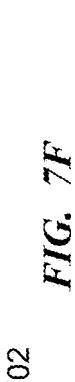
FIG. 7H
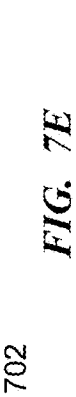
FIG. 7I
FIG. 7J

FIG. 7A1

FIG. 7B1

FIG. 7C1

FIG. 7D1

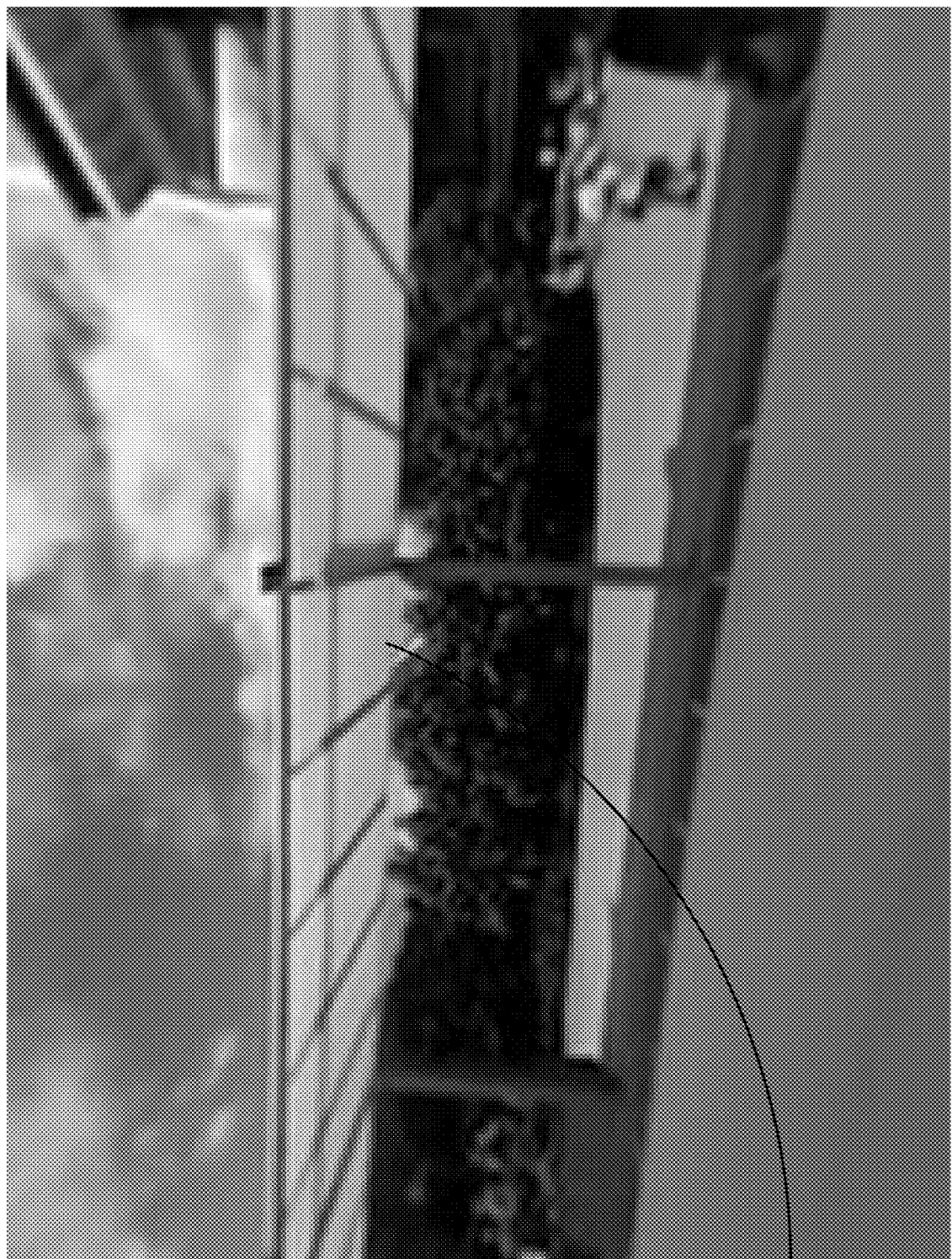
FIG. 7E1

FIG. 7F1

FIG. 7G1

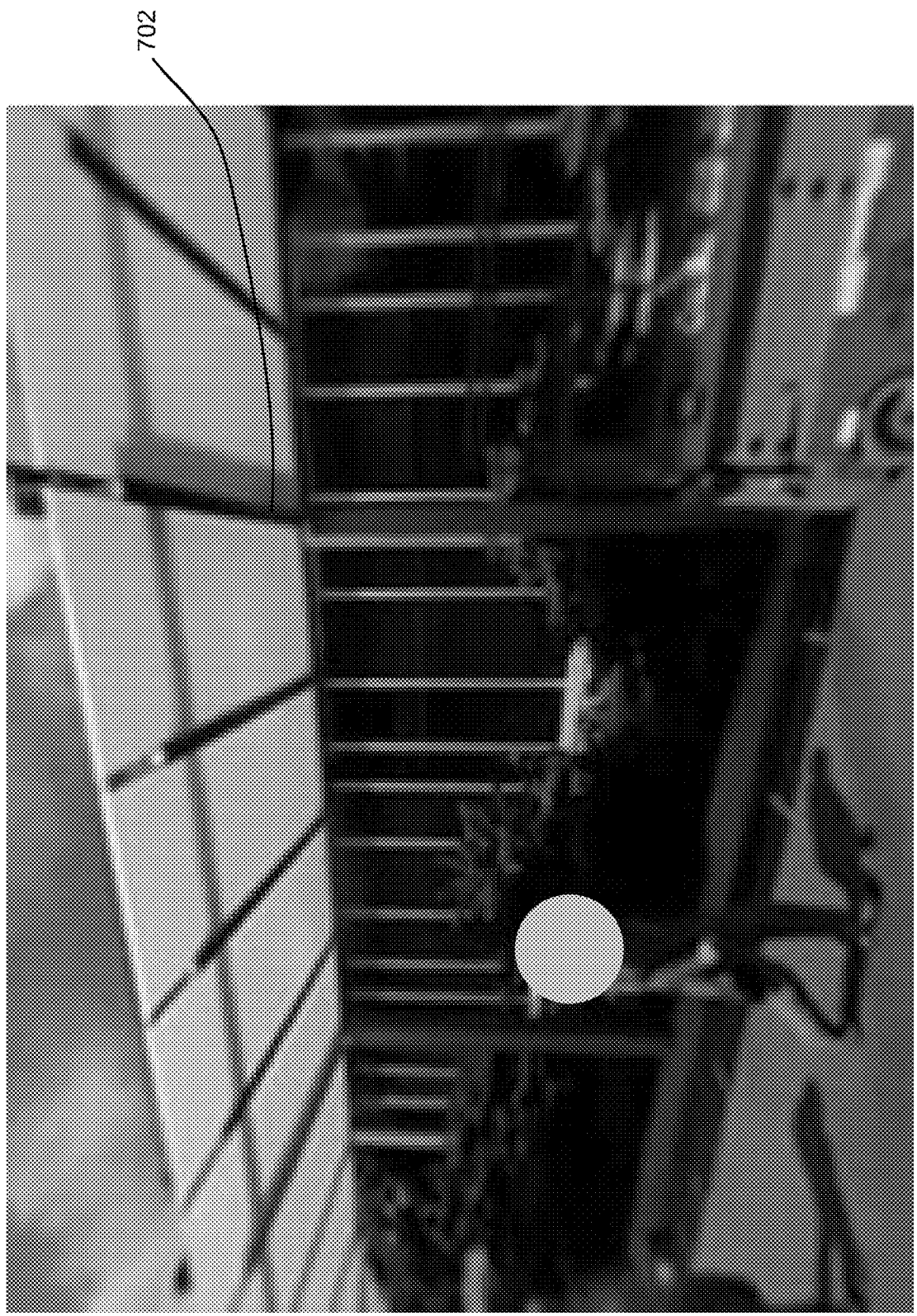
FIG. 7H1

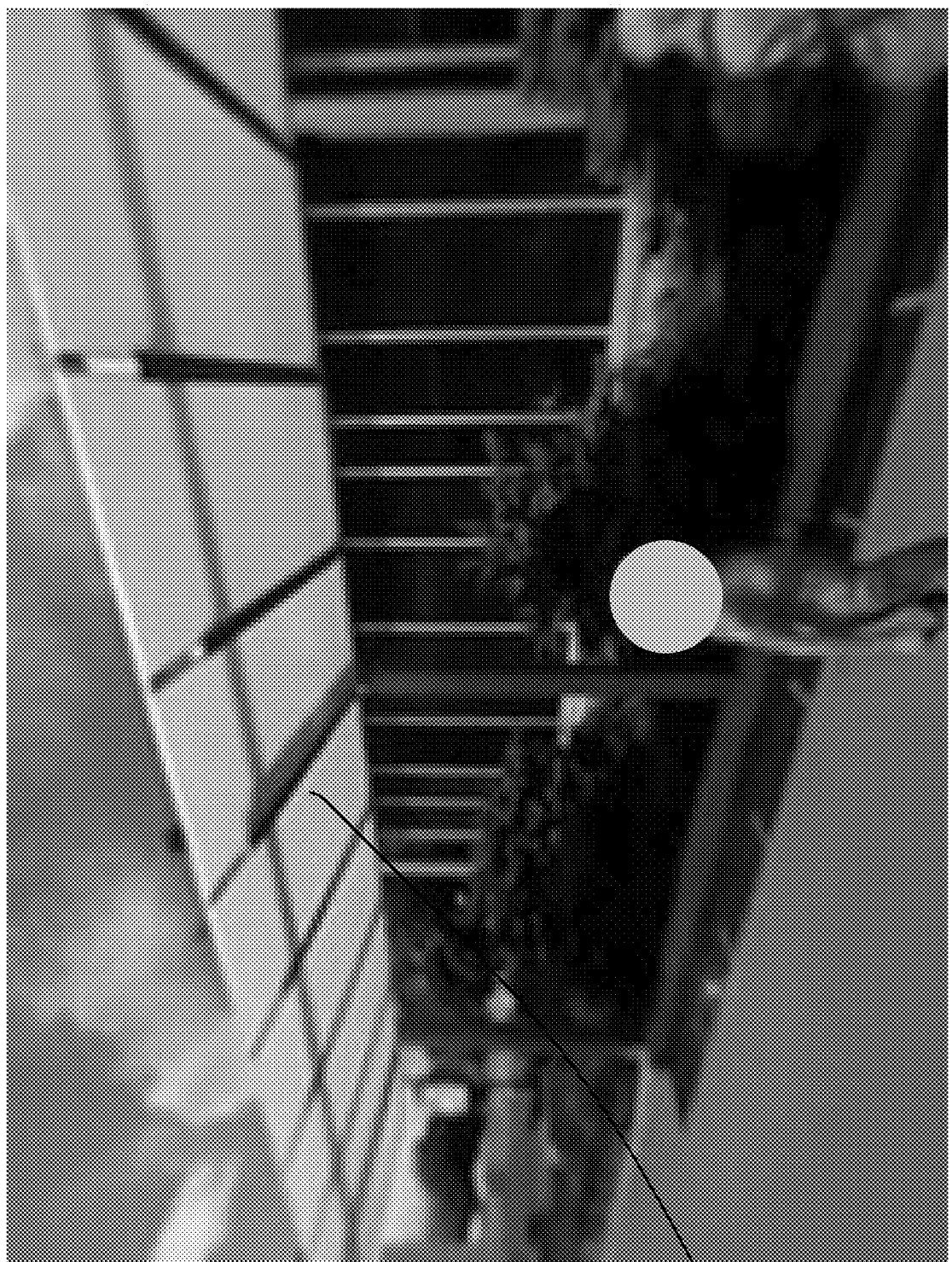
FIG. 7I1

FIG. 7J1

FIG. 8A1

FIG. 8B1

FIG. 8C1

FIG. 8D1

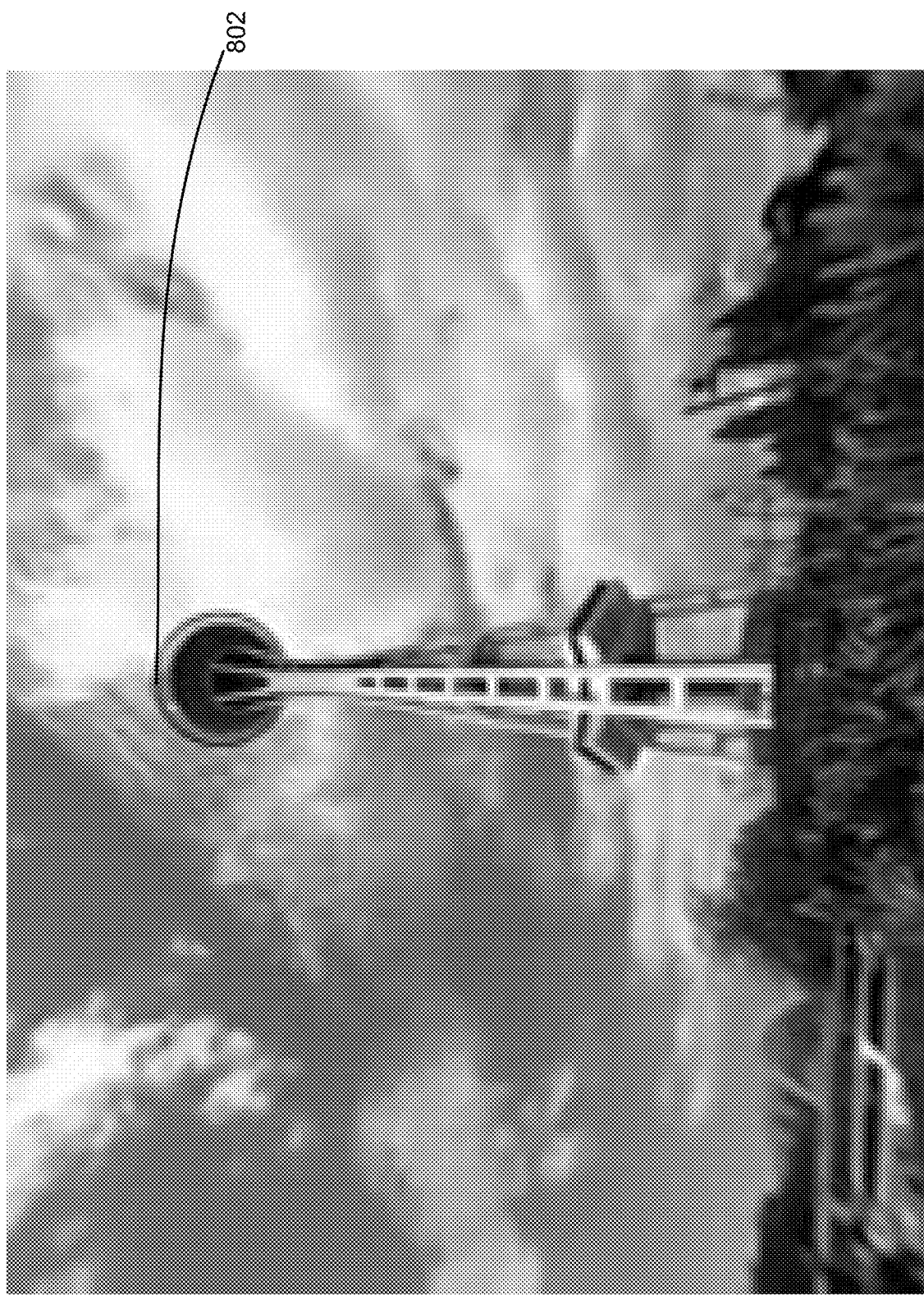
FIG. 8E1

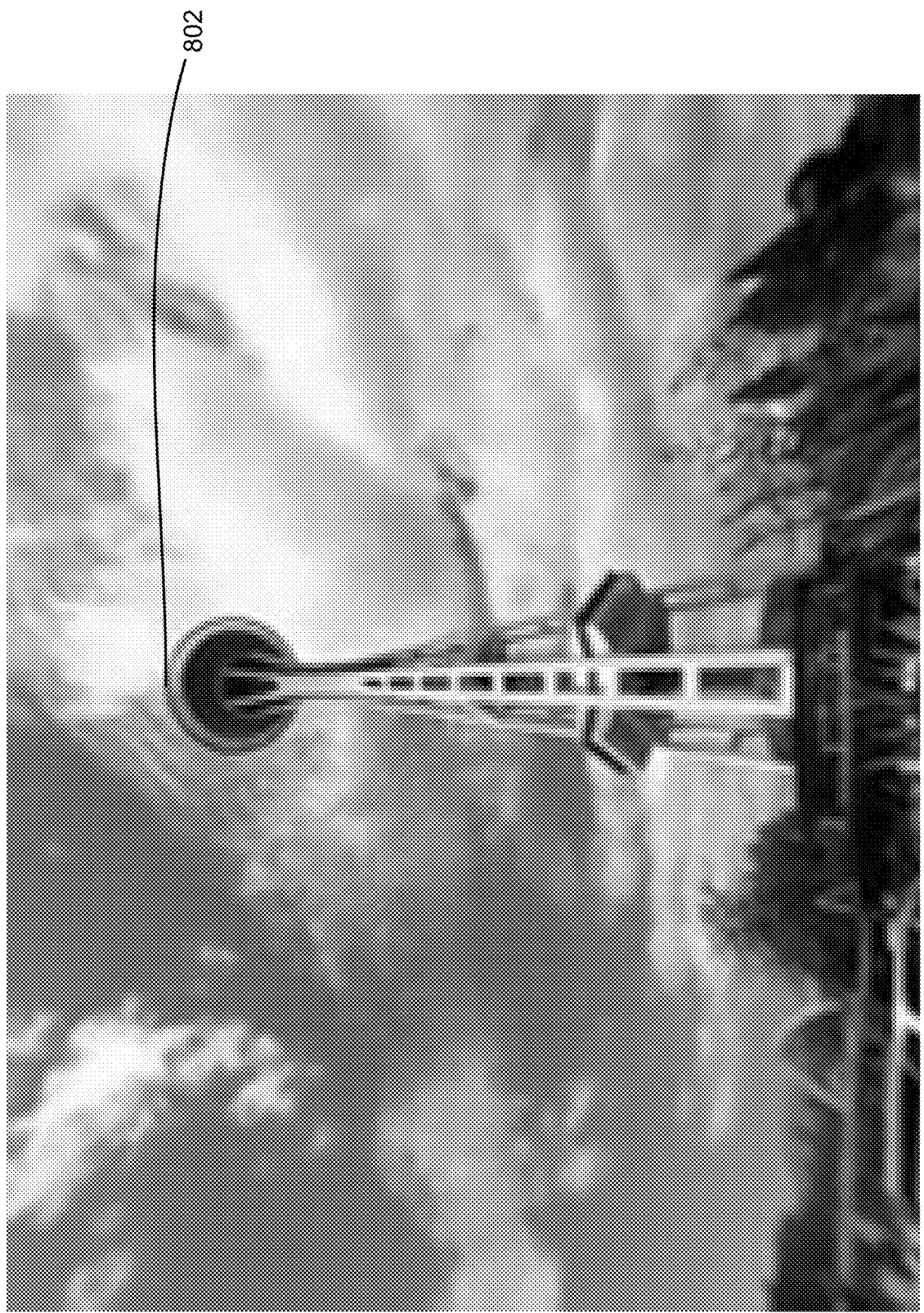
FIG. 8F1

FIG. 8G1

FIG. 8H1

FIG. 8I1

FIG. 8J1

FIG. 9A1

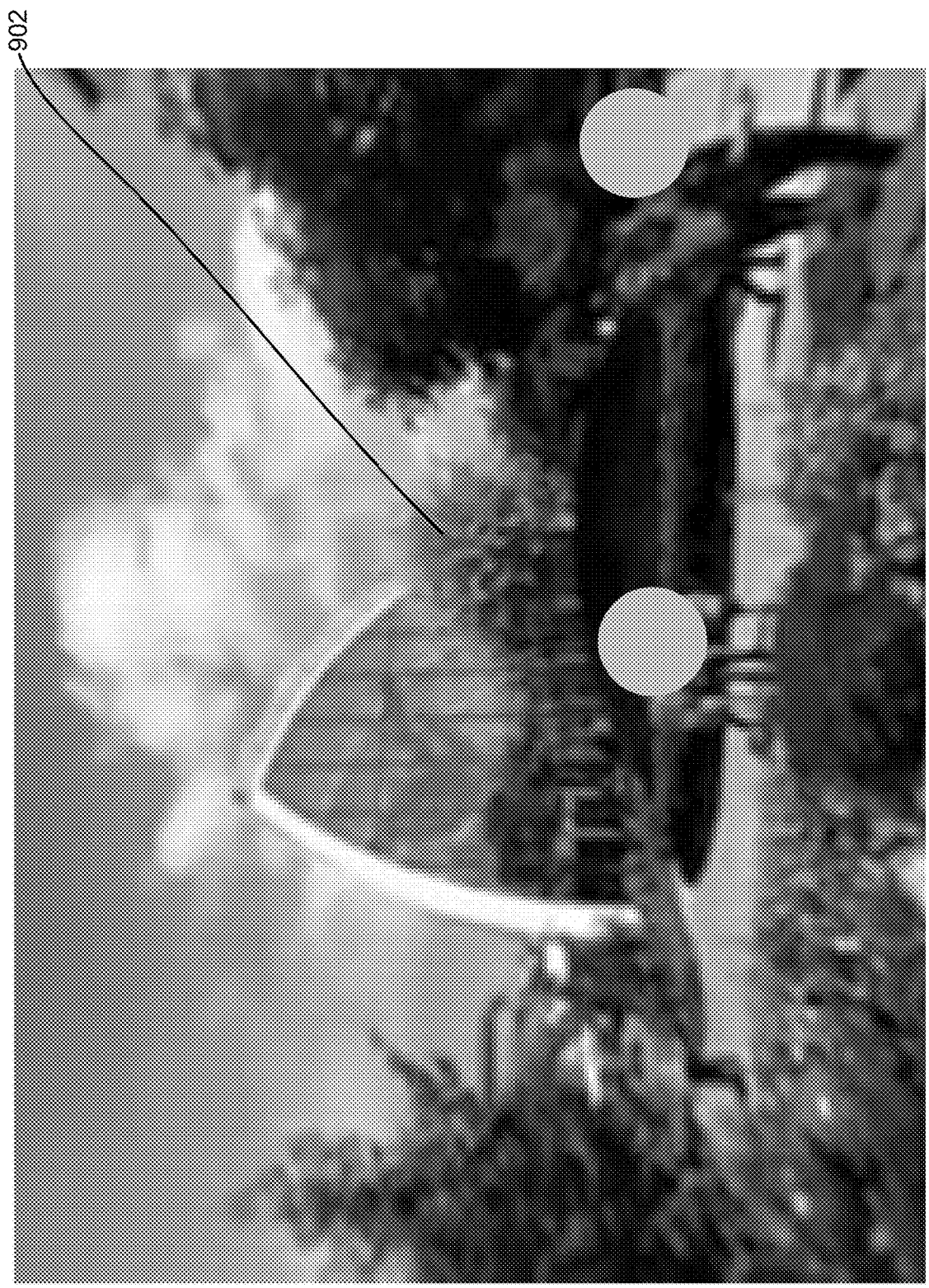
FIG. 9B1

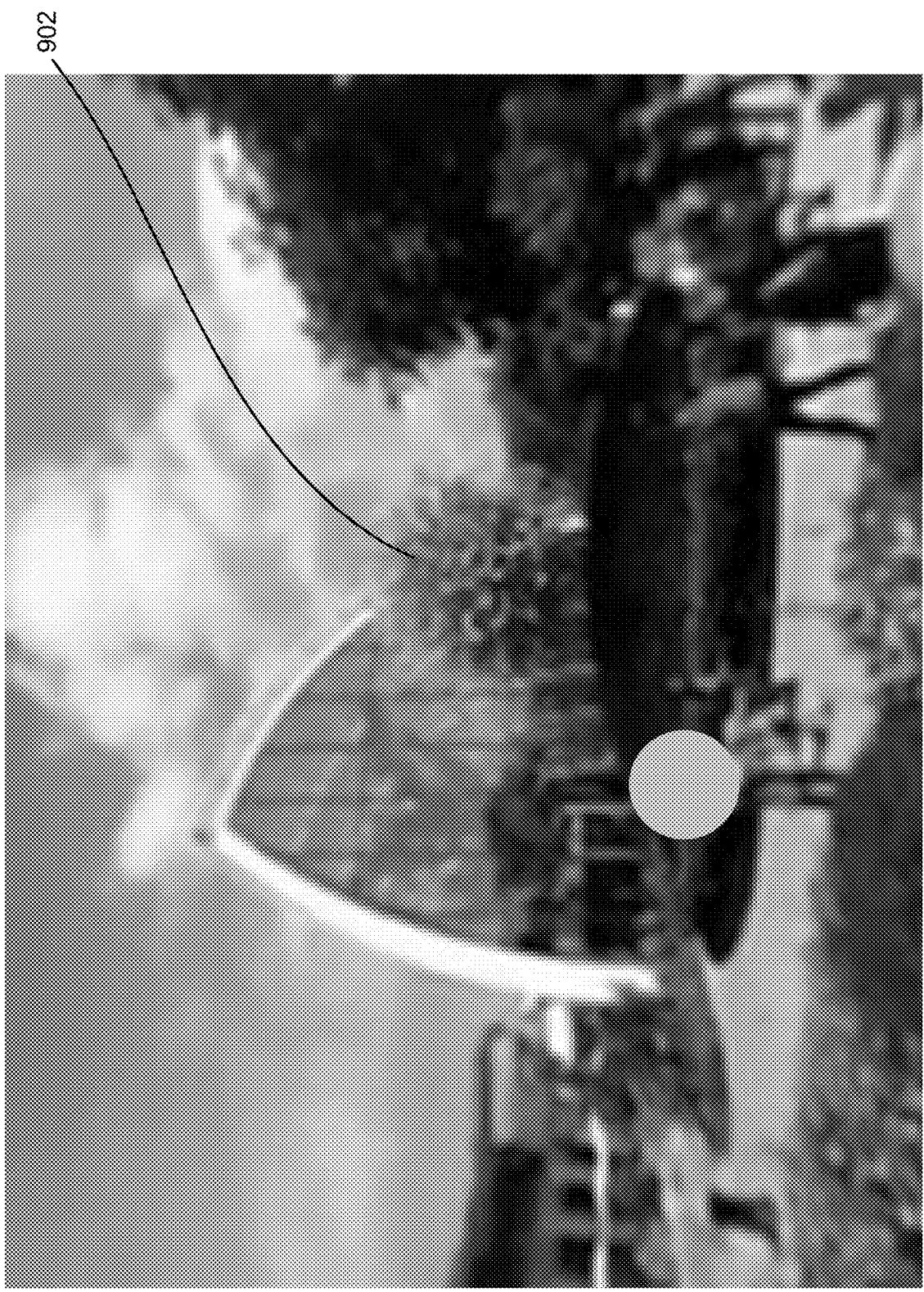
FIG. 9C1

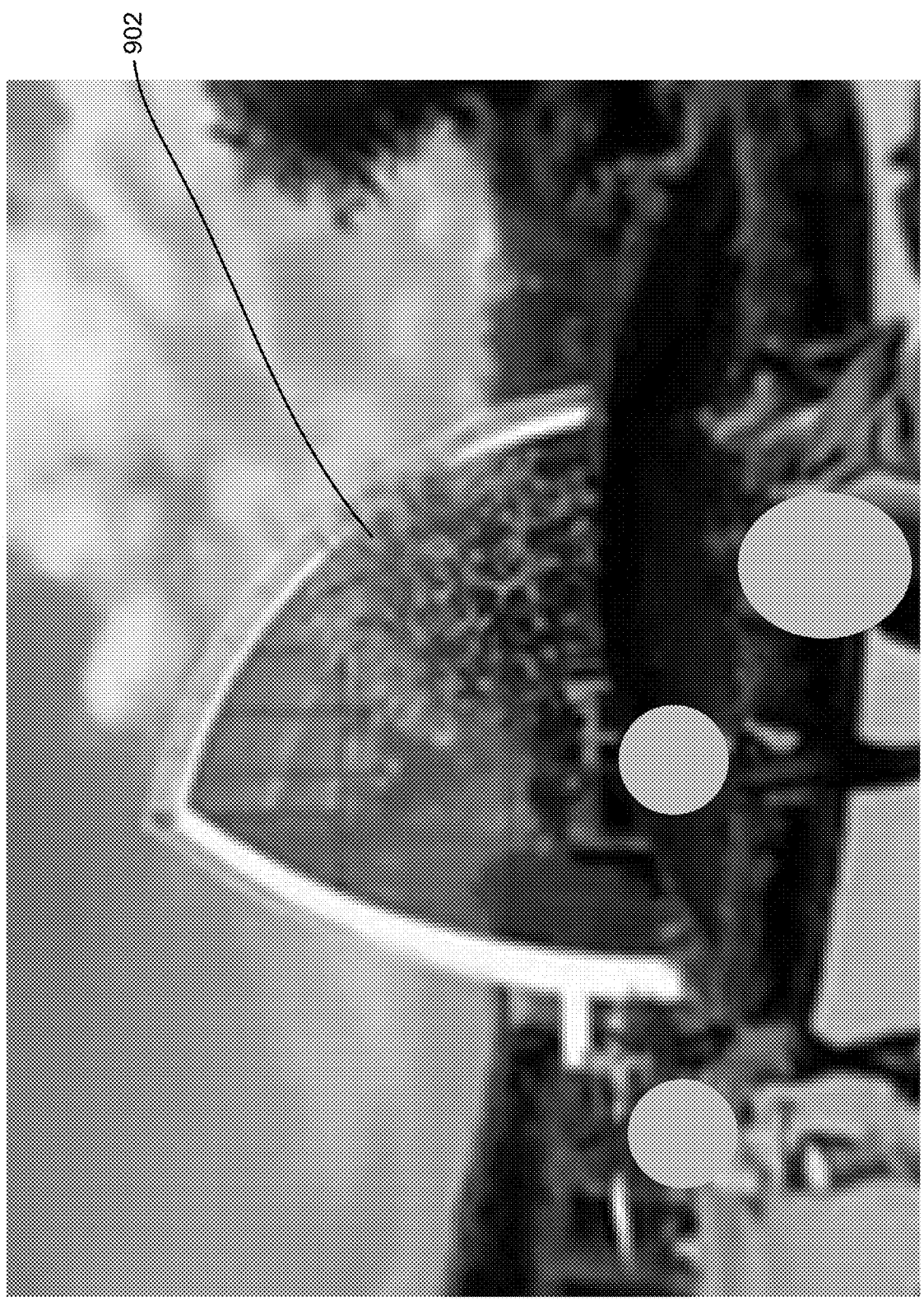
FIG. 9D1

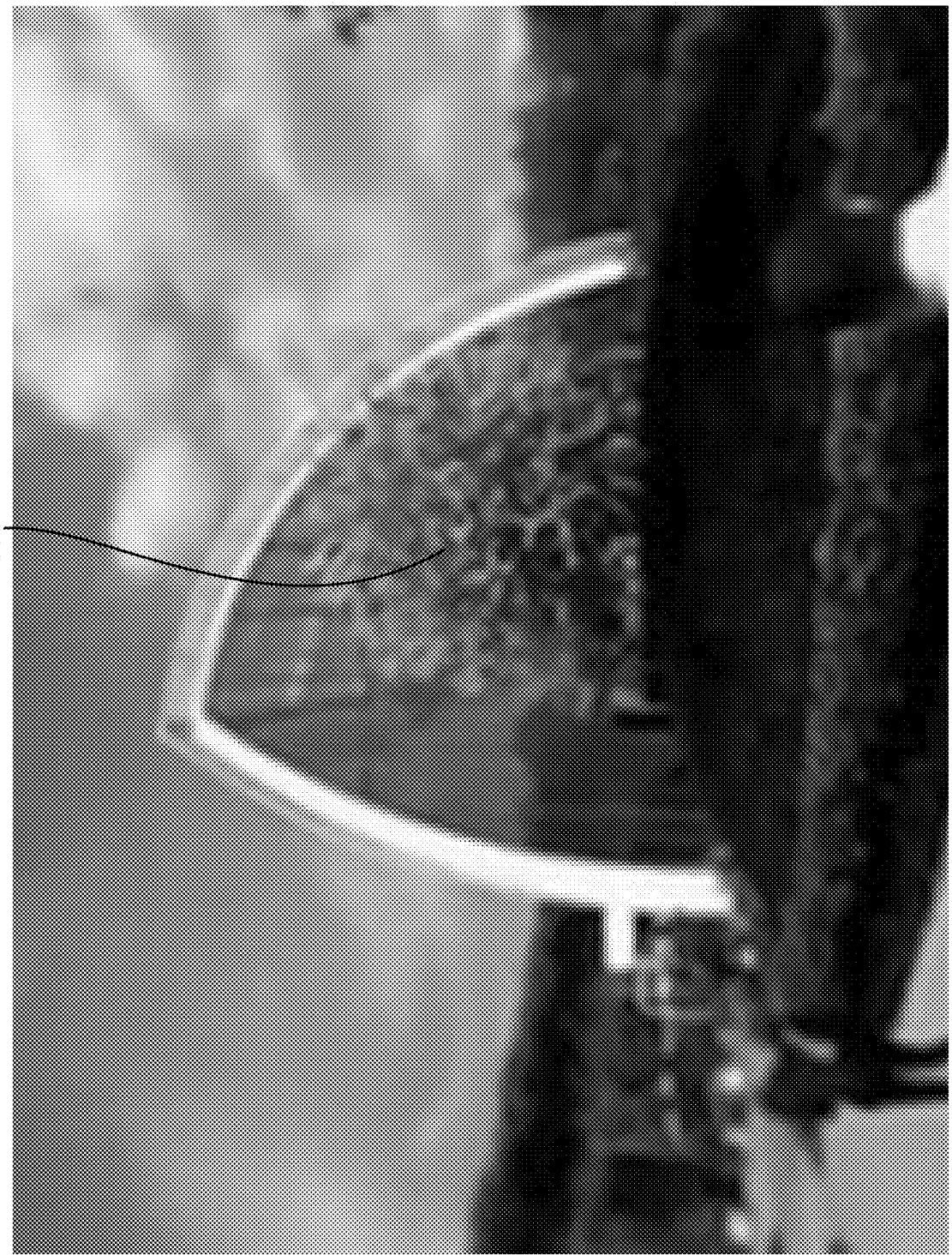
FIG. 9E1

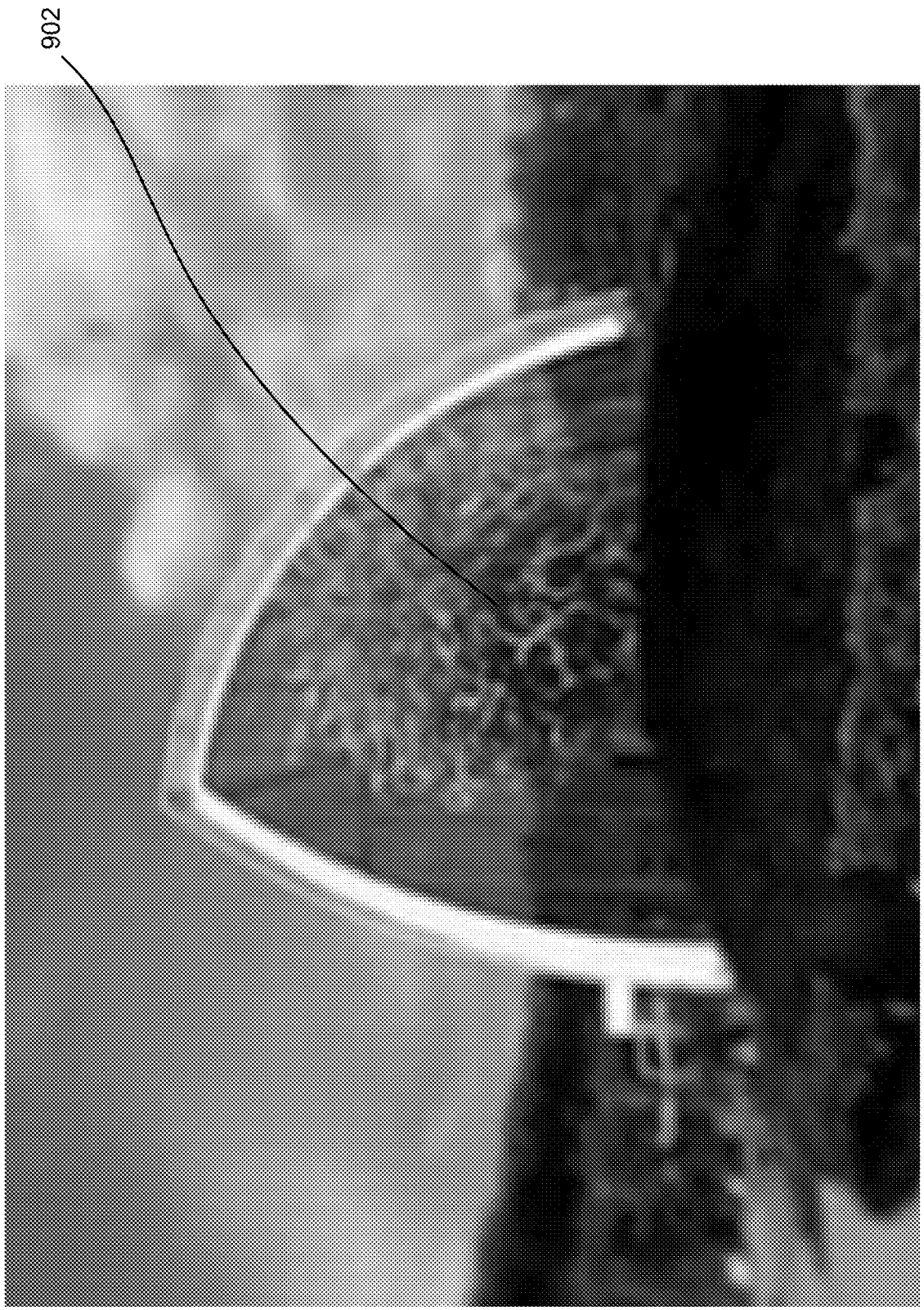
FIG. 9F1

FIG. 9G1

FIG. 9H1

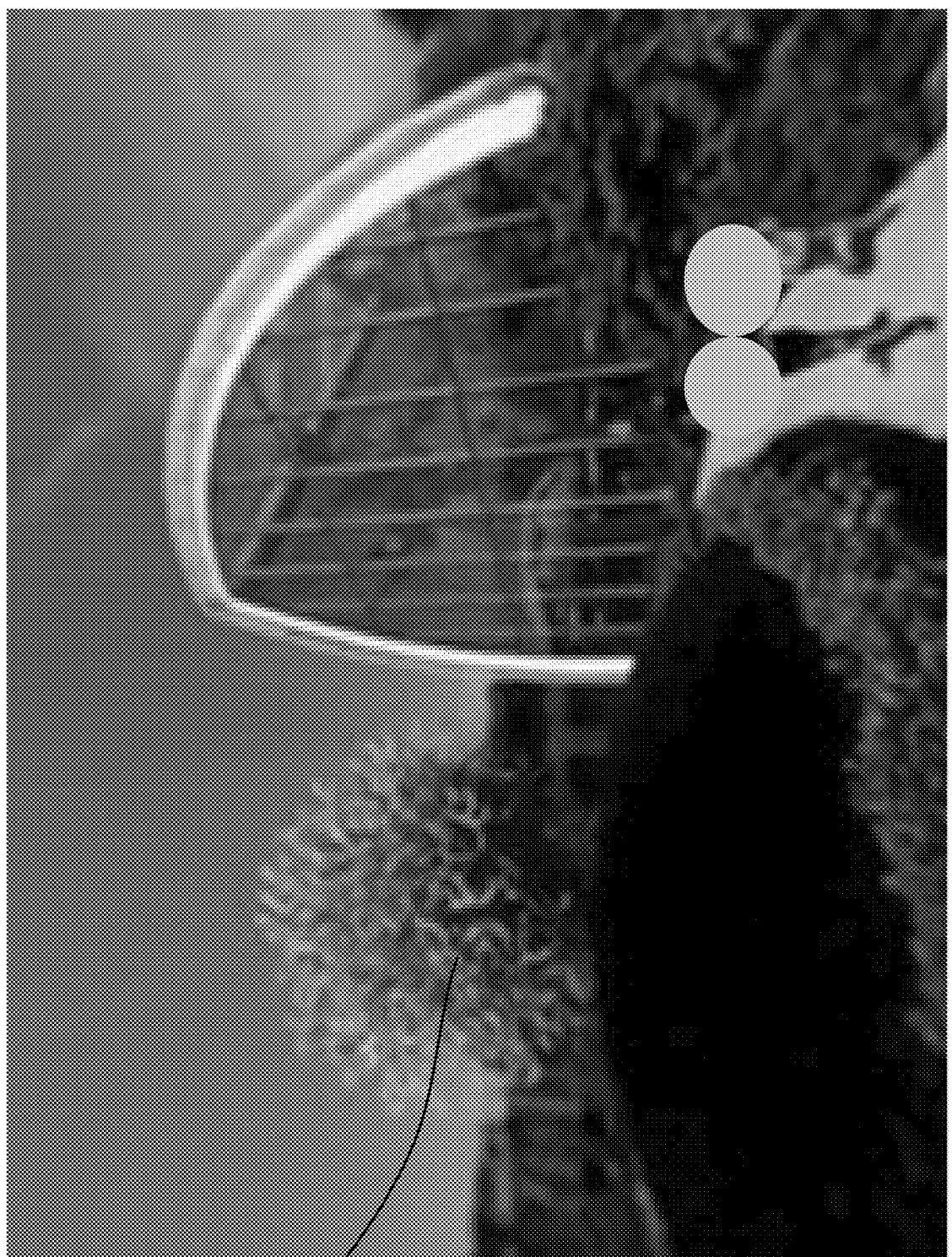
FIG. 9I1

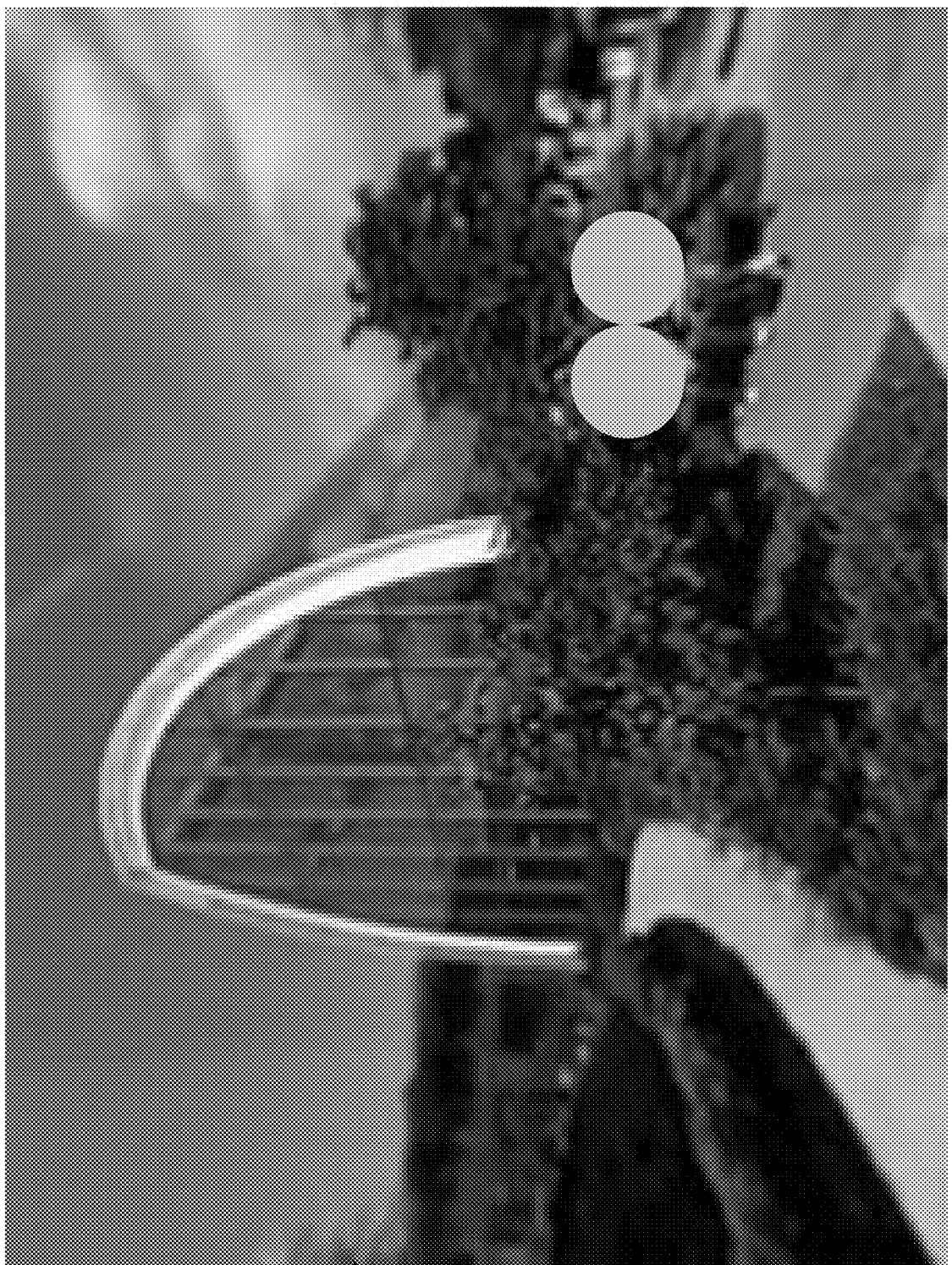
FIG. 9J1

FIG. 10A1

FIG. 10B1

FIG. 10C1

FIG. 10D1

FIG. 10E1

FIG. 10F1

FIG. 10G1

FIG. 10H1

FIG. 10I1

FIG. 10J1

1300B (6c)

Determine the smoothed camera path using at least one region of interest and at least one focus of expansion, wherein the at least one region of interest is determined using saliency detection — 1312

(6b)

Determine the smoothed camera path includes determining the smoothed camera path by minimizing a cost function that includes a term that enforces following regions of interest, by the smoothed camera path — 1314

(6a)

Determine the set of frames includes determining the set of frames to automatically reduce velocity of the hyperlapse results, by the smoothed camera path, when a distance to a region of interest becomes less than a predetermined threshold value — 1316

*FIG. 13B*

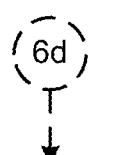
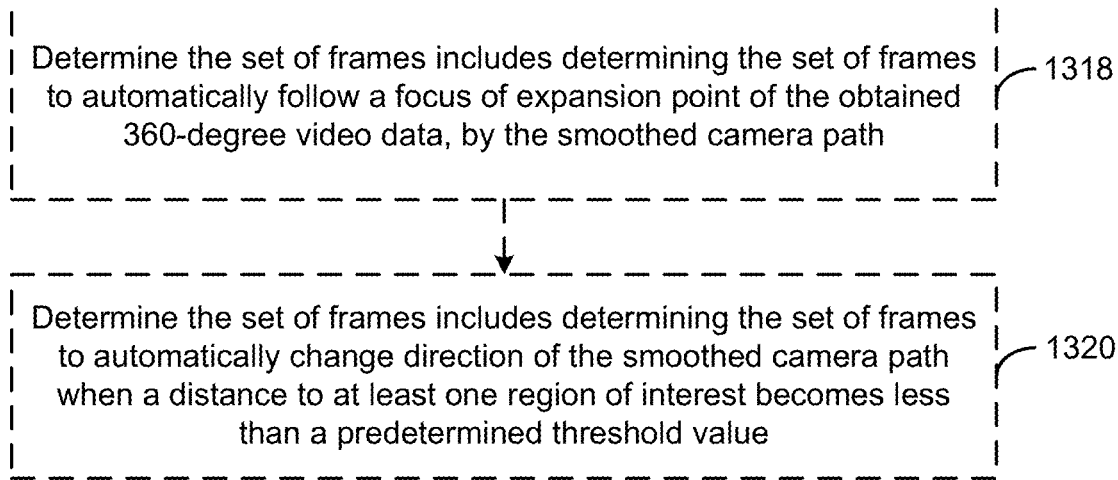
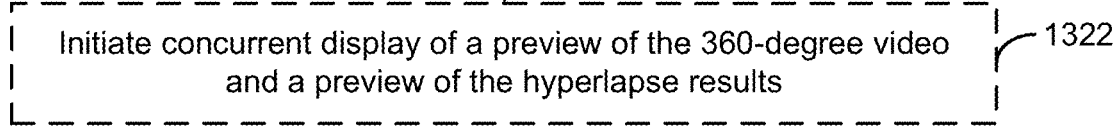
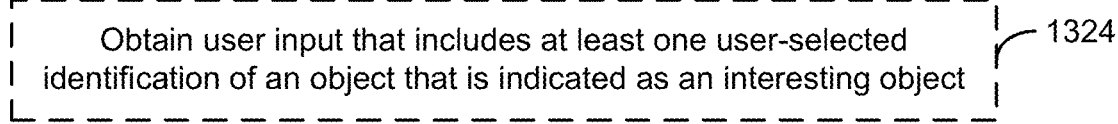
*FIG. 13C*

1500B

Determine the smoothed camera path includes determining the smoothed camera path by minimizing a cost function that includes a term that enforces following regions of interest, by the smoothed camera path, and to automatically change direction of the smoothed camera path when a distance to at least one region of interest becomes less than a predetermined threshold value ⟋1512

Determine the set of frames includes assigning each frame in the obtained stabilized set of 360-degree video data an importance score based on the number of regions of interest included in each frame ⟋1514

*FIG. 15B*

CONTROLLING GENERATION OF HYPERLAPSE FROM WIDE-ANGLED, PANORAMIC VIDEOS

BACKGROUND

Recently, users of electronic devices have increasingly become involved in making and using their own video files, for personal use as well as professional uses. As part of this trend, wide-angled/panoramic (e.g., 360-degree)(360°) videos have become very popular.

SUMMARY

According to one general aspect, generation of hyperlapse video (e.g., hyperlapse) from panoramic video, such as 360-degree video, is described. (Note that 360-degree video is only one example of panoramic video and lesser degree panoramic videos are contemplated. However, given that 360-degree videos tend to be ubiquitous, the terms '360-degree video' and 'panoramic video' are used interchangeably in the discussion below). One example implementation can obtain a set of 360-degree video data. Video stabilization is performed on the obtained set of 360-degree video data. Without user intervention, a smoothed camera path is automatically determined using at least one region of interest, determined using semantically segmented frames of stabilized video data resulting from the video stabilization. A set of frames is determined to accelerate frame speed of the hyperlapse results. A 360-degree display of the hyperlapse results is initiated.

According to another aspect, hyperlapse results are generated from 360-degree video. A set of 360-degree video data is obtained. Video stabilization is performed on the obtained set of 360-degree video data. Without user intervention, a smoothed camera path is automatically determined using at least one region of interest that is determined using saliency detection and semantically segmented frames of stabilized video data resulting from the video stabilization. A set of frames is determined to vary the velocity of the 360-degree rendered display of the hyperlapse results.

According to another aspect, a system may include at least one hardware device processor and a memory storing executable instructions that, when executed, cause one or more of the at least one hardware device processor to generate hyperlapse results from 360-degree video. A stabilized set of 360-degree video data is obtained. A camera path is determined by smoothing the obtained stabilized set of 360-degree video data, using at least one region of interest and at least one focus of expansion. A set of frames is determined to vary the frame speed of the rendered display of the hyperlapse results based on semantic information associated with the set of frames. A display is initiated by initiating a 360-degree rendering of the hyperlapse results on a display device.

According to another aspect, a system for controlling generation of hyperlapse from wide-angled, panoramic video includes a hardware device processor and a memory storing executable instructions that, when executed, cause the hardware device processor to control generation of hyperlapse results from wide-angled, panoramic video. A set of wide-angled, panoramic video data is obtained. Video stabilization is performed on the obtained set of wide-angled, panoramic video data. Without user intervention, a smoothed camera path is automatically determined using at least one region of interest, determined using semantically segmented frames of stabilized video data resulting from the video stabilization. A set of frames is determined to accelerate frame speed of the hyperlapse results. A wide-angled, panoramic rendering of display of the hyperlapse results is initiated.

According to another aspect, hyperlapse results are generated from wide-angled, panoramic video. A set of wide-angled, panoramic video data is obtained. Video stabilization is performed on the obtained set of wide-angled, panoramic video data. Without user intervention, a smoothed camera path is automatically determined using at least one region of interest that is determined using saliency detection and semantically segmented frames of stabilized video data resulting from the video stabilization. A set of frames is determined to vary the velocity of the wide-angled, panoramic rendered display of the hyperlapse results.

According to another aspect, a system may include at least one hardware device processor and a memory storing executable instructions that, when executed, cause one or more of the at least one hardware device processor to generate hyperlapse results from wide-angled, panoramic video. A stabilized set of wide-angled, panoramic video data is obtained. A camera path is determined by smoothing the obtained stabilized set of wide-angled, panoramic video data, using at least one region of interest and at least one focus of expansion. A set of frames is determined to vary the frame speed of the rendered display of the hyperlapse results based on semantic information associated with the set of frames. A display can present a wide-angled, panoramic rendering of the hyperlapse results on a display device.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. The details of one or more implementations are set forth in the accompanying drawings and the description below. Other features will be apparent from the description and drawings, and from the claims.

BRIEF DESCRIPTION OF THE DRAWINGS

FIGS. 1A1 and 1A2 show larger views of individual elements of FIG. 1A.

FIGS. 1B1 through 1B6 show larger views of individual elements of FIG. 1B.

FIG. 2 illustrates an estimation of 3D translation and rotation between 360° frames.

FIGS. 6A1 and 6B1 show larger views of FIGS. 6A and 6B, respectively.

FIGS. 7A-7J illustrate an example hyperlapse that automatically selects regions of interest (RoIs).

FIGS. 7A1-7J1 show larger views of FIGS. 7A-7J, respectively.

FIGS. 8A1-8J1 show larger views of FIGS. 8A-8J, respectively.

FIGS. 9A1-9J1 show larger views of FIGS. 9A-9J, respectively.

FIGS. 10A1-10J1 show larger views of FIGS. 10A-10J, respectively.

FIGS. 13A-13C are flowcharts illustrating example operations of the system of FIG. 12 and/or other systems.

FIGS. 15A-15B are flowcharts illustrating example operations of the system of FIG. 12 and/or other systems.

DETAILED DESCRIPTION

I. Introduction

Figure 1A:
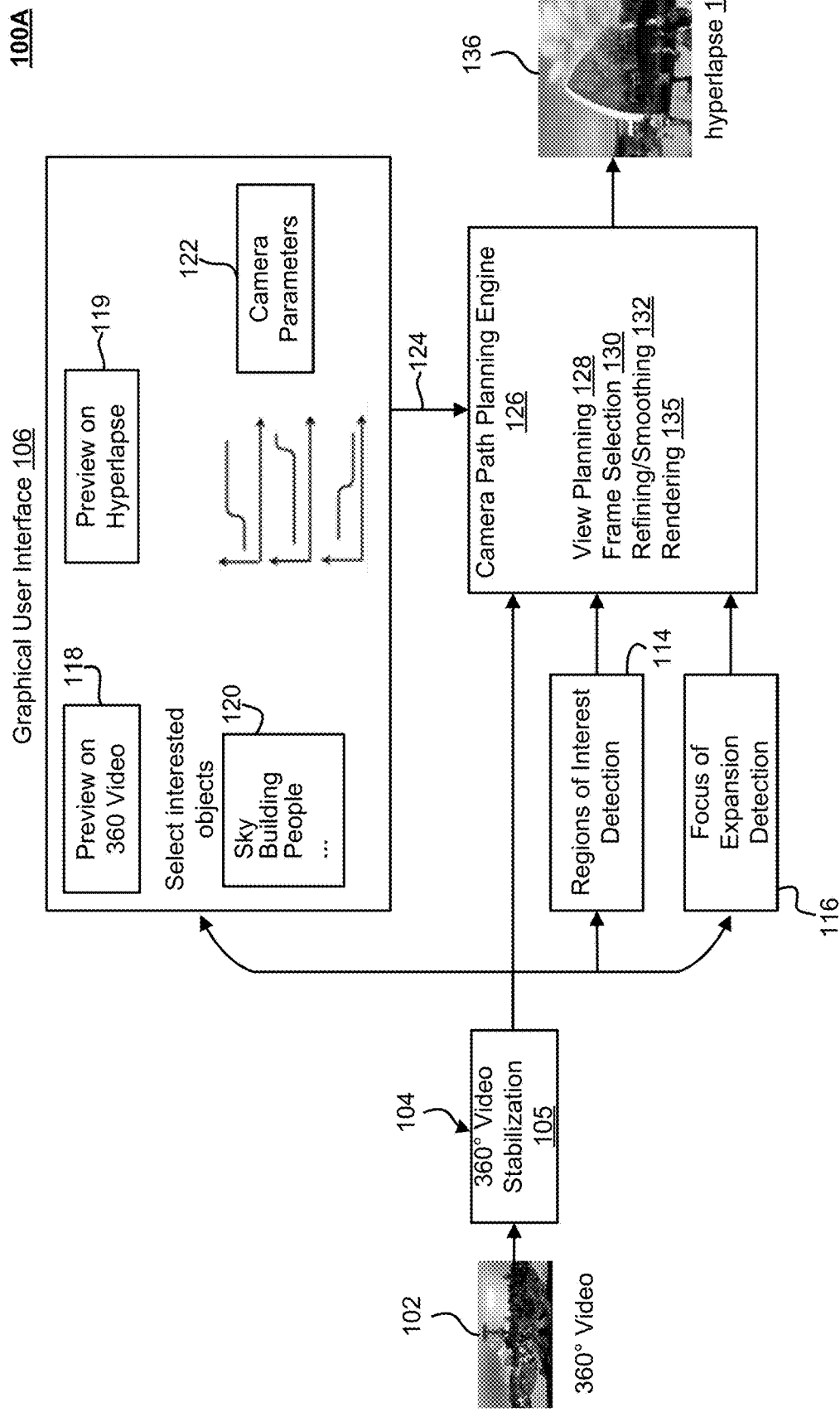
FIGS. 1A and 1B illustrate an example system overview for a system for controlling generation of hyperlapse from 360-degree videos.

Users of video data may not want to simply watch a very long wide-angled/panoramic (e.g., 360-degree)(360°) video, as there may be significantly long portions that are not "interesting" to a particular user (for whatever reason). Further, users may prefer to have particular items of interest (i.e., "salient" items) to the particular user more focused than "non-interesting" items as they view the video.

Generally, as an example, 360-degree videos, also known as immersive videos or spherical videos, may include video recordings in which a view in every direction is recorded concurrently, shot using an omnidirectional camera or a collection of cameras. For example, during playback, a viewer may have control of the viewing direction like a panorama, a form of virtual reality. For example, 360-degree video may be recorded using either a special rig of multiple cameras, or using a dedicated VR camera that includes multiple camera lenses embedded into the device. The resulting footage may then be stitched to form a single video. This process may be performed either by the camera itself, or using specialized video editing software that can analyze common visuals and audio to synchronize and link the different camera feeds together. Generally, the only area that may not be viewed is the view toward the camera support. Specialized omnidirectional cameras and rigs have been developed for the purpose of filming 360-degree video (e.g., rigs such as GOPRO's OMNI and ODYSSEY, and the KODAK PIXPRO SP360 4K DUAL PACK PRO (which may include multiple action cameras installed into a single rig), the VUZE camera, handheld dual-lens cameras such as the RICOH THETA S and SAMSUNG GEAR 360, and the KOGETO DOT 360 (e.g., a panoramic camera lens accessory developed for the IPHONE 4, 4S, and SAMSUNG GALAXY NEXUS)).

For example, the wide-angled HERO3+ BLACK EDITION GOPRO camera has about a 120-degree horizontal field of view (HFOV), and example techniques discussed herein may be used to generate normal HFOV output (e.g., 60-degree HFOV). For example, such output may be generated without wraparound techniques discussed herein with regard to 360-degree video output.

Typically, 360-degree video may be monoscopic (i.e., it is viewed as a flat image on a singular surface). For example, 360-degree videos may be viewed via personal computers, mobile devices such as smartphones, or dedicated head-mounted displays. When viewed on PCs, user input (e.g., mouse, touch) may be used to pan around the video by clicking and dragging. On smartphones, internal sensors such as a gyroscope may be used to pan the video based on the orientation of the device.

For example, in cinematography, "panning" may refer to rotating or pivoting a motion picture or video camera horizontally from a fixed position. For example, this motion may be similar to the motion a person makes when the person's head is turned on the neck from left to right (or right to left). In the resulting image, the view seems to "pass by" the spectator as new material appears on one side of the screen and exits from the other, although perspective lines may reveal that the entire image is seen from a fixed point of view. In some cases, panning may be used for gradually revealing and incorporating off-screen space into the image.

Example techniques discussed herein may provide customized user experiences on watching wide-angled/panoramic (e.g., 360-degree)(360°) videos, for example, by providing content-aware panning and speed variation. Example techniques discussed herein may thus customize the user experiences on watching wide-angled/panoramic (e.g., 360°) videos.

Given a substantially long 360-degree video, example techniques discussed herein may compress the video and generate a short fast-forward video that can be displayed on normal devices. Simultaneously, the video may automatically slow down, and change the looking direction to interesting regions such as landmarks, while the video may speed up if there is nothing "interesting" in particular portions of the video.

To accomplish the above goals, example techniques discussed herein may use semantic information (e.g., location and identities of objects in a scene) on a 360-degree video to automatically generate a normal field-of-view hyperlapse (i.e., a short sped-up video).

Example techniques discussed herein may provide an automatic way to generate a hyperlapse (time-lapse) video from a 360-degree video. As used herein, the term "manually" refers to activity using human intervention, "semi-automatically" refers to activity using human activity and machine/device activity, and "automatically" may refer to a device performing acts without human intervention.

Techniques exist for generating hyperlapses from narrow field-of-view videos only; however, those techniques may not permit significant changes of viewpoint from the captured video, nor automatic variable speed.

Example techniques discussed herein may use semantically segmented frames of an input stabilized 360-degree video, computed focus of expansion, and/or user specified objects of interest to perform path planning (i.e., view and frame selection). Path planning involves placing objects of interest in the field of view of the output, slowing or speeding based on existence of objects of interest, and avoiding fast and jerky motion.

Example techniques discussed herein may use semantic information about the scene in the 360-degree video for planning the view and frame selection to generate the hyperlapse.

Example techniques discussed herein may generate semantic-driven hyperlapse from first-person 360° videos. An example system as discussed herein may allow users to select preferences and highlight specific objects (e.g., landmarks), and create a hyperlapse that revolves around visual emphasis of such objects. For example, an automatic path planning algorithm may be used to pan with variable speed based on the semantic content or user-annotated objects in input videos. Example techniques discussed herein may produce stable and attractive hyperlapses that match user preferences.

Some example techniques have adopted structure-from-motion to estimate 6D camera poses and reconstruct three-dimensional (3D) scenes of first-person videos, and have optimized a virtual 6D camera path that is smoothed in location and orientation (see, e.g., Kopf et al., "First-person hyper-lapse videos," *Journal of ACM Transactions on Graphics,* Vol. 33, No. 4, July 2014). The output videos have been generated from the optimized camera path using image-based rendering. Although Kopf et al.'s method may handle cases where the camera is moving significantly and there is significant parallax, their method may be substantially computationally expensive.

Other example techniques have proposed a 2D approach to create hyperlapses in real-time (see, e.g., Joshi et al., "Real-time hyperlapse creation via optimal frame selection," *ACM Transactions on Graphics*, Vol. 34, Issue 4, August 2015). Instead of using structure-from-motion and image-based rendering, they have proposed a dynamic-time-warping algorithm to first select a set of optimal frames with minimal alignment error, and then smooth the selected frames using a standard 2D video stabilization method. The optimal frame selection may aid in eliminating the amplification of camera shake resulting from the speed-up, and thus may achieve real-time performance on stabilizing hyperlapses.

Other example techniques have also adopted adaptive frame sampling to create hyperlapse from first-person videos (see, e.g., Poleg et al., "Egosampling: Fast-forward and stereo for egocentric videos," *Proceedings of IEEE Conference on Computer Vision and Pattern Recognition,* 2015). They have relied on optical flow and a shortest path optimization to handle semi-regular oscillating video, such as those captured when walking.

An example INSTAGRAM HYPERLAPSE app uses the hardware stabilization approach to stabilize the hyperlapses (see, e.g., Karpenko et al., "Digital video stabilization and rolling shutter correction using gyroscopes," *Stanford Tech Report CTSR* 2011-03, 2011). However, their approach involves specialized sensors at capture time, so may not be applied to existing video.

A discussion of path planning follows.

PHOTO TOURISM is an example system for registering and browsing photos in an interactive three-dimensional (3D) browser (see, e.g., Snavely et al., "Photo tourism: exploring photo collections in 3D," *ACM Transactions on Graphics*, Vol. 25, Issue 3, 2006). For example, when the virtual camera moves from one photo to another, the system may linearly interpolate the camera position and orientation. During camera transitions between images, triangulated morphing and planar morphing may be used to interpolate intermediate views. PHOTO TOURISM has been further extended to allow six degrees of freedom (6-DOF) navigation between photos (see, e.g., Snavely et al., "Finding paths through the world's photos," *ACM Transactions on Graphics*, Vol. 27, Issue 3). The system can display multiple photos when the virtual camera moves between endpoints. They discuss a path planning algorithm that may find a physically plausible path by moving around photos in the database. They also optimize the rendering quality and generate a smooth path.

In 3D video stabilization, a full or partial 3D scene reconstruction may be performed and followed by camera path smoothing and image rendering. For example, 3D camera trajectories may be computed and local content-preserving warping may be applied to synthesize output frames (see, e.g., Liu et al., "Content-preserving warps for 3D video stabilization," *ACM Transactions on Graphics—Proceedings of ACM SIGGRAPH*, Vol. 28, Issue 3, 2009). For example, a bundle of local camera paths may be used to handle non-rigid motion and parallax (see, e.g., Liu et al., "Bundled camera paths for video stabilization," *ACM Transactions on Graphics—SIGGRAPH Conference Proceedings*, Vol. 32, Issue 4, 2013). For example, the camera path may be optimized based on $L_1$ norm of pose (see, e.g., Grundmann et al., "Auto-directed video stabilization with robust L1 optimal camera paths," *Proceedings of the IEEE Conference on Computer Vision and Pattern Recognition*, 2011).

A discussion of hyperlapses follows.

An example path planning algorithm may satisfy the acceleration speed, the smoothness of the path and the image rendering quality (see, e.g., Kopf et al., "First-person hyperlapse videos," *ACM Transactions on Graphics*, Vol. 33, Issue 4, 2014). As another example, a two-dimensional (2D) technique (i.e., without 3D scene reconstruction) may be used to stabilize and accelerate input videos (see, e.g., Joshi et al., "Real-time hyperlapse creation via optimal frame selection," *ACM Transactions on Graphics*, Vol. 34, Issue 4, August 2015). The path planning may be cast to a frame selection problem, which may then be solved by a dynamic-time-warping algorithm.

A discussion of semantic segmentation follows.

To customize the hyperlapse based on content information, the semantic objects in the input video may be parsed. Several image semantic segmentation algorithms based on deep involutional neural networks have been proposed. For example, FCN (Fully Convolutional Network) (see, e.g., Long et al., "Fully convolutional networks for semantic segmentation," *Proceedings of IEEE Conference on Computer Vision and Pattern Recognition*, Jun. 7, 2015) adapts the classification networks (see, e.g., ALEXNET (Krizhevsky et al., "Imagenet classification with deep convolutional neural networks," *Proceedings of 26th Annual Conference on Neural Information Processing Systems,* 2012), GOOGLENET (Szegedy et al., "Going deeper with convolutions," *Proceedings of the IEEE Conference on Computer Vision and Pattern Recognition,* Jun. 7, 2015), and VGGNet (Simonyan and Zisserman, "Very deep convolutional networks for large-scale image recognition," *Journal of the Computing Research Repository,* 2014)) into fully-convolutional networks and transfers the feature representations by fine-tuning to the segmentation task. SEGNET (see, e.g., Badrinarayanan et al., "Segnet: A deep convolutional encoder-decoder architecture for image segmentation," *Journal of Computing Research Repository*, May 2015 and Noh et al., "Learning deconvolution network for semantic segmentation," *Proceedings of IEEE International Conference on Computer Vision*, Dec. 7, 2015) may use encoder-decoder architectures that cascade the VGG network and a deconvolution network to make a precise prediction. In video semantic segmentation, the temporal consistency may be achieved by optimizing a spatial-temporal conditional random field (CRF) (see, e.g., Liu et al., "Content-preserving warps for 3D video stabilization," *ACM Transactions on Graphics—Proceedings of ACM SIGGRAPH*, Vol. 28, Issue 3, 2009) or a min-cost flow (see, e.g., Zhang et al., "Semantic object segmentation via detection in weakly labeled video," *Proceeding of IEEE Conference on Computer Vision and Pattern Recognition,* 2015).

Spatial-temporal saliency maps may guide content-aware warping in video retargeting (see, e.g., Rubinstein et al., "Improved seam carving for video retargeting," *ACM Transactions on Graphics—Proceedings of ACM SIGGRAPH,* Vol. 27, Issue 3, 2008; Wang et al., "Motion-based video retargeting with optimized crop-and-warp," *Proceedings of ACM Transactions on Graphics,* Vol. 29, Issue 4, July 2010; and Wang et al., "Scalable and coherent video resizing with per-frame optimization," *ACM Transactions on Graphics,* Vol. 30, Issue 4, 2011). For example, techniques for automatic panning, scanning, and zooming may be used to display video sequences on devices with arbitrary aspect ratios (see, e.g., Deselaers et al., "Pan, Zoom, Scantime-coherent, Trained Automatic Video Cropping," *Proceedings of IEEE Computer Society Conference on Computer Vision and Pattern Recognition,* 2008). For example, red, green, blue (RGB), log-spectrum from Fourier transform, and the magnitude of optical flow vectors may be used as saliency features. As used herein, the term "saliency" refers to significance, importance, prominence, and/or conspicuousness.

An example real-time system for video retargeting (see, e.g., Krähenbühl, et al., "A system for retargeting of streaming video," *ACM Transactions on Graphics—Proceedings of ACM SIGGRAPH Asia,* Vol. 28, Issue 5, 2009) may calculate per-frame saliency maps from 2D Fourier transform and optical flow vectors, and the temporal coherence may be handled by averaging a window of 5 frames. In another example, (see, e.g., Wang et al., "Motion-aware temporal coherence for video resizing," *ACM Transactions on Graphics,* Vol. 28, Issue 5, 2009), the significance map may be computed from the multiplication of gradient magnitude and image saliency (see, e.g., Itti et al., "A model of saliency-based visual attention for rapid scene analysis," *IEEE Transactions on Pattern Analysis and Machine Intelligence,* Vol. 20, No. 11, 1998). For example, neighboring 60 frames may be aligned by estimating the camera motion between consecutive frames, and the significance maps may be blended at aligned positions. In a similar example technique, the per-frame saliency maps may be computed (see, e.g., Wang et al., "Motion-based video retargeting with optimized crop-and-warp," *ACM Transactions on Graphics,* Vol. 29, Issue 4, 2010). For example, the temporal coherence may be achieved by incorporating optical flow into mesh grids warping.

Another example technique involves a space-time saliency method to evaluate the visual importance of video frames (see, e.g., Zhou et al., "Panocontext: A whole-room 3D context model for panoramic scene understanding," *Proceedings of* 13*th European Conference on Computer Vision,* Sep. 6, 2014). For example, the input video may be over-segmented into color-coherence spatial-temporal regions. For each region, various appearance and motion features are extracted, including feature contracts of color statistics and optical flow vectors, and local priors based on location, velocity, acceleration, and foreground probability.

In accordance with example techniques discussed herein, perspective view hyperlapses may be generated from first-person 360° videos. In addition, the virtual camera of hyperlapses may be allowed to revolve around visual emphasis based on user preferences.

Figure 1B:
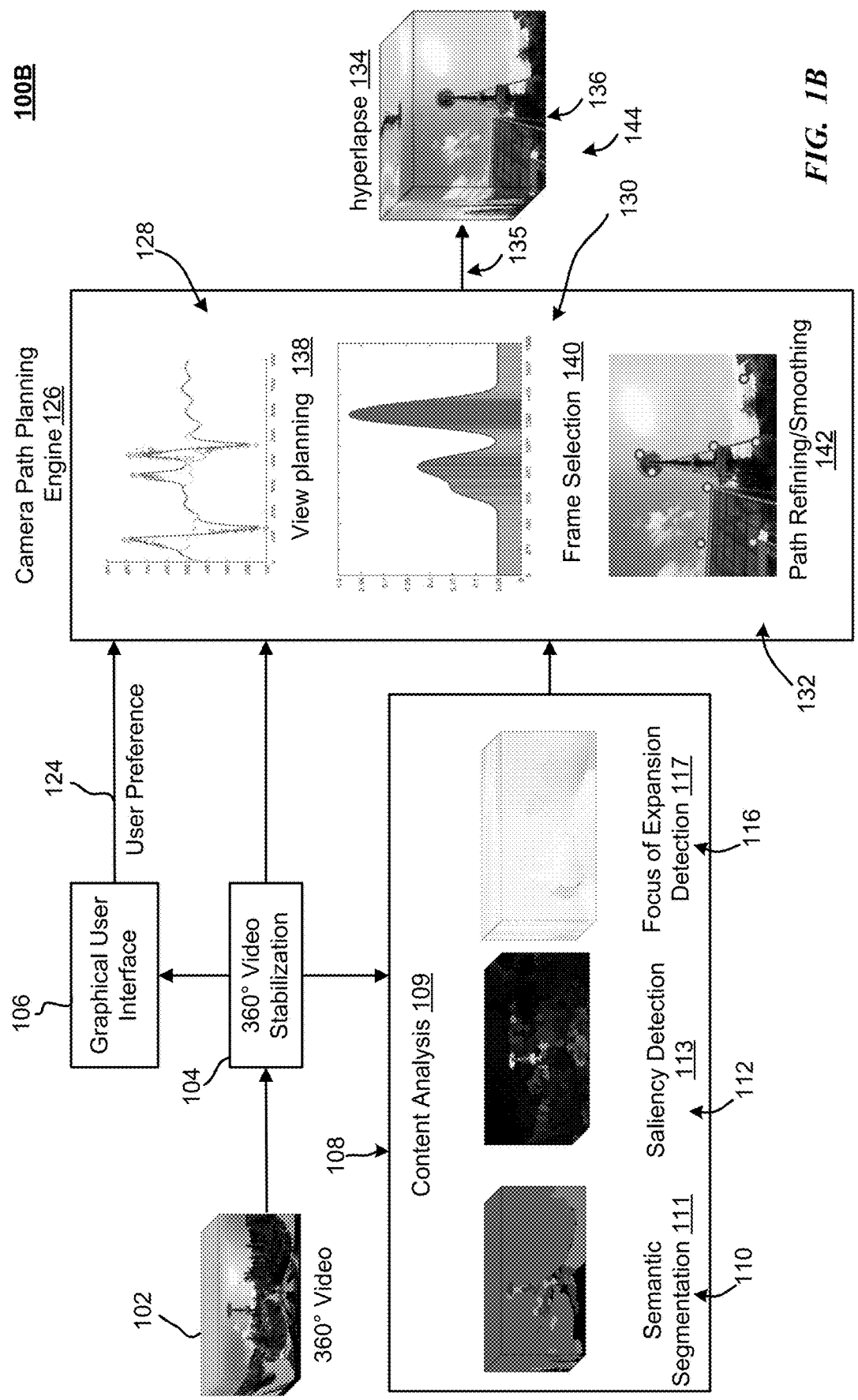

FIGS. 1A and 1B illustrate an overview of example systems 100A and 100B, in accordance with example techniques discussed herein. As shown in FIG. 1A and FIG. 1B, a 360° (or other panoramic) video 102 (e.g., 360° video data) may be input for 360° video stabilization 104 that may be accomplished by a video stabilization module 105. For example, first-person videos may typically be shaky, so the input 360° video 102 may be stabilized before performing further analysis. An example 360° video stabilization technique is discussed further below. To understand the semantic content of input videos, content analysis 108 may be performed, for example, by a content analysis engine 109. For instance, semantic segmentation 110 and saliency detection 112 (e.g., spatial-temporal saliency) may be applied to detect (e.g., extract) regions of interest 114, and the focus of expansion may be detected (e.g., estimated) 116 as a prior to guide the virtual camera, as discussed further below. For example, these actions may be performed by a semantic segmentation module 111, a saliency detection module 113, and a focus of expansion detection module 117, respectively. For instance, the stabilized videos and the parsed semantic information may then be displayed (e.g., preview on 360-degree video) at 118 and/or on a preview on hyperlapse 119 on a Graphical User Interface (GUI) 106. The GUI may also allow users to select their preference (e.g., select interested objects) 120 and/or change camera settings/parameters 122 (e.g., hyperlapse speed and/or field-of-view, among others). The regions of interest (RoIs), focus of expansion (FoE), and/or user settings may be passed at 124 into an example camera path planning engine 126, and an example virtual camera path (e.g., camera path planning) may be accomplished by planning camera viewing direction (e.g., view planning) 128 and selecting optimal frames (e.g., frame selection) 130. The path may be refined/smoothed 132 and output hyperlapses 134 may be rendered 135 and may be displayed 136 on the graphical user interface 106. For example, these actions may be performed by a view planning module 138, a frame selection module 140, a path smoothing module 142, and/or rendering engine 144.

In some cases, the graphical user interface 106 may also allow users to customize the hyperlapses by annotating interesting objects and adjusting the viewpoint, field-of-view, and speed frame by frame, as discussed further below.

Many first-person videos may be casually captured, for example, during walking, running or bicycling. The raw input videos may suffer from significant shake, twists and turns. As a result, it may be desirable to stabilize the entire 360° video before conducting video content analysis and/or camera path planning.

Conventional 2D video stabilization methods may estimate a frame-to-frame transform matrix (e.g., affine transform or homography), and smooth the chained transform to stabilize the videos (see, e.g., Matsushita et al., "Full-Frame Video Stabilization with Motion Inpainting," *IEEE Transactions on Pattern Analysis and Machine Intelligence,* Vol. 28, No. 7, 2006; Grundmann et al., "Auto-directed video stabilization with robust L1 optimal camera paths," *Proceedings of the IEEE Conference on Computer Vision and Pattern Recognition,* 2011; Liu et al., "Bundled camera paths for video stabilization," *ACM Transactions on Graphics—SIGGRAPH Conference Proceedings,* Vol. 32, Issue 4, 2013). However, the homography may only be defined on perspective view images and may not be applied to full panoramic images. 3D stabilization methods (see, e.g., Liu et al., "Content-preserving warps for 3D video stabilization," *ACM Transactions on Graphics—Proceedings of ACM SIGGRAPH,* Vol. 28, Issue 3, 2009; Kopf et al., "First-person hyper-lapse videos," *ACM Transactions on Graphics,* Vol. 33, Issue 4, 2014) may be a possible solution to stabilize 360° videos, but the structure-from-motion and 3D scene reconstruction steps may be substantially computationally expensive.

As discussed further below, two example techniques may be provided to stabilize 360° videos. In many cases, it may be assumed that the relative translation between frames is negligible, and the frame-to-frame transformation in 360° images can be described by 3D rotation (yaw, pitch, roll). Therefore, the 3D rotation may be estimated and smoothed on consecutive frames. In cases where the camera is moving very fast, the relative translation between two frames may not be ignorable. Therefore, another example technique is provided that jointly estimates the translation and rotation to stabilize the 360° videos.

For example, an estimate of rotation may be determined. For instance, a set of sparse 2D feature trajectories across multiple frames may be determined using KLT tracking (see, e.g., Shi and Tomasi, "Good features to track," *Proceedings of IEEE Computer Society Conference on Computer Vision and Pattern Recognition*, 1994). For example, in computer vision, the Kanade-Lucas-Tomasi (KLT) feature tracker is an approach to feature extraction. For example, it may be proposed for the purpose of dealing with the problem that traditional image registration techniques are generally costly. For instance, KLT may make use of spatial intensity information to direct the search for the position that yields the best match. For example, KLT may be faster than other traditional techniques for examining far fewer potential matches between the images.

Figure 2:
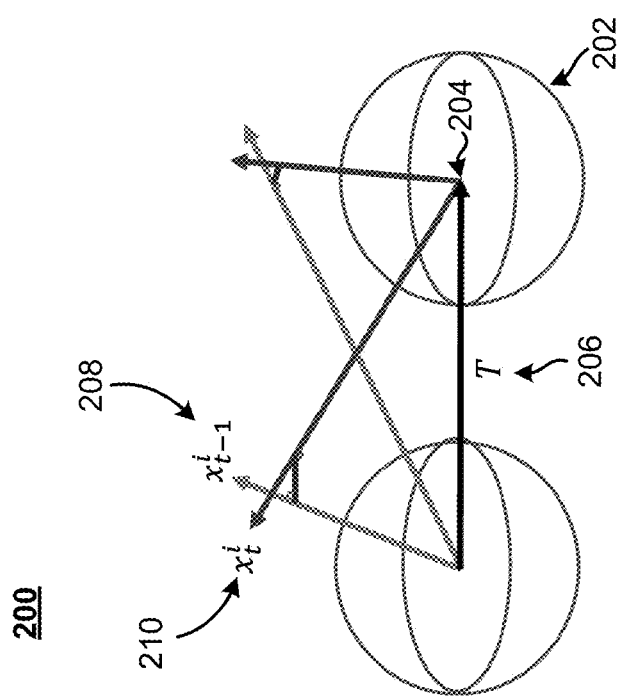

The features from longer trajectories may be from background regions, and thus may be more stable and reliable than independent frame-to-frame feature matching. FIG. 2 shows an example representation 200. Since the full 360° views are obtained, the 2D feature points may be converted onto a 3D sphere (e.g., sphere 202 of FIG. 2) and thus each feature point may correspond to a 3D vector (e.g., 3D vector 204 of FIG. 2). For example, the rotation matrix $R_t$ that warps feature vectors from frame t–1 to frame t may be estimated by minimizing the cost function:

$$R_t = \frac{\text{argmin}}{R} \sum_{i=1}^{n} w_i \|R x_{t-1}^i - x_t^i\| \tag{1}$$

where $x_{t-1}$ and $x_t$ are matched feature vectors at frame t–1 and t, respectively. Let $P_t$ be the camera pose at frame t, which can be written as the chain of estimated rotation matrices:

$$P_t = R_t P_{t-1} = R_t P_{t-1} \ldots R_0 \tag{2}$$

where $R_0$ is the identity matrix. For example, the chained transform may be smoothed by Gaussian smoothing to obtain a smoothed camera pose $\overline{P}$:

$$\overline{P}_t \Sigma_{k \in N_t} w_{kt} P_k \tag{3}$$

where $$w_{kt} = \frac{1}{\sqrt{2\pi}\sigma} e^{-(t-k)^2/2\sigma^2}$$

is the Gaussian weight between frame t and k. Once the smoothed path P is obtained, the warping transform $B_t = \overline{P}_t P_t^{-1}$ may be computed to warp the original frame to the stabilized frame.

For example, rotation and translation may be estimated. FIG. 2 illustrates an estimation of 3D translation and rotation between 360° frames.

When the camera is moving substantially fast, using rotation may not suffice to describe the camera motion. For example, to obtain accurate camera poses, rotation and translation may be estimated jointly. Due to the scale ambiguity, the translation T may be assumed to be a unit vector 206. An example goal may include determining a rotation matrix (3 DoF) and a translation vector (3 DoF) by minimizing the distance between pairs of matched feature vectors (e.g., $x_{t-1}^i$ (208) and $x_t^i$ (210) in FIG. 2):

$$R_t, T_t = \frac{\text{argmin}}{R, T} \sum_{i=1}^{n} w_i \|Dist(x_{t-1}^i - x_t^i)\|^2 \tag{4}$$

In order to compute the distance between $x_{t-1}^i$ and $x_t^i$, it may first be assumed that they are not parallel (e.g., the pair of feature vectors may be dropped if they are parallel). Then, a normal vector N may be computed by the cross product of $x_{t-1}^i$ and $x_t^i$. For example, a plane $P_1$ may be constructed that uses N as the surface normal and contains $x_{t-1}^i$. Another plane $P_2$ may be constructed from $x_t^i$ and N as well. Because these two planes are parallel, Dist $(x_{t-1}^i - x_t^i)$ may be defined as the distance between these two planes. If the two feature vectors satisfy the epipolar geometry, the distance between two constructed planes may be (substantially) zero. Since there are multiple matched features, the summation of distance may be minimized to find the optimal R and T. For example, CERES SOLVER (see, e.g., Agarwal et al., "Ceres Solver" at <<http://ceres-solver.org/>>) may be used to solve this non-linear optimization problem. For example, R may be initialized with the results discussed above, and T may be initialized by the mean of all residuals of the feature vectors after rotation.

Since jointly estimating rotation and translation may be computationally expensive, the pure rotation mode may be adopted in many cases. For example, users may manually change the stabilization to rotation and translation mode in an example user interface if the video is not sufficiently stabilized.

Example techniques for video content analysis 108 are discussed below.

As discussed herein, a semantic-driven hyperlapse may be generated that can revolve around highlighted objects or regions in the video. To achieve this goal, it may be desirable to understand the semantic content of the input videos. For example, semantic segmentation (110, FIG. 1B) may be applied to extract the semantic labels and probability map of each frame, and the semantic information may be combined with visual saliency and motion saliency scores to detect regions of interest (RoIs). For example, the detected regions of interest may be used to guide (or as a guide for) the camera path planning engine (126, FIG. 1B). In the case that there are no interesting regions or objects, the focus of expansion (FoE), which is the camera moving direction, may be estimated as a prior in the example path planning algorithm.

To detect RoI, semantic segmentation may be used, and the visual saliency and motion saliency scores may be determined. These scores may then be combined and the local maxima may be determined as RoIs.

To understand the semantic content of the video, an example semantic segmentation algorithm (see, e.g., Long et al., "Fully convolutional networks for semantic segmentation," *Proceedings of IEEE Conference on Computer Vision and Pattern Recognition*, Jun. 7, 2015) may be used, frame by frame. For example, the eighth implementation of the fully convoluted network (FCN-8s) trained on Pascal-Context dataset, which contains 60 categories, may be used. For instance, the semantic labels and probability scores for each category may be extracted, and the probability scores may be used as the semantic scores $S_{semantic}$. To enforce temporal coherence, optical flow may be computed, labels may be transferred to nearby frames, and the label probabilities may be averaged. In addition to semantic scores, the visual saliency scores $S_{visual}$ may be computed using an example saliency detection algorithm (see, e.g., Tu et al., "Real-time salient object detection with a minimum spanning tree," 2016). For example, objects with substantially large motion may also be considered as saliency. An example simple linear interactive clustering (SLIC) algorithm (see, e.g., Achanta et al., "Slic superpixels compared to state-of-the-art superpixel methods," *IEEE Transactions on Pattern Analysis and Machine Intelligence*, Vol. 34, Issue 11, 2012) may be applied to segment each frame into super-pixels, the average optical flow magnitude in each super-pixel may be computed, and the motion saliency $S_{motion}^i$ may be defined at super-pixel i as the flow contrast between neighbor super-pixels:

$$S_{motion}^i = \Sigma_{k \in N(i)} w_{ki}(m_i - m_k)^2 \qquad (5)$$

where $m_i$ is the optical flow magnitude in super-pixel i, and $w_{ki}$ is the Gaussian weight computed from the distance between the centers of mass of super-pixel i and k. For example, these scores may be combined to a single score by:

$$S = w_{semantic} S_{semantic} + w_{visual} S_{visual} + w_{motion} S_{motion} \qquad (6)$$

and the integral score may be computed in a spatial-temporal window with 21×21 width in the spatial domain and 21 frames in the time domain. For example, the local maximum of S may be determined as the "interesting" regions. For example, these interesting regions may be used to guide the camera path planning performed by camera path planning engine (126, FIG. 1B) as discussed below.

Example techniques for the focus of expansion detection (e.g., determination) (116. FIG. 1B) are discussed below.

As used herein, the focus of expansion (FoE) can refer to a single point from which all optical flow vectors diverge. For instance, the FoE may indicate the direction of forward motion of the camera. For example, the Focus of Contraction (FoC) can refer to the antipodal point of FoE to which optical flow vectors converge. For instance, it may be desirable to find a camera path that follows the FoE of the input video.

In some cases, the FoE and FoC may be parameterized as 2D image points (x, y) on the equi-rectangular coordinate. For example, the Hough transform with optical flow may be used to estimate the FoE and FoC on each frame of input videos. For instance, the Hough transform is a technique to measure parameters by voting. From each flow vector, a locus of points may be drawn, which is the intersection of a plane to the cylinder. For example, points on a determined curve are candidates for FoE and FoC, so this flow vector can vote to those points. For instance, since there may be thousands of flow vectors, it may be possible to plot thousands of curves.

Figure 3:
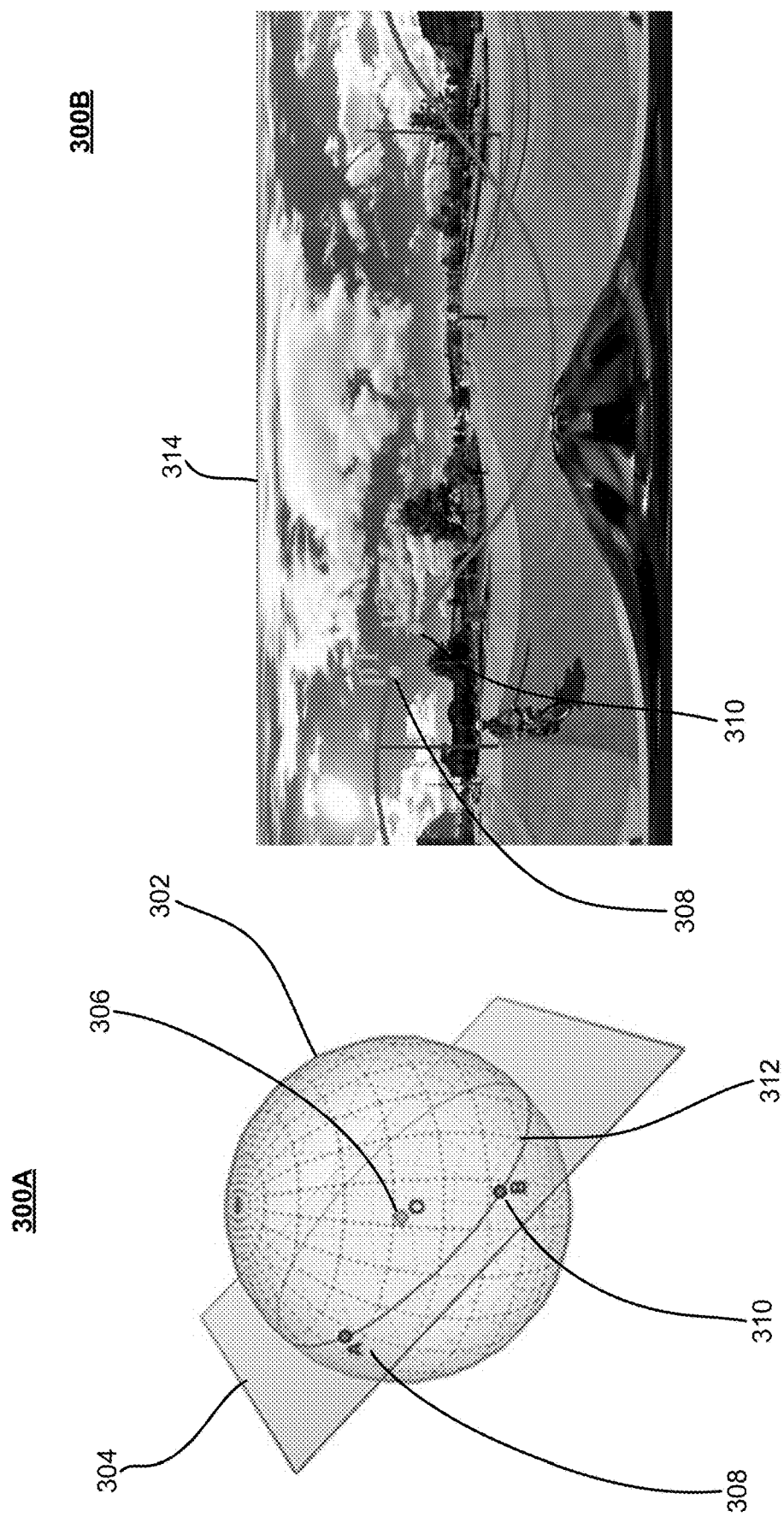
FIGS. 3A and 3B illustrate an intersection of a sphere and a plane passing through the sphere center, defining a locus of points that may be candidates of FoE and FoC.

FIGS. 3A and 3B illustrate instances 300A and 300B where an intersection of a sphere 302 and a plane 304 passing through the sphere's center 'O' designated at 306 defines a locus of points that may be candidates of FoE and FoC.

Let $p_1$ and $v_1$ be an image point and its optical flow vector, respectively. For example, $p_2 = p_1 + v_1$ may be determined, and $p_1$ and $p_2$ may be projected from 2D image coordinate to 3D spherical coordinate. Let $p_1$ and $p_2$ (e.g., 'A' designated at 308, 'B' designated at 310 of FIGS. 3A and 3B) be the corresponding 3D vectors of $p_1$ and $p_2$, respectively. $p_1$, $p_2$ and the center of the sphere o (e.g., 306 of FIG. 3A) form a plane and intersect with the unit sphere 302 on a great circle 312, as illustrated in FIG. 3A. For instance, all the points on this great circle 312 may be candidates of FoE and FoC, so each flow vector may vote for a locus of points on an image frame 314. For example, the votes from all the optical flow vectors may be aggregated to a histogram matrix, and a pair of antipodal points that have the highest votes may be determined. Then, the FoE and FoC may be determined by the direction of nearby flow vectors. For instance, after computing FoE on every frame, Gaussian filtering may be applied to smooth the FoEs to generate a smoothed camera path.

Example techniques for determining an optimal path are discussed below.

As discussed herein, a virtual camera path in a 360° video is a set of camera looking vectors $p_t = (\theta_t, \phi_t)$ that indicate the looking direction ($\theta_t, \phi_t$) at time t. Here the camera up vector may be assumed to be fixed and pointing to (0, π/2). An example goal may include finding an optimal path that follows the regions of interest or user-annotated objects. For example, to generate a hyperlapse, t may be monotonically increasing and close to the target speed. Since it may be difficult to solve θ, φ, and t jointly, the problem may be divided into 3 phases (as shown relative to camera path planning engine 126 of FIG. 1A):

1. View planning: given the regions of interest and focus of expansion, find the camera viewing direction in each frame.
2. Frame selection: find an advantageous and potentially optimal set of frames that trades-off the target speed, importance scores, and frame-to-frame alignment error.
3. Path refining and rendering: given the selected path, stabilize the content and render a smoothed hyperlapse.

Example techniques for view planning 128 are discussed below.

Given the regions of interest $p^{RoI}$ (and focus of expansion $p^{FoE}$, a smoothed camera path may be determined by minimizing an example cost function over frames 1, . . . , T:

$$\Sigma_{i=1}^T w_r C_r(p_i; p^{RoI}) + w_f C_f(p_i; p^{FoE}) + w_v C_v(p_i) + w_a C_a(p_i) \qquad (7)$$

where $$C_r(p_i; p^{RoI}) = \Sigma_{r=1}^R \tilde{w}_{ri} \|p_i - p_r^{RoI}\|^2, \qquad (8)$$

$$C_f(p_i; p^{FoE}) = \|p_i - p_r^{FoE}\|^2, \qquad (9)$$

$$C_v(p_i) = \|p_i - p_{i-1}\|^2, \qquad (10)$$

$$C_a(p_i) = \|p_{i+1} 2p_i + p_{i-1}\|^2. \qquad (11)$$

For example, the first term $C_r$ enforces the path to follow the regions of interest. For instance, the weight $\tilde{w}_{rt}$ is defined by the time difference between the current path and the regions of interest:

$$\tilde{w}_{ri} = e^{-(i-r)^2/\sigma_t^2} \qquad (12)$$

For example, only nearby regions of interest may affect the example path optimization, and the number of neighbors may be controlled by $\sigma_r$. The second term $C_f$ is the prior term that enforces the camera path to be close to the focus of expansion if there are no interesting points. $C_v$ and $C_a$ are the velocity term and acceleration term that may control the smoothness of the path. In an experiment, the weights $w_r=3$, $w_f=1$, $w_v=50$ and $w_a=10$ were empirically chosen. It may be noted that the cost function (Equation (7) above) is a least square optimization problem, and the problem may be converted into a sparse linear system and may be solved using the conjugate gradient technique. A result of the example view planning is shown in representation 400 of FIG. 4.

Given FoE (focus of expansion) and RoI (Region of Interest), it may be desirable to determine/find a smooth camera path that follows FoE and passes through RoI (e.g., find a path that basically follows the FoE, but changes the direction if it is getting close to some RoIs). For example, when a distance to a set of regions of interest becomes less than a predetermined threshold value, the direction may be changed.

Figure 4:
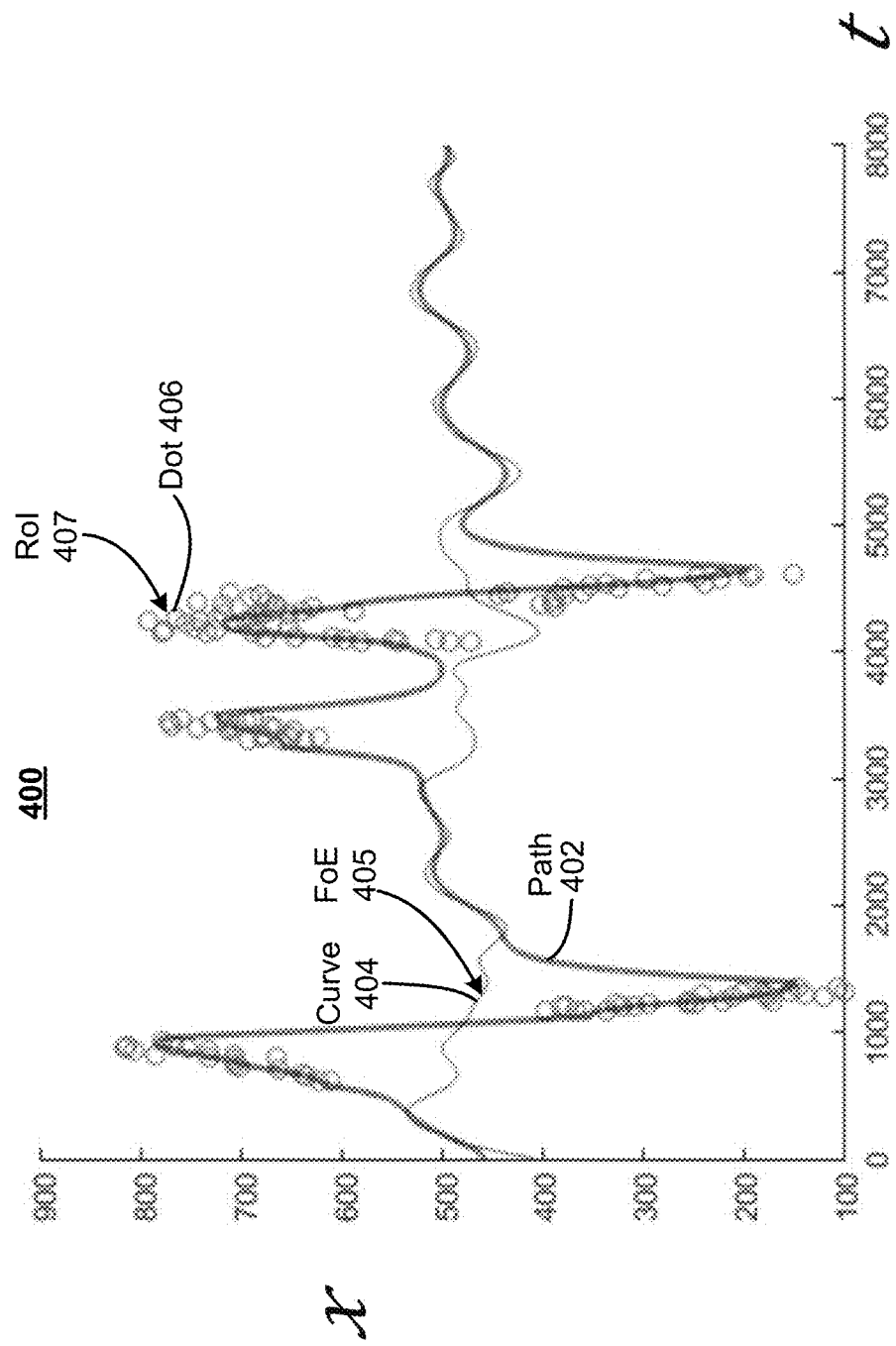
FIG. 4 illustrates a computed path from an example path planning technique.

FIG. 4 illustrates a computed path 402 on x direction from an example path planning technique. As shown in FIG. 4, curve 404 indicates the focus of expansion (FoE) 405, dots 406 indicate regions of interest (RoIs) 407, and the curve 404 relates to the computed path 402. As can be seen in FIG. 4, the computed path 402 may basically follow curve 404, but will change direction to RoIs 407.

Example techniques for frame selection (130, FIGS. 1A and 1B) are discussed below.

Once a camera path is determined for the entire 360° video (102, FIGS. 1A and 1B) a set of frames may be selected to accelerate the video. For example, a set of frame indexes $\tilde{t} \in \{1, 2, \ldots, T\}$ may be selected such that the time difference between subsequent frames is close to a target speed $\bar{t}$. In addition, it may be desirable for the video to automatically slow down when getting close to an interesting region, and gradually speed up to the target speed when leaving.

Given a camera path $p_t=(\theta_t, \phi_t)$, $\forall t=1, 2, \ldots, T$, the frame may be cropped and perspective projection may be applied to render a video with target field-of-view (e.g., 100°). Then, a variant of an example frame selection algorithm (see, e.g., Joshi et al., "Real-time hyperlapse creation via optimal frame selection," *ACM Transactions on Graphics*, Vol. 34, Issue 4, August 2015) may be used to select desired/optimal frames for hyperlapses. For example, to ensure the selected frames can be acceptably aligned, the example feature trajectories from KLT tracker may be used. For example, the frame-to-frame alignment error may be determined by:

$$C_r(i, j) = \frac{1}{n}\sum_{p=1}^{n} \|(x_p, y_p)_j^T - T(i, j)(x_p, y_p)_i^T\|^2 \quad (13)$$

where $(x_p, y_p)_i$ and $(x_p, y_p)_j$ are matched features on frame i and j, respectively. For example, T(i, j) is the transformation matrix that warps $(x_p, y_p)_i$ from frame i to j. For example, translation, rotation and scaling may be considered when computing T(i, j). For example, the frame alignment cost may be defined as:

$$C_m(i, j) = \begin{cases} C_r(i, j), & \text{if } C_r(i, j) < \tau_c \\ \gamma, & \text{if } C_r(i, j) \geq \tau_c \end{cases} \quad (14)$$

where $\tau_c=0.1d$, $\gamma=0.5d$ and d is the image diagonal in pixels. If the alignment error is low, the cost may be equal to the alignment cost; however, if the alignment error is determined as being too large, the cost may be truncated to a large cost (e.g., in this case is half the diagonal of the image).

To achieve the desired hyperlapse speed v, a velocity cost term may be indicated as:

$$C_v(i,j)=\min(\|(j-i)-\bar{v}\|^2, \tau_v), \quad (15)$$

which is a truncated $L_2$ on the difference between the jump from frame i to j and the target speed $\bar{v}$. Further, an example acceleration cost term may be used to avoid sudden acceleration:

$$C_a(h,i,j)=\min(\|(j-i)-(i-h)\|^2, \tau_a) \quad (16)$$

For example, the acceleration penalty may make speed change more gradual. For example, $\tau_v=200$ and $\tau_a=80$ may be chosen empirically.

In order to make the hyperlapse speed change with video content, each frame may be assigned an importance score based on the number of RoIs in each frame:

$$s_i=\bar{s}+k(\#\ RoI)_i, \quad (17)$$

where $\bar{s}$ is the base score to ensure the score is not zero for every frame, $(\#\ RoI)_i$ is the number of RoIs in frame i, and k is a constant. For example, $s_0=0.05$ and $k=0.1$ may be chosen; however, the results are not sensitive to the exact value of these parameters. For example, Gaussian filtering may be applied to the importance scores to make the score change gradually between frames. For example, a cost term may be defined that computes the difference between the cumulative importance scores and the base score $\bar{s}$:

$$C_s(i,j)=\Sigma_{p=i}^{j}(s_t-\bar{s})^2 \quad (18)$$

In most frames of the video, there may be no regions of interest and thus the frame selection may be controlled by the alignment cost, velocity, and acceleration terms. For frames with higher scores, the example technique may tend to sample frames densely and thus the speed may be slowed down.

An example overall cost function for frame selection may be indicated as:

$$C(h,i,j)=C_m(i,j)+w_sC_s(i,j)+w_vC_v(i,j)+w_aC_a(h,i,j). \quad (19)$$

Reducing and/or minimizing the cost function of Equation (19) can be a discrete optimization problem. For example, the dynamic-time-warping (DTW) algorithm may be used to compute the optimal path $p_{\tilde{t}}$ (see, e.g., Joshi et al., "Real-time hyperlapse creation via optimal frame selection," *ACM Transactions on Graphics*, Vol. 34, Issue 4, August 2015).

For example, in time series analysis, dynamic time warping (DTW) may be used for measuring similarity between two temporal sequences which may vary in speed. For instance, similarities in walking may be detected using DTW, even if one person was walking faster than the other, or if there were accelerations and decelerations during the course of an observation. In general, DTW is a technique that calculates an optimal match between two given sequences (e.g. time series) with certain restrictions. The sequences are "warped" non-linearly in the time dimension to determine a measure of their similarity independent of certain non-linear variations in the time dimension. This sequence alignment method is often used in time series classification.

For example, frames may be selected based on frame alignment, saliency scores, and target hyperlapse speed. For instance, the translation between frames may be determined, and frames may be selected that have minimal alignment error.

For example, it may be desirable for cumulative saliency scores between two frames to be close to the average score. Therefore, if the saliency score is higher, the technique may sample more frames and thus, the video speed may be slowed down.

Again, the velocity and acceleration terms may control the smoothness of video speed. For example, dynamic programming may be used to solve this discrete optimization problem.

Figure 5B:
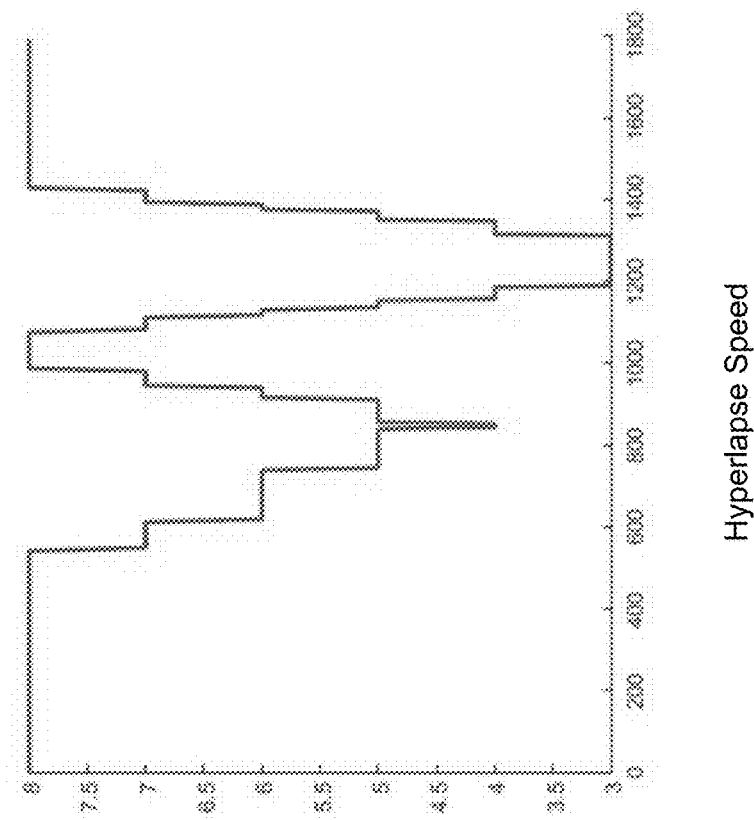
FIGS. 5A and 5B depict frame selection and the corresponding hyperlapse speed.
Figure 5A:
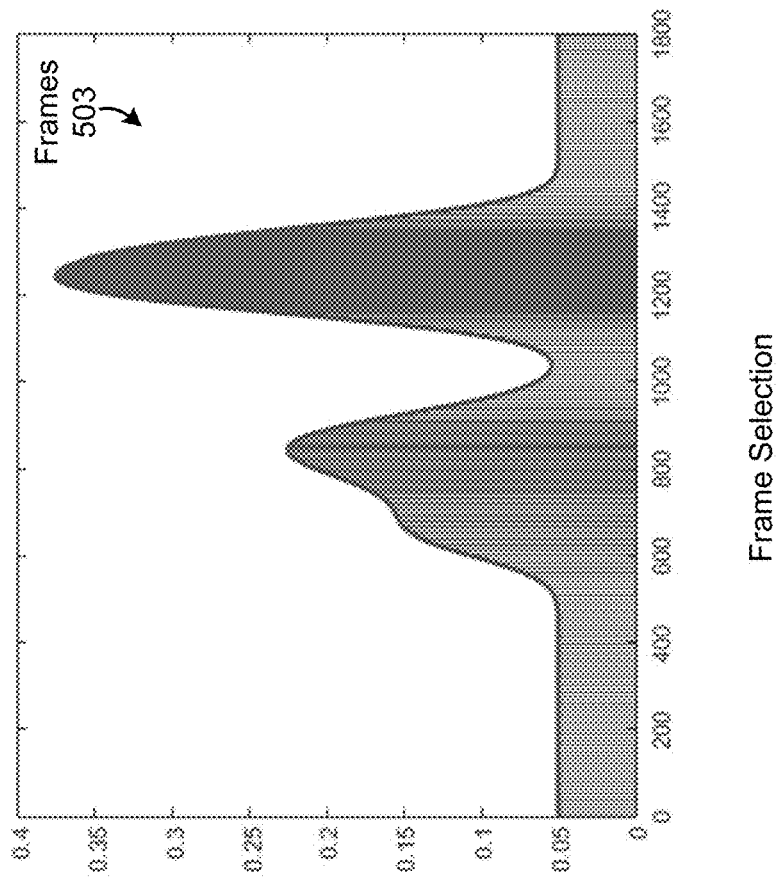

An example of frame selection and the corresponding hyperlapse speed is shown in representations 500A and 500B of FIGS. 5A and 5B (e.g., saliency scores and the sampling rate). For instance, frames may be selected based on target speed, frame alignment, and saliency weights. FIG. 5A illustrates example scores 502 associated with frame selection of sampled frames 503, while FIG. 5B illustrates example frame velocity 504. As can be seen in FIGS. 5A and 5B, the example technique may sample more frames when the score is substantially high, and the video speed may become slower in these frames.

Example techniques for path refining 132 and rendering 135 (FIG. 1A) are discussed below.

The example frame selection 130 (FIG. 1A) may select a set of frames with minimal alignment error, but the video may still have obvious jump if the selected frames jump unacceptably. Therefore, it may be desirable to stabilize the camera path again to generate a smoothed hyperlapse result.

Since frames are already projected to perspective view, a standard video stabilization technique may be utilized. For example, the single-path version of Liu et al. (see, e.g., Liu et al., "Bundled camera paths for video stabilization," *ACM Transactions on Graphics—SIGGRAPH Conference Proceedings*, Vol. 32, Issue 4, 2013) computes a sequence of frame-to-frame transformations and smooths the chain of transformations to stabilize the camera path. For example, the feature trajectories from KLT tracking may be re-used, and the frame transformation matrix that includes translation, rotation, and scaling may be determined. Let $P_t$ be the camera pose at frame t, which can be indicated as the chain of transformation matrix:

$$P_t = H_t P_{t-1} = H_t H_{t-1} \ldots H_0 \quad (20)$$

where $H_t$ is the transformation matrix that warps features in frame t−1 to frame t, and $H_0$ is the identity matrix. For example, an optimal path $\overline{P}$ may be determined by minimizing the following function:

$$E(\overline{P}) = \Sigma_t(\|\overline{P}_t - P_t\|^2 + \lambda \Sigma_{r \in \Omega_t} w_{t,r} \|\overline{P}_t - \overline{P}_r\|^2) \quad (21)$$

Since Equation (21) is quadratic, the Jacobi-based iterative method may be used to solve it:

$$\overline{P}_t^{k+1} = \frac{1}{\gamma} P_t + \sum_{r \in \Omega_t} \frac{2\lambda w_{t,r}}{\gamma} \overline{P}_r^{(k)}, \quad (22)$$

where $\gamma = 1 + 2\lambda \Sigma_{r \in \Omega_t} w_{t,r}$ and k is an iteration index. The weight $w_{t,r}$ is a Gaussian function $w_{t,r} = e^{-(t-r)^2/2\sigma_t^2}$. For example, $\lambda = 5$ and $\Omega_t$ may be chosen to be 60 neighboring frames. For instance, iterating 10 times may optimize the camera paths. After path optimization, the warping matrix may be computed for each frame by $B_t = \overline{P}_t P_t^{-1}$, and the corresponding frames may be warped to generate the final hyperlapse videos.

Figure 6B:
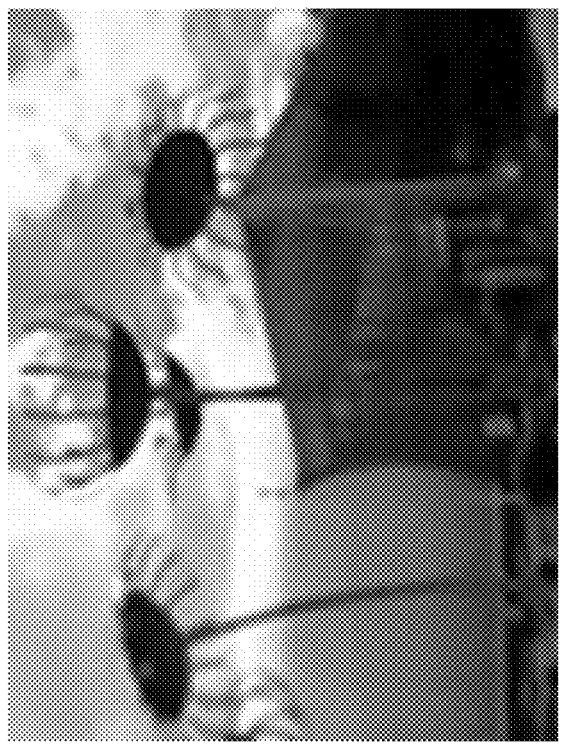
FIGS. 6A and 6B illustrate example zooming effects.
Figure 6A:
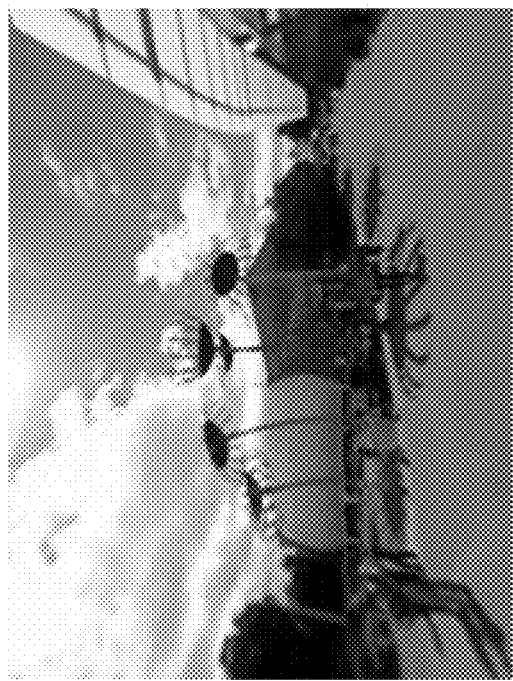
Figure 8D:
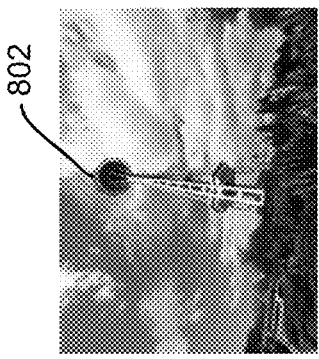
FIGS. 8A-8J illustrate an example hyperlapse result of a video sequence with user-annotated RoIs.
Figure 8C:
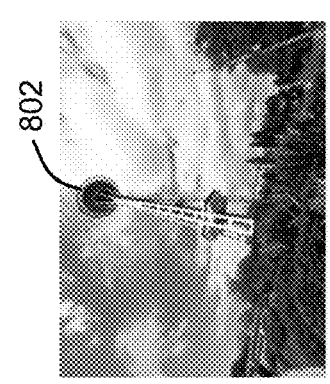
Figure 8B:
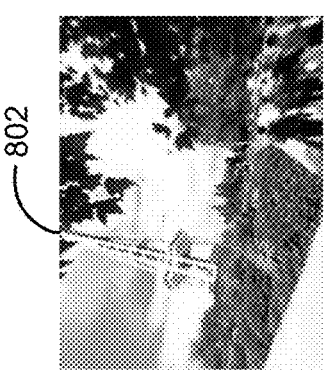
Figure 8A:
Figure 8H:
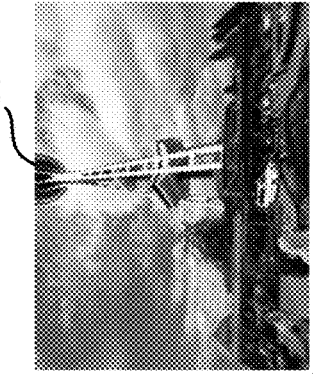
Figure 8G:
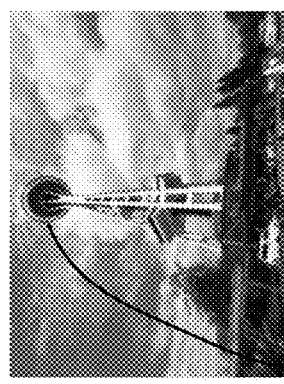
Figure 8F:
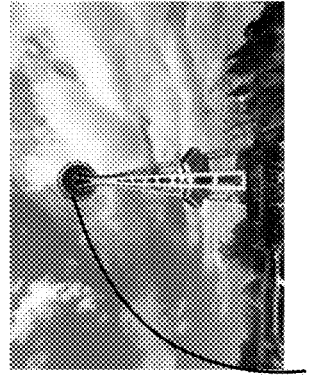
Figure 8E:
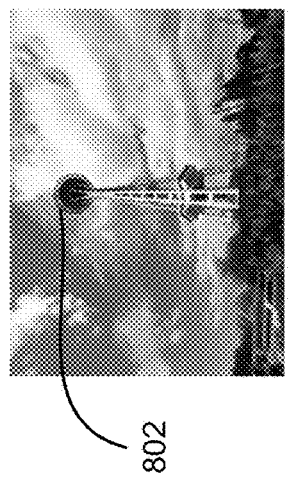
Figure 8J:
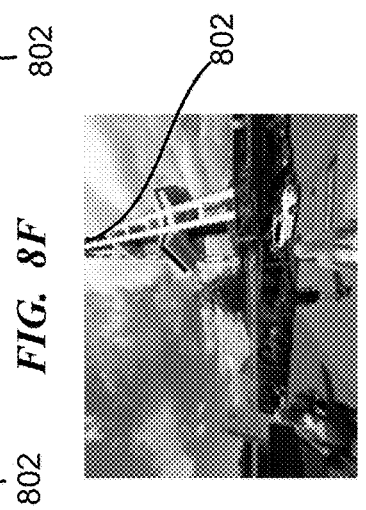
Figure 8I:
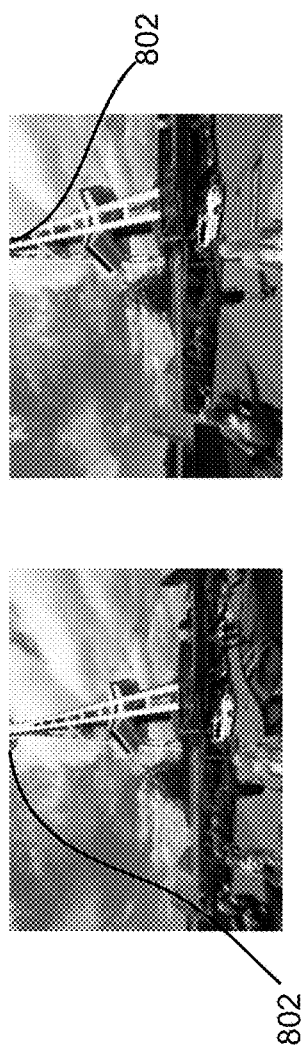
Figure 9A:
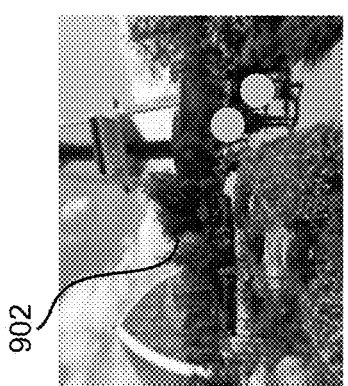
FIGS. 9A-9J illustrate an example hyperlapse result of a video sequence with user-annotated RoIs.
Figure 9B:
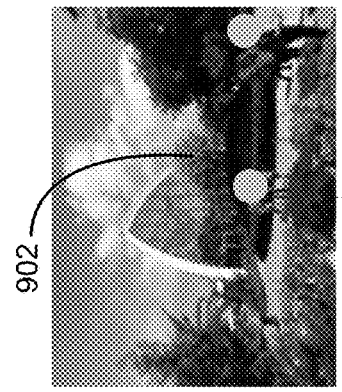
Figure 9C:
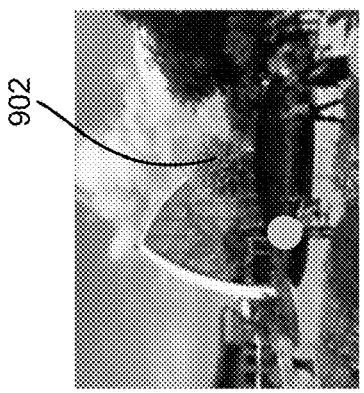
Figure 9D:
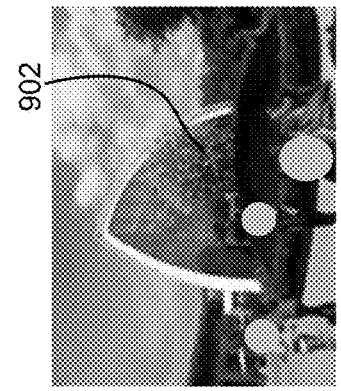
Figure 9E:
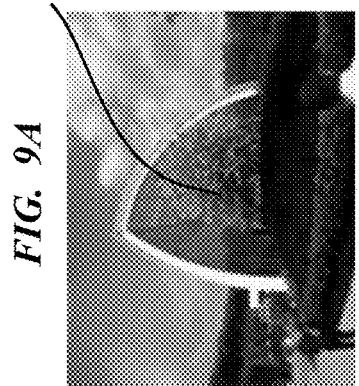
Figure 9F:
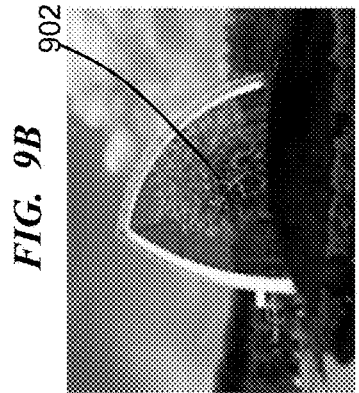
Figure 9G:
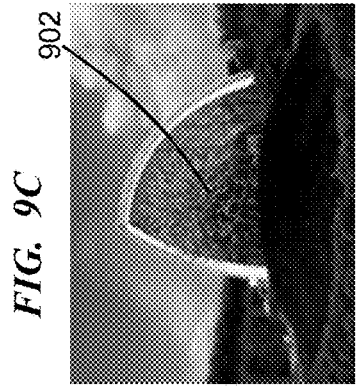
Figure 9H:
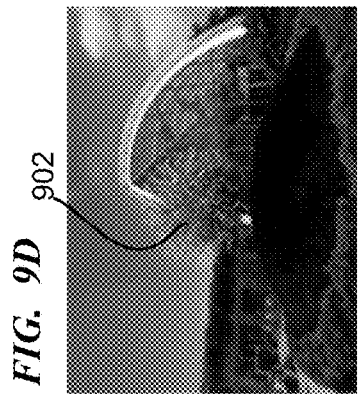
Figure 9I:
Figure 9J:
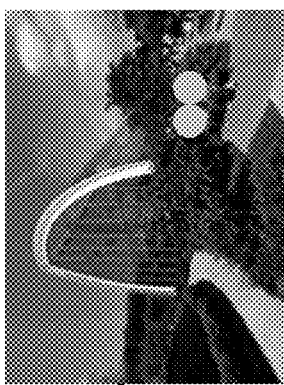
Figure 10D:
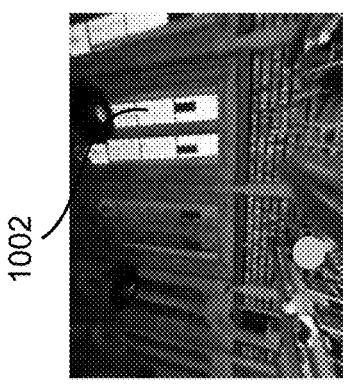
FIGS. 10A-10J illustrate an example hyperlapse result of a video sequence with user-annotated RoIs.
Figure 10C:
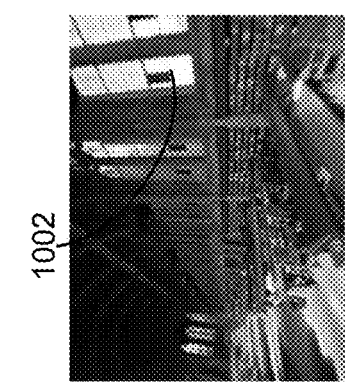
Figure 10B:
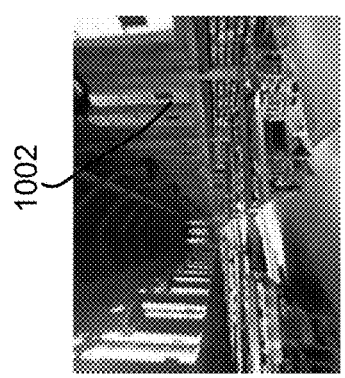
Figure 10A:
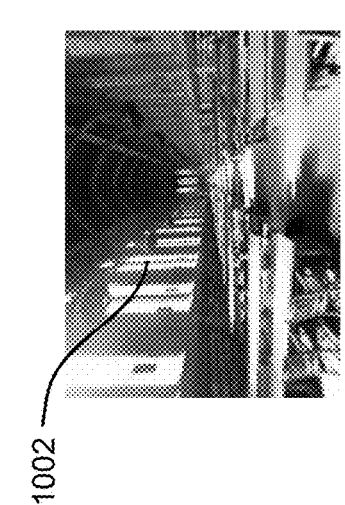
Figure 10H:
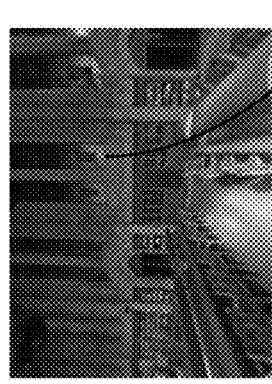
Figure 10G:
Figure 10F:
Figure 10E:
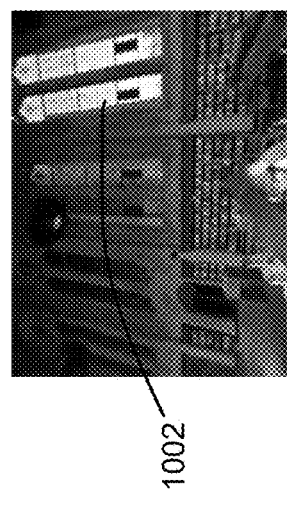
Figure 10J:
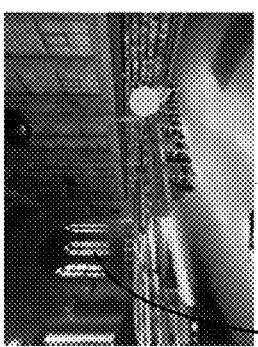
Figure 10I:
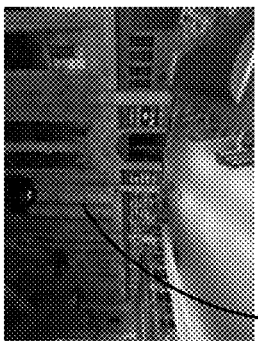

For example, a zooming effect may be added to the video by changing the field of view (FOV). For example, the FOV of each frame may be set based on the frame speed:

$$\text{fov}_t = \text{fov}_0 - w_z(v_t - \overline{v}), \quad (23)$$

where $\text{fov}_0$ is the default FOV set by users, $w_z$ is the weight to control the amount of zooming. For example, to make the camera zoom more gradually, $\text{fov}_t$ may be smoothed, by minimizing the following example cost function:

$$\sum_{t=1}^{T'} (\hat{f}\overline{o}\overline{v}_t - f\overline{o}v_t)^2 + \lambda_f (\hat{f}\overline{o}\overline{v}_t - \hat{f}\overline{o}\overline{v}_{t-1})^2 \quad (24)$$

where T' is the number of output frames and $\lambda t$ controls the smoothness of FOV. FIGS. 6A and 6B illustrate example zooming effects on an image represented at 600A and 600B. In this example, FIG. 6A illustrates the zooming effect 602 with no zoom (e.g., base image), and FIG. 6B illustrates the zooming effect 604 with zoom (e.g., zoomed image).

A few results of an example hyperlapse that automatically select regions of interest are shown in FIGS. 7A-7J. For example, FIGS. 7A-7J illustrate an example hyperlapse result of a "SPACE NEEDLE" sequence using "building" 702 as interesting regions. In this example, buildings are automatically identified as regions of interest. In other examples, the user may be able to specify regions of interest and/or may be able to weight categories by potential interest. For instance, one user may specify buildings while another user specifies faces and waterfalls. In some of these implementations, a GUI may be available that lists categories of regions of interests. The user can select (and/or select and weight) individual categories of interest to them. In the absence of user selection, the system can employ default settings.

Example results by using user-annotated points as RoIs are shown in FIGS. 8A-8J, FIGS. 9A-9J, and FIGS. 10A-10J.

In one example, FIGS. 8A-8J illustrate an example hyperlapse result of a "SPACE NEEDLE" sequence with user-annotated RoIs. As shown in FIGS. 8A-8J, a user has selected the top of the SPACE NEEDLE 802 as an interesting point.

In another example, FIGS. 9A-9J illustrate an example hyperlapse result of a "CHIHULY" sequence with user-annotated RoIs. As shown in FIGS. 9A-9J, a user has selected a yellow glass tree 902 as an interesting point.

In a further example, FIGS. 10A-10J illustrate an example hyperlapse result of a "University of Washington Library" sequence with user-annotated RoIs. As shown in FIGS. 10A-10J, a user has selected windows 1002 as interesting regions.

Figure 11A:
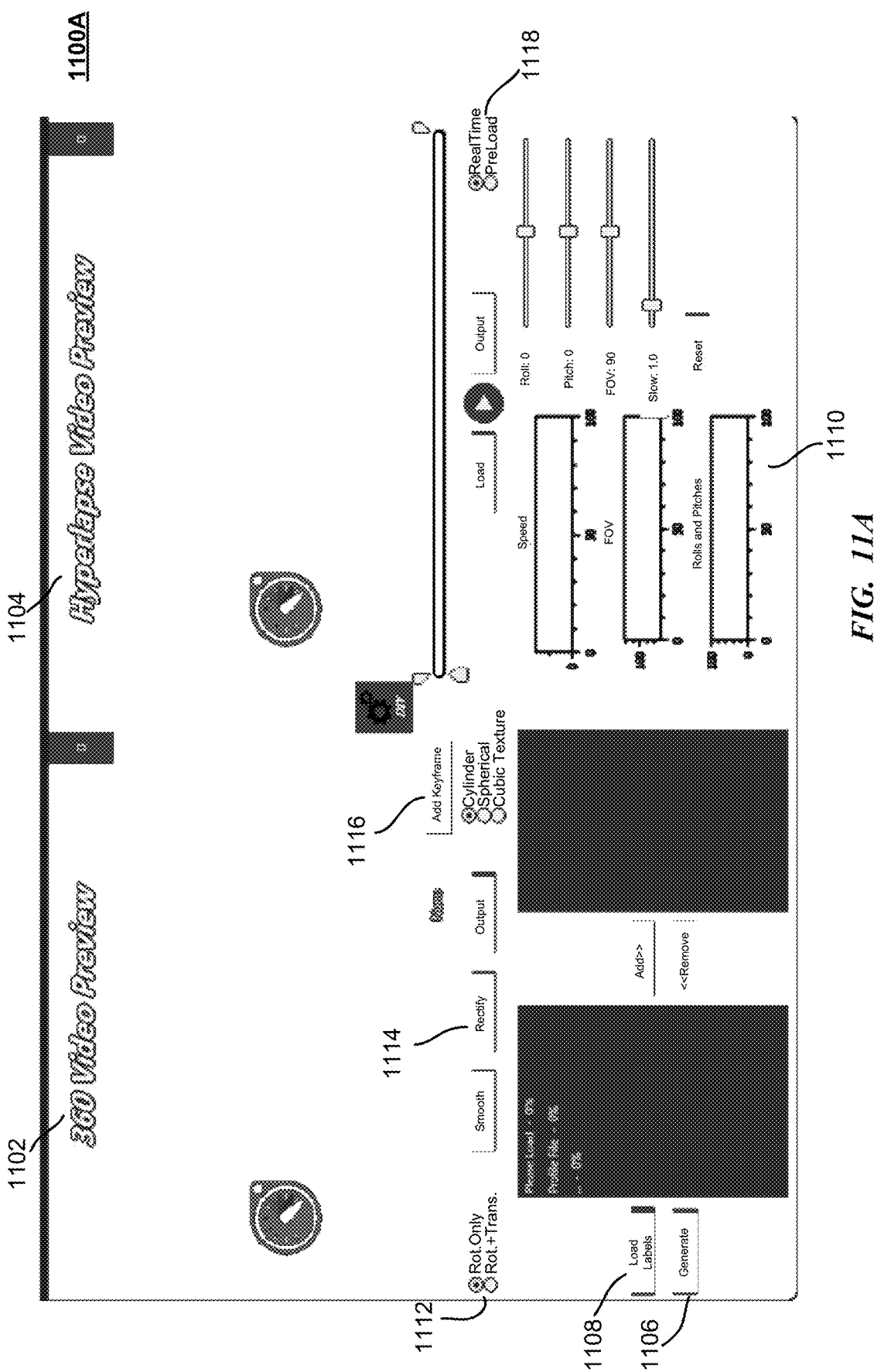
FIGS. 11A-11B depict an example Graphical User Interface.
Figure 11B:
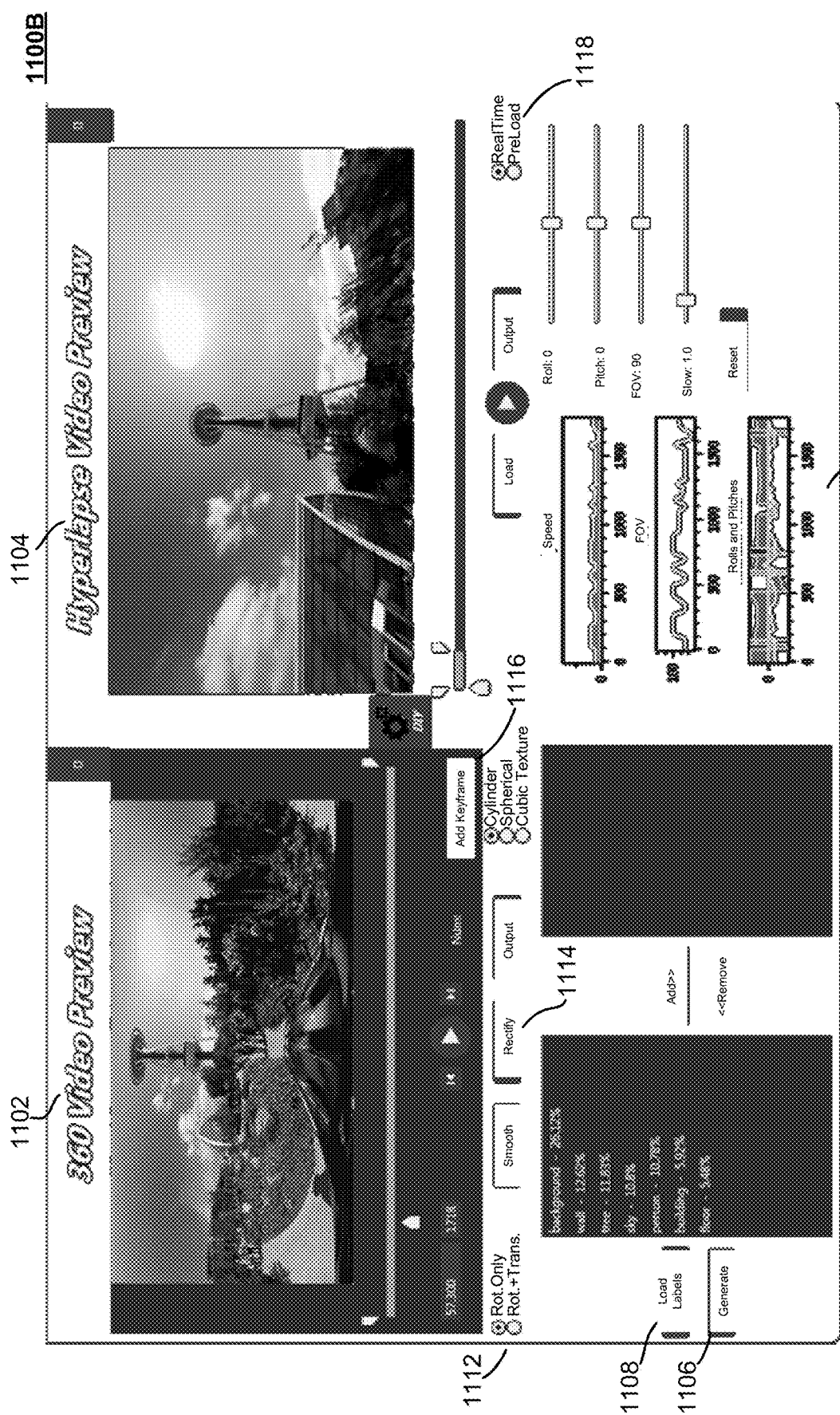

FIGS. 11A-11B depict an example Graphical User Interface (GUI) 1100 (e.g., 1100A in FIGS. 11A and 1100B in FIG. 11B), in accordance with the GUI 106 of FIG. 1. One skilled in the art of computing will understand that there are many types of interfaces that may be used for the GUI 106 discussed with regard to FIG. 1A, without departing from the discussion herein. As shown in FIGS. 11A-11B, a 360 video preview area 1102 may display the parsed semantic information (e.g., as in FIG. 1A). A hyperlapse preview area 1104 may display output hyperlapses 134 as rendered results (e.g., as in FIG. 1A). In some cases, users may be allowed to select their preferences by generating their own labels at and/or loading predefined labels. The user can also change camera settings (e.g., hyperlapse speed and field-of-view). For example, as shown in FIGS. 11A-11B, the user may generate labels 1106 or load already-generated labels 1108 to select their preferences. For instance, users may be allowed to select their preferences (e.g., at 1106 and/or 1108) and/or change camera settings 1110 (e.g., hyperlapse speed and field-of-view). As shown in FIGS. 11A-11B, the user may change camera settings 1110 (e.g., hyperlapse speed and field-of-view) by using slider bars for Roll, Pitch, FOV, and Speed.

As shown in FIGS. 11A-11B, the user may select rotation only, or rotation and translation 1112, as well as smooth, rectify, or output 1114. Further, the user may select add keyframe 1116, as well as realtime or preload 1118.

In one such example, an application for implementing the GUI of FIGS. 11A-11B may be written in any suitable computer-understandable language (or in hardware). For example, the application may be written using C++, C #, and/or any other suitable language. For instance, the application may be written using a 360-degree video stabilization module 105, a camera path planning engine 126, view planning module 138, a refining/smoothing module 142, and/or a rendering module/engine 144.

For example, a system implementing the techniques discussed with regard to FIGS. 1A-1B may include an input module configured to input the 360-degree video 102 and a video stabilization module 105, as discussed with regard to FIGS. 1A-1B. The system may also include the GUI 106, content analysis engine 109, camera path planning engine 126, and/or an interface for outputting (e.g., displaying) the generated hyperlapse 134. The content analysis engine may include semantic segmentation module 111, saliency detection module 113, and/or focus of expansion detection (e.g., determination) module 117 (as discussed above). The camera path planning engine may include view planning module 138, frame selection module 140, and/or path refining/smoothing module 142 (as discussed above, and as shown in FIGS. 1A-1B).

Example techniques are discussed herein for creating semantic-driven hyperlapse from 360° videos. An example system may provide content-aware panning and speed variation, and a GUI that supports 360° stabilization, rectification, camera profiles creation, and real-time video rendering.

For example, the 360° video content may be analyzed by semantic segmentation and saliency detection, to extract interesting regions or objects to guide the camera path planning. As discussed, an example path planning technique may automatically determine a smoothed camera path that revolves around the visual emphasis with variable speed. An example (potentially) optimal frame selection and 2D video stabilization may be used to efficiently generate smoothed hyperlapses.

An example graphical user interface (such as GUI 106 of FIGS. 1A and 1B) can allow users to select their preferences, change camera settings, and/or rectify the input video. An example GUI may be used to customize the hyperlapse. Example techniques discussed herein may generate interesting hyperlapses that match users' preferences.

II. Example Operating Environment

Features discussed herein are provided as example techniques that may be implemented in many different ways that may be understood by one skilled in the art of computing, without departing from the discussion herein. Such features are to be construed only as example features, and are not intended to be construed as limiting to only those detailed descriptions.

Figure 12:
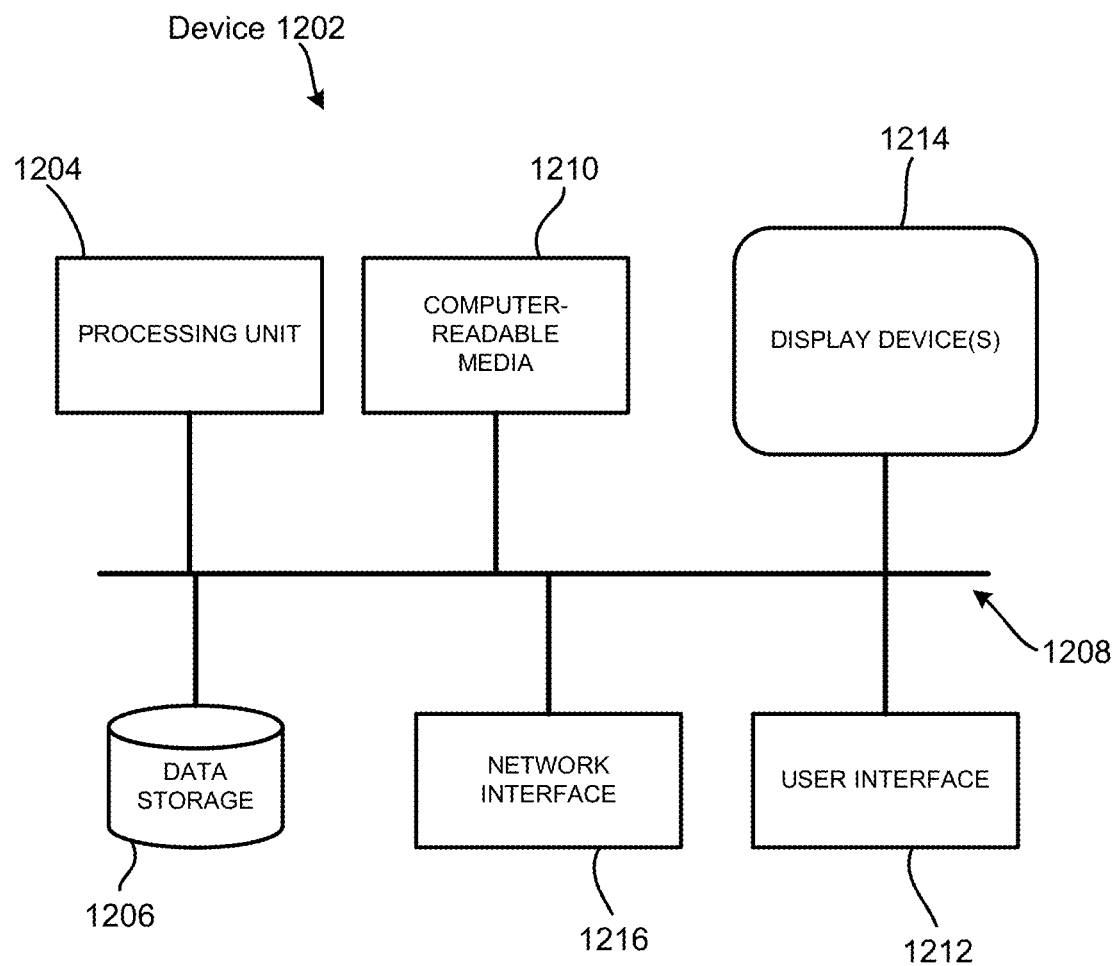
FIG. 12 is a block diagram of an example architecture for an example system for controlling generation of hyperlapse from 360-degree videos.

FIG. 12 illustrates an example of a suitable computing and networking environment (e.g., system) 1200 on which the examples of FIGS. 1A-11B may be implemented. The computing environment can include one or more devices 1202.

Example computing environment components, such as on device 1202 may include, but are not limited to, various hardware components, such as processing unit 1204, data storage 1206, such as a system memory, and/or system bus 1208 that couples various system components including the data storage 1206 to the processing unit 1204.

The system bus 1208 may be any of several types of bus structures including a memory bus or memory controller, a peripheral bus, and/or a local bus using any of a variety of bus architectures. By way of example, and not limitation, such architectures may include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus, Peripheral Component Interconnect Extended (PCI-X) bus, Advanced Graphics Port (AGP), and PCI express (PCIe).

The data storage 1206, such as system memory (e.g., hardware memory), may include computer-readable media 1210 in the form of volatile and/or nonvolatile memory such as read only memory (ROM) and random access memory (RAM). Nonvolatile memory may be substituted for some or all of the ROM and/or the RAM. For example, memristor memory, phase-change memory (PCM), or some other type of nonvolatile memory may be used instead of, or in addition to, the ROM and/or the RAM.

The computer-readable media 1210 may be any available media that can be accessed by the computing environment 1200 and may include both volatile and nonvolatile media, and removable and non-removable media, but is not implemented as propagated signals per se. Thus, as used herein, the term "computer-readable storage medium" is not a signal per se, nor any type of propagating signal per se.

By way of example, and not limitation, computer-readable media 1210 may comprise computer storage media and communication media. Computer storage media includes volatile and nonvolatile, removable and non-removable media implemented in any method or technology for storage of information such as computer-readable instructions, data structures, program modules or other data. Computer storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by the computing environment 1200. Communication media may embody computer-readable instructions, data structures, program modules or other data in a modulated data signal such as a carrier wave or other transport mechanism and includes any information delivery media. The term "modulated data signal" refers to a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above may also be included within the scope of computer-readable media. Computer-readable media may be embodied as a computer program product, such as software stored on computer storage media.

The data storage (or system memory) 1206 may include computer storage media in the form of volatile and/or nonvolatile memory such as read only memory (ROM) and random access memory (RAM). A basic input/output system (BIOS), containing the basic routines that help to transfer information between elements within computing environment 1200, such as during start-up, may be stored in ROM. RAM may contain data and/or program modules that are immediately accessible to and/or presently being operated on by processing unit 1204. By way of example, and not limitation, data storage 1206 may store an operating system, application programs, and other program modules and program data.

Data storage 1206 may also include other removable/non-removable, volatile/nonvolatile computer storage media. By way of example only, data storage 1206 may be a hard disk drive that reads from or writes to non-removable, nonvolatile magnetic media, a magnetic disk drive that reads from or writes to a removable, nonvolatile magnetic disk, and an optical disk drive that reads from or writes to a removable, nonvolatile optical disk such as a CD ROM or other optical media. Other removable/non-removable, volatile/nonvolatile computer storage media that can be used in the example computing environment 1200 include, but are not limited to, magnetic tape cassettes, flash memory cards, digital versatile disks, digital video tape, solid state RAM, solid state ROM, and the like. The drives and their associated computer storage media, described above and illustrated in FIG. 12, may provide storage of computer-readable instructions, data structures, program modules and other data for the computing environment 1200.

A user may enter commands and information through a user interface 1212 or other input devices such as a tablet, electronic digitizer, a microphone, keyboard, and/or pointing device, commonly referred to as mouse, trackball or touch pad. Other input devices may include a joystick, game pad, satellite dish, scanner, or the like. Additionally, voice inputs, gesture inputs using hands or fingers, or other natural user interface (NUI) may also be used with the appropriate input devices, such as a microphone, camera, tablet, touch pad, glove, or other sensor. These and other input devices may be connected to the processing unit 1204 through a user interface 1212 (that can be similar to GUI 106 of FIG. 1A) that is coupled to the system bus 1208, or may be connected by other interface and bus structures, such as a parallel port, game port, or a universal serial bus (USB). One or more display devices 1214 (e.g., a monitor) may also be connected to the system bus 1208 via an interface, such as a video interface. The display device(s) 1214 may also be integrated with a touch-screen panel or the like. For example, a monitor and/or touch screen panel may be physically coupled to a housing in which the computing environment 1200 is incorporated, such as in a tablet-type personal computer. In addition, computers such as the computing environment 1200 may also include other peripheral output devices such as speakers and printers, which may be connected through an output peripheral interface or the like.

The computing environment 1200 may operate in a networked or cloud-computing environment using logical connections, such as a network interface 1216 to one or more remote devices, such as a remote computer. The remote computer may be a personal computer, a server, a router, a network PC, a peer device or other common network node, and may include many or all of the elements described above relative to the computing environment 1200. The logical connections depicted in FIG. 12 may include one or more local area networks (LANs) and one or more wide area networks (WANs), but may also include other networks. Such networking environments may be used in offices, enterprise-wide computer networks, intranets, and the Internet.

When used in a networked or cloud-computing environment, the computing environment 1200 may be connected to a public or private network through a network interface 1216. In some embodiments, a modem or other means may be used for establishing communications over the network. A modem, which may be internal or external, may be connected to the system bus 1208 via the network interface 1216 or other appropriate mechanism. A wireless networking component, which for example may include an interface and antenna, may be coupled through a suitable device such as an access point or peer computer to a network. In a networked environment, program modules depicted relative to the computing environment 1200, or portions thereof, may be stored in the remote memory storage device. It may be appreciated that the network connections shown are merely examples, and other means of establishing a communications link between the computers may be used.

In this context, processing unit 1204 or "processor" may include a single processor or multiple processors configured to process instructions associated with a computing system. A processor may thus include one or more processors executing instructions in parallel and/or in a distributed manner. For example, the system shown in FIG. 12 may include one or more processors (e.g., hardware processors).

Implementations of the various techniques described herein may be implemented in digital electronic circuitry, or in computer hardware, firmware, software, or in combinations of them (e.g., an apparatus configured to execute instructions to perform various functionality).

A computer program, such as the computer program(s) described above, can be written in any form of programming language, including compiled, interpreted, or machine languages, and can be deployed in any form, including as a stand-alone program or as a module, component, subroutine, or other unit suitable for use in a computing environment. The computer program may be tangibly embodied as executable code (e.g., executable instructions) on a machine usable or machine readable storage device (e.g., a computer-readable medium). A computer program that might implement the techniques discussed above may be deployed to be executed on one computer or on multiple computers at one site or distributed across multiple sites and interconnected by a communication network.

Method steps may be performed by one or more programmable processors executing a computer program to perform functions by operating on input data and generating output. The one or more programmable processors may execute instructions in parallel, and/or may be arranged in a distributed configuration for distributed processing. Example functionality discussed herein may also be performed by, and an apparatus may be implemented, at least in part, as one or more hardware logic components.

To provide for interaction with a user, implementations may be implemented on a computer having a display device, e.g., a cathode ray tube (CRT), liquid crystal display (LCD), or plasma monitor, for displaying information to the user and a keyboard and a pointing device by which the user can provide input to the computer. Other kinds of devices can be used to provide for interaction with a user as well; for example, feedback provided to the user can be any form of sensory feedback, e.g., visual feedback, auditory feedback, or tactile feedback. For example, output may be provided via any form of sensory output, including (but not limited to) visual output (e.g., visual gestures, video output), audio output (e.g., voice, device sounds), tactile output (e.g., touch, device movement), temperature, odor, etc.

Further, input from the user can be received in any form, including acoustic, speech, or tactile input. For example, input may be received from the user via any form of sensory input, including (but not limited to) visual input (e.g., gestures, video input), audio input (e.g., voice, device sounds), tactile input (e.g., touch, device movement), temperature, odor, etc.

Further, a natural user interface (NUI) may be used to interface with a user. In this context, a "NUI" may refer to any interface technology that enables a user to interact with a device in a "natural" manner, free from artificial constraints imposed by input devices such as mice, keyboards, remote controls, and the like.

Examples of NUI techniques may include those relying on speech recognition, touch and stylus recognition, gesture recognition both on a screen and adjacent to the screen, air gestures, head and eye tracking, voice and speech, vision, touch, gestures, and/or machine intelligence. Example NUI technologies may include, but are not limited to, touch sensitive displays, voice and speech recognition, intention and goal understanding, motion gesture detection using depth cameras (e.g., stereoscopic camera systems, infrared camera systems, RGB (red, green, blue) camera systems and/or combinations of these), motion gesture detection using accelerometers/gyroscopes, facial recognition, 3D displays, head, eye, and gaze tracking, immersive augmented reality and virtual reality systems, all of which may provide a more natural interface, and technologies for sensing brain activity using electric field sensing electrodes (e.g., electroencephalography (EEG) and related techniques).

Implementations may be implemented in a computing system that includes a back end component (e.g., as a data server), or that includes a middleware component (e.g., an application server), or that includes a front end component (e.g., a client computer having a graphical user interface or a Web browser through which a user can interact with an implementation), or any combination of such back end, middleware, or front end components. Components may be interconnected by any form or medium of digital data communication (e.g., a communication network). Examples of communication networks include a local area network (LAN) and a wide area network (WAN) (e.g., the Internet).

The computing environment 1200 is only one example of a suitable computing environment on which aspects of the subject matter discussed herein may be implemented and is not intended to suggest any limitation as to the scope of use or functionality of the subject matter discussed herein. Example techniques discussed herein may be operational with numerous other general purpose or special purpose computing system environments or configurations.

Aspects of the subject matter discussed herein are operational with numerous other general purpose or special purpose computing system environments or configurations. Examples of well-known computing systems, environments, configurations, and/or devices that may be suitable for use with aspects of the subject matter described herein comprise personal computers, server computers—whether on bare metal or as virtual machines, handheld or laptop devices, multiprocessor systems, microcontroller-based systems, set-top boxes, programmable and non-programmable consumer electronics, headsets, cameras, tablets, network PCs, mini-computers, mainframe computers, personal digital assistants (PDAs), gaming devices, printers, appliances including set-top, media center, and/or other appliances, automobile-embedded or attached computing devices, other mobile devices, phone devices including smart phones, cell phones, wireless phones, and wired phones, distributed computing environments that include any of the above systems or devices, and the like. While various embodiments may be limited to one or more of the above devices, the term computer is intended to cover the devices above unless otherwise indicated.

III. Flowchart Description

Features discussed herein are provided as example techniques that may be implemented in many different ways that may be understood by one skilled in the art of computing, without departing from the discussion herein. Such features are to be construed only as example features, and are not intended to be construed as limiting to only those detailed descriptions.

Figure 13A:
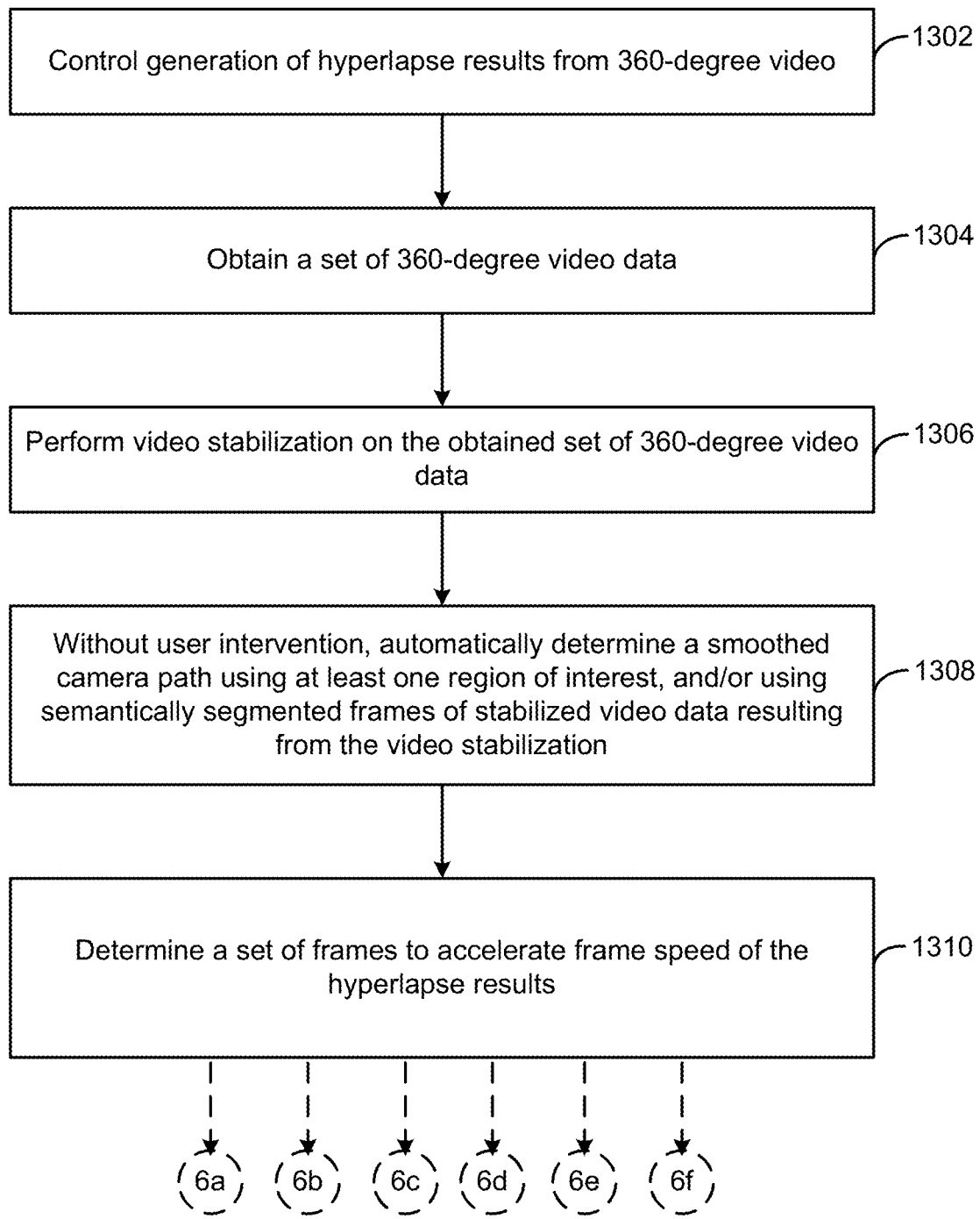

FIGS. 13A-13C are flowcharts 1300A, 1300B, and 1300C, respectively illustrating example operations of the system of FIG. 12 or other system, according to example embodiments. As shown in the example of FIG. 13A, generation of hyperlapse results from 360-degree video may be controlled at 1302. A set of 360-degree video data may be obtained at 1304.

Video stabilization may be performed on the obtained set of 360-degree video data at (1306).

Without user intervention, a smoothed camera path may be determined using at least one region of interest, and/or using semantically segmented frames of stabilized video data resulting from the video stabilization at 1308. A set of frames may be determined to accelerate frame speed of the hyperlapse results at 1310. A 360-degree rendering of display of the hyperlapse results may also be initiated.

In some examples, determining the smoothed camera path may include determining the smoothed camera path using at least one region of interest and at least one focus of expansion, wherein the at least one region of interest is determined using saliency detection (1312), in FIG. 13B.

For example, determining the smoothed camera path may include determining the smoothed camera path by minimizing a cost function that includes a term that enforces following regions of interest, by the smoothed camera path at 1314.

For instance, determining the set of frames may include determining the set of frames to automatically reduce velocity of the hyperlapse results, by the smoothed camera path, when a distance to a region of interest becomes less than a predetermined threshold value at 1316.

For example, determining the set of frames may include determining the set of frames to automatically follow a focus of expansion point of the obtained 360-degree video data, by the smoothed camera path at 1318, in FIG. 13C.

For instance, determining the set of frames may include determining the set of frames to automatically change direction of the smoothed camera path when a distance to at least one region of interest becomes less than a predetermined threshold value at 1320.

For example, concurrent display of a preview of the 360-degree video and a preview of the hyperlapse results may be initiated at 1322.

In some examples, user input that includes at least one user-selected identification of an object that is indicated as an interesting object may be obtained at 1324.

Figure 14A:
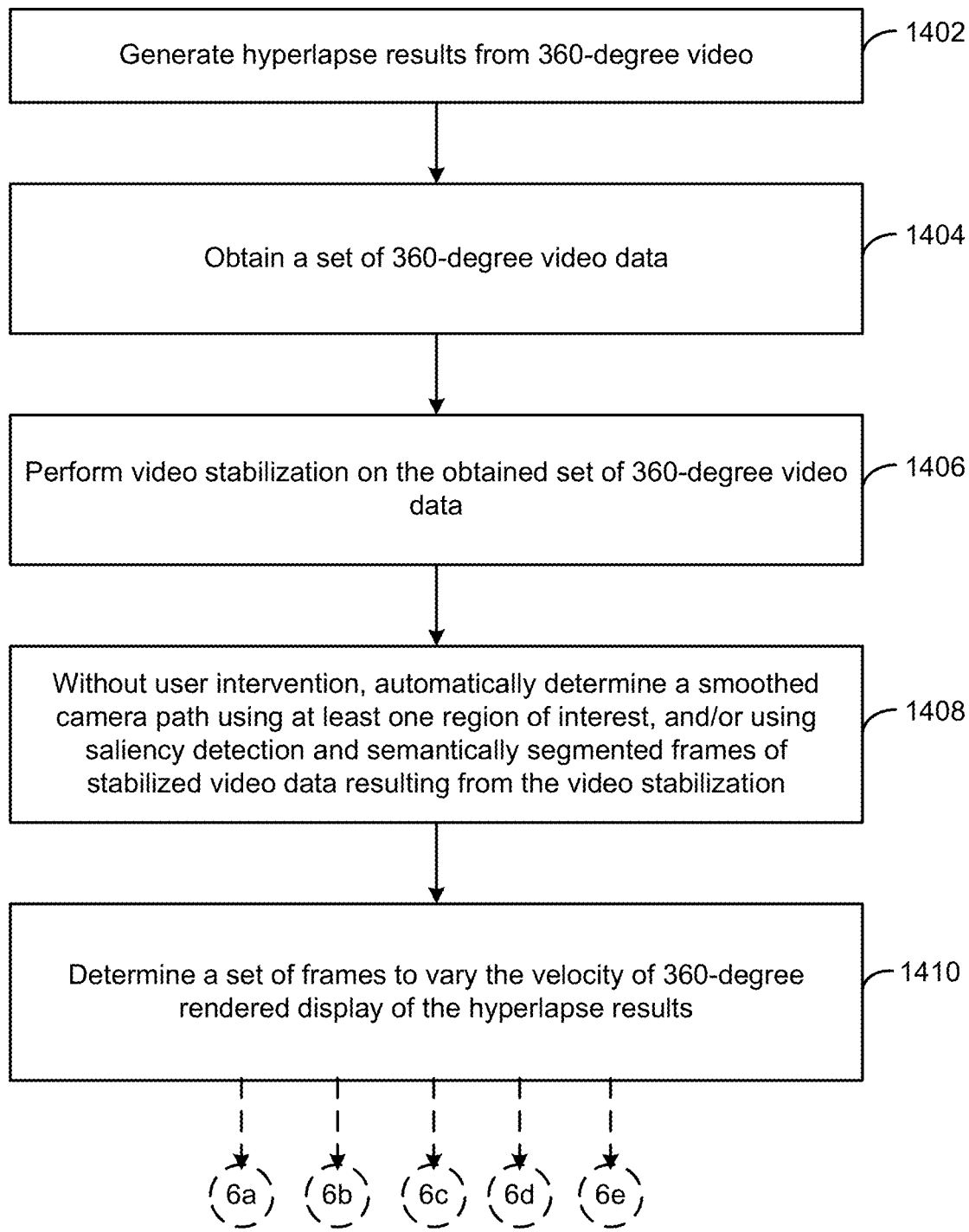
FIGS. 14A-14C are flowcharts illustrating example operations of the system of FIG. 12 and/or other systems.
Figure 14B:
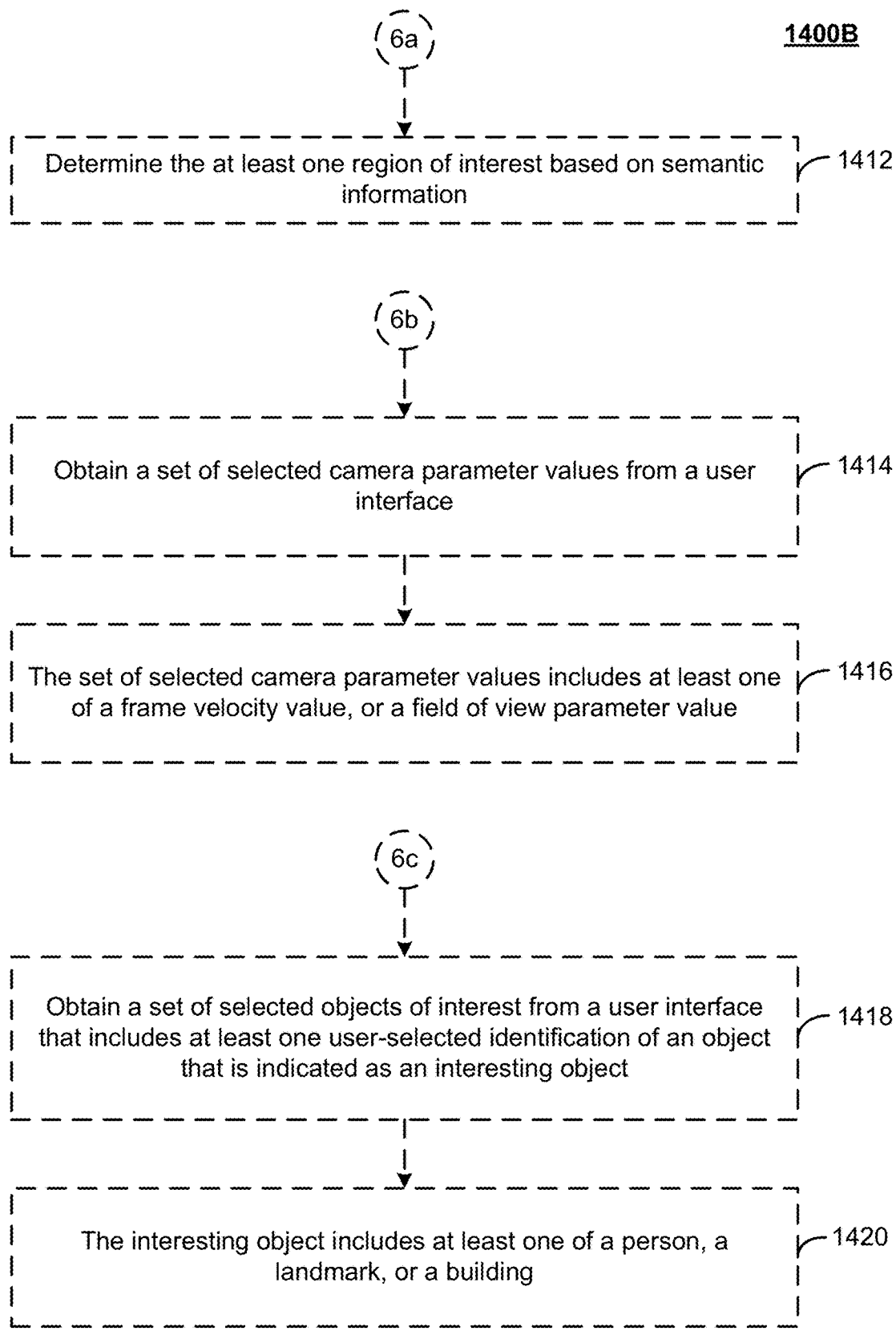
Figure 14C:
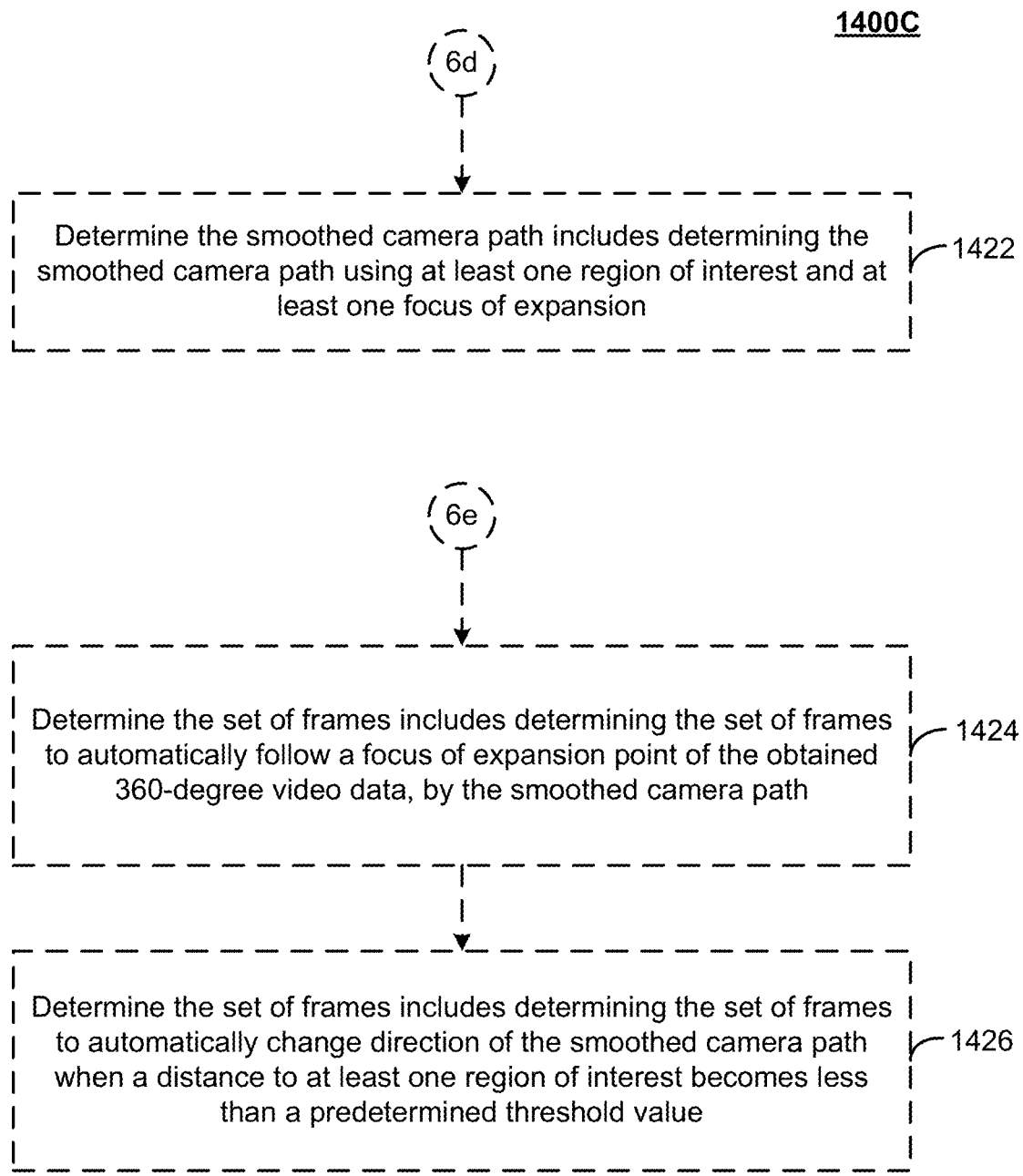

FIGS. 14A-14C are flowcharts 1400A, 1400B, and 1400C, respectively illustrating example operations of the system of FIG. 12, according to example embodiments. As shown in the example of FIG. 14A, hyperlapse results from 360-degree video may be generated at 1402.

A set of 360-degree video data may be obtained at 1404. Video stabilization may be performed on the obtained set of 360-degree video data at 1406.

Without user intervention, a smoothed camera path may be automatically determined using at least one region of interest, and/or using saliency detection and semantically segmented frames of stabilized video data resulting from the video stabilization at 1408.

A set of frames to vary the velocity of 360-degree rendered display of the hyperlapse results may be determined at 1410.

For example, the at least one region of interest may be determined based on semantic information at 1412, in FIG. 14B.

In some examples, a set of selected camera parameter values may be obtained from a user interface at 1414.

For example, the set of selected camera parameter values may include at least one of a frame velocity value, or a field of view parameter value at 1416.

For instance, a set of selected objects of interest may be obtained from a user interface that includes at least one user-selected identification of an object that is indicated as an interesting object at 1418.

For example, the interesting object may include at least one of a person, a landmark, or a building at 1420.

In some examples, determining the smoothed camera path may include determining the smoothed camera path using at least one region of interest and at least one focus of expansion at 1422, in FIG. 14C.

For example, determining the set of frames may include determining the set of frames to automatically follow a focus of expansion point of the obtained 360-degree video data, by the smoothed camera path at 1424.

For instance, determining the set of frames may include determining the set of frames to automatically change direction of the smoothed camera path when a distance to at least one region of interest becomes less than a predetermined threshold value at 1426.

Figure 15A:
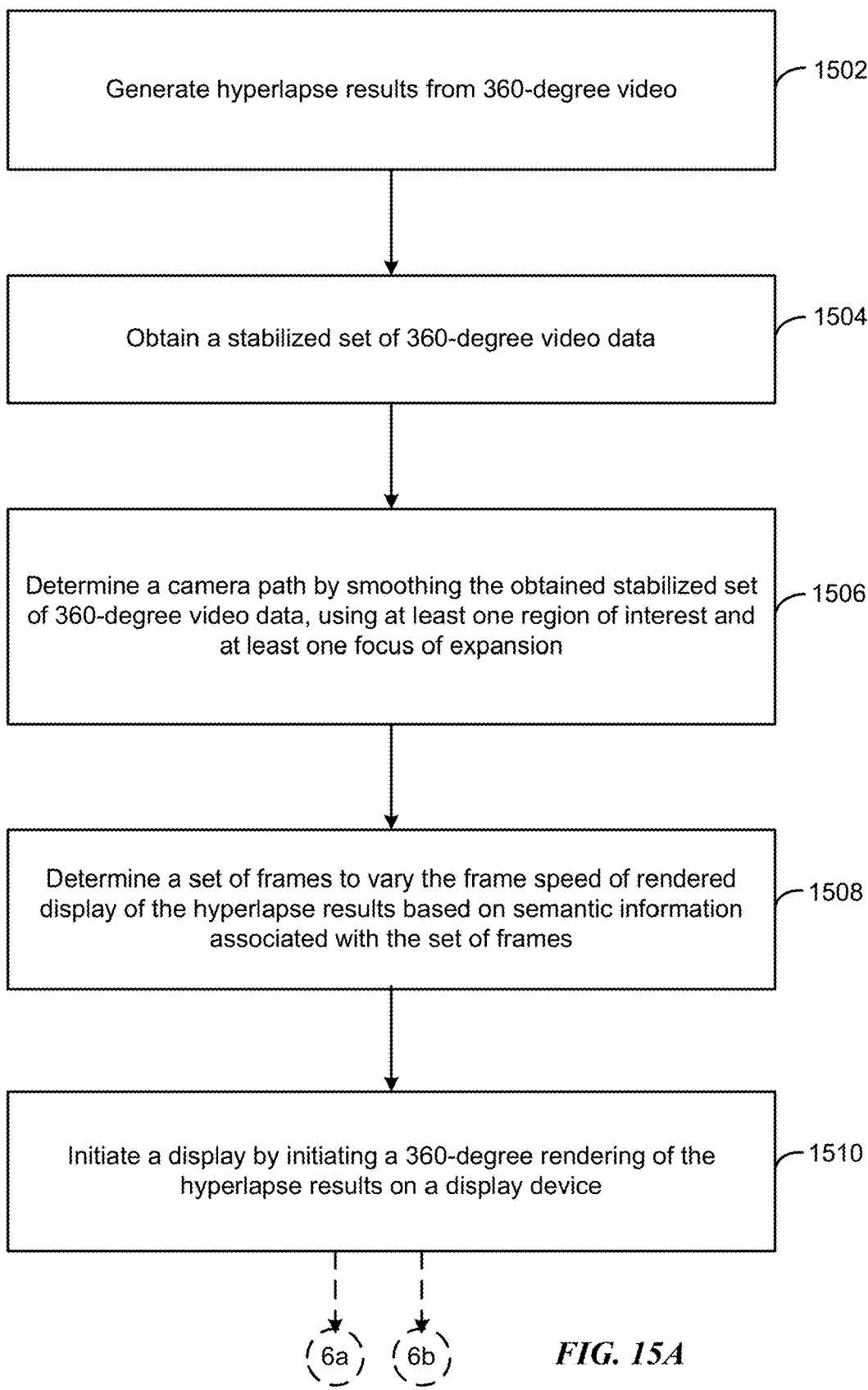

FIGS. 15A-15B are flowcharts 1500A and 1500B illustrating example operations of the system of FIG. 12 and/or other systems, according to example embodiments. As shown in the example of FIG. 15A, hyperlapse results may be generated from 360-degree video at 1502. A stabilized set of 360-degree video data may be obtained at 1504.

A camera path may be determined by smoothing the obtained stabilized set of 360-degree video data, using at least one region of interest and at least one focus of expansion at 1506. A set of frames to vary the frame speed of rendered display of the hyperlapse results may be determined based on semantic information associated with the set of frames at 1508.

A display may be initiated by initiating a 360-degree rendering of the hyperlapse results on a display device at 1510.

For example, the smoothed camera path may include determining the smoothed camera path by minimizing a cost function that includes a term that enforces following regions of interest, by the smoothed camera path, and to automatically change direction of the smoothed camera path when a distance to at least one region of interest becomes less than a predetermined threshold value at 1512, in FIG. 15B.

For example, each frame in the obtained stabilized set of 360-degree video data may be assigned an importance score based on the number of regions of interest included in each frame at 1514.

Figure 16:
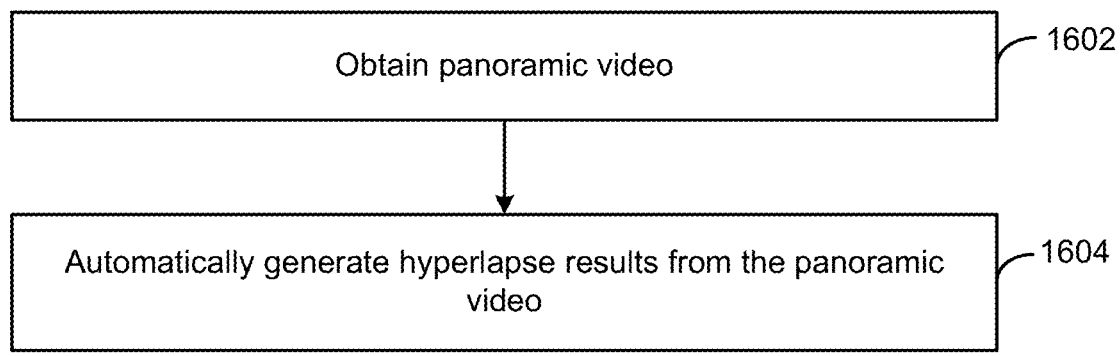
FIG. 16 is a flowchart illustrating example operations of the system of FIG. 12 and/or other systems.

FIG. 16 shows another flowchart 1600 illustrating example methods according to some embodiments. In this case, at 1602 the method can obtain panoramic video. At 1604, the method can automatically generate hyperlapse results from the panoramic video. The hyperlapse results can include a path along points of interest within the panoramic video and a frame velocity along the path slows when approaching the points of interest along the path and speeds up upon passing the points of interest.

In some cases the automatic generation of the hyperlapse can be accomplished by identifying the path and then determining the frame velocity based upon the path. In other cases the automatic hyperlapse generation can be accomplished by determining the frame velocity and then identifying the path. In still other cases, automatic hyperlapse generation can be accomplished by simultaneously determining the path and the frame velocity.

Various examples are described above and further examples are described below. One example involves a system for controlling generation of hyperlapse from wide-angled, panoramic video, and includes a hardware device processor and a memory storing executable instructions that, when executed, cause the hardware device processor to control generation of hyperlapse results from the wide-angled, panoramic video. A set of wide-angled, panoramic video data is obtained. Video stabilization is performed on the obtained set of wide-angled, panoramic video data. Without user intervention, a smoothed camera path is automatically determined using at least one region of interest. The at least one region of interest can be determined using semantic information, such as semantically segmented frames, in the stabilized video data. From one perspective, if the user does not indicate what kinds of objects are interesting, in some implementations the system will assume default objects of interest and/or the system will treat areas with motion as 'interesting.' Further, a set of frames can be determined to accelerate frame speed of the hyperlapse results. A wide-angled, panoramic rendering of display of the hyperlapse results can then be initiated.

For example, determining the smoothed camera path may include determining the smoothed camera path using at least one region of interest and at least one focus of expansion, wherein the at least one region of interest is determined using saliency detection.

For example, determining the smoothed camera path may include determining the smoothed camera path by minimizing a cost function that includes a term that enforces following regions of interest, by the smoothed camera path.

For instance, determining the set of frames may include determining the set of frames to automatically reduce velocity of the hyperlapse results, by the smoothed camera path, when a distance to a region of interest becomes less than a predetermined threshold value.

For example, determining the set of frames may include determining the set of frames to automatically follow a focus of expansion points of the obtained wide-angled, panoramic video data, by the smoothed camera path.

For instance, determining the set of frames may include determining the set of frames to automatically change direction of the smoothed camera path when a distance to at least one region of interest becomes less than a predetermined threshold value.

For example, concurrent display of a preview of the wide-angled, panoramic video and a preview of the hyperlapse results may be initiated.

For instance, user input that includes at least one user-selected identification of an object that is indicated as an interesting object may be obtained.

According to another aspect, hyperlapse results are generated from wide-angled, panoramic video. A set of wide-angled, panoramic video data is obtained. Video stabilization is performed on the obtained set of wide-angled, panoramic video data. Without user intervention, a smoothed camera path is automatically determined using at least one region of interest, and/or determined using saliency detection and semantically segmented frames of stabilized video data resulting from the video stabilization. A set of frames is determined to vary the velocity of wide-angled, panoramic rendered display of the hyperlapse results.

For example, the at least one region of interest may be determined based on semantic information.

For instance, a set of selected camera parameter values may be obtained from a user interface.

For example, the set of selected camera parameter values may include at least one of a frame velocity value, or a field of view parameter value.

For instance, a set of selected objects of interest may be obtained from a user interface that includes at least one user-selected identification of an object that is indicated as an interesting object.

For example, the interesting object may include at least one of a person, a landmark, or a building.

In some examples, determining the smoothed camera path may include determining the smoothed camera path using at least one region of interest and at least one focus of expansion.

For example, determining the set of frames may include determining the set of frames to automatically follow a focus of expansion point of the obtained wide-angled, panoramic video data, by the smoothed camera path.

For example, determining the set of frames may include determining the set of frames to automatically change direction of the smoothed camera path when a distance to at least one region of interest becomes less than a predetermined threshold value.

According to another aspect, a system may include at least one hardware device processor, and a memory storing executable instructions that, when executed, cause one or more of the at least one hardware device processor to generate hyperlapse results from wide-angled, panoramic video. A stabilized set of wide-angled, panoramic video data is obtained. A camera path is determined by smoothing the obtained stabilized set of wide-angled, panoramic video data, using at least one region of interest and at least one focus of expansion. A set of frames is determined to vary the frame speed of rendered display of the hyperlapse results based on semantic information associated with the set of frames. A display is initiated by initiating a wide-angled, panoramic rendering of the hyperlapse results on a display device.

For example, the wide-angled, panoramic rendering of the hyperlapse results on a display device comprises rendering a preview of the hyperlapse results concurrently with the set of panoramic video data.

According to another aspect, a method may comprise obtaining panoramic video and automatically generating hyperlapse results from the panoramic video. The hyperlapse results include a path along points of interest within the panoramic video and a frame velocity along the path slows when approaching the points of interest along the path and speeds up upon passing the points of interest.

For instance, the automatically generating comprises identifying the path and then determining the frame velocity based upon the path, or where the automatically generating comprises determining the frame velocity and then identifying the path, or where the automatically generating comprises simultaneously determining the path and the frame velocity.

One skilled in the art of computing will appreciate that many other types of techniques may be used for controlling generation of hyperlapse from wide-angled, panoramic (e.g., 360-degree) video, without departing from the discussion herein.

Features discussed herein are provided as example techniques that may be implemented in many different ways that may be understood by one skilled in the art of computing, without departing from the discussion herein. Such features are to be construed only as example features, and are not intended to be construed as limiting to only those detailed descriptions.

For example, the one or more processors may be included in at least one processing apparatus. One skilled in the art of computing will understand that there are many configurations of processors and processing apparatuses that may be configured in accordance with the discussion herein, without departing from such discussion.

In this context, a "component" or "module" may refer to instructions or hardware that may be configured to perform certain operations. Such instructions may be included within component groups of instructions, or may be distributed over more than one group. For example, some instructions associated with operations of a first component may be included in a group of instructions associated with operations of a second component (or more components). For example, a "component" herein may refer to a type of functionality that may be implemented by instructions that may be located in a single entity, or may be spread or distributed over multiple entities, and may overlap with instructions and/or hardware associated with other components.

In this context, a "memory" may include a single memory device or multiple memory devices configured to store data and/or instructions. Further, the memory may span multiple distributed storage devices. Further still, the memory may be distributed among a plurality of processors.

One skilled in the art of computing will understand that there may be many ways of accomplishing the features discussed herein.

Customer privacy and confidentiality have been ongoing considerations in computing environments for many years. Thus, example techniques for controlling generation of hyperlapse from 360-degree video may use user input and/or data provided by users who have provided permission via one or more subscription agreements (e.g., "Terms of Service" (TOS) agreements) with associated applications or services associated with such techniques. For example, users may provide consent to have their input/data transmitted and stored on devices, though it may be explicitly indicated (e.g., via a user accepted agreement) that each party may control how transmission and/or storage occurs, and what level or duration of storage may be maintained, if any. Further, identifiers that may be used to identify devices used by a user may be obfuscated, e.g., by hashing actual user information. It is to be understood that any user input/data may be obtained in accordance with the privacy laws and regulations of any relevant jurisdiction.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A system comprising:
   at least one hardware device processor; and
   a memory storing executable instructions that, when executed, cause one or more of the at least one hardware device processor to generate a hyperlapse video by:
   creating an immersive video from an obtained set of panoramic video data;
   performing video stabilization on frames of the immersive video to smooth motion between the frames;
   automatically determining a camera path for the immersive video, the camera path defining a viewpoint direction for individual frames of the immersive video, wherein the viewpoint direction is changed to follow at least one region of interest in the frames;
   determining a set of frames to accelerate frame speed of the hyperlapse video; and
   automatically generating the hyperlapse video from the immersive video that presents a view using the viewpoint direction along the determined camera path, the hyperlapse video slowing frame speed of the hyperlapse video upon approaching the at least one region of interest along the camera path and accelerating the frame speed upon passing the at least one region of interest along the camera path.

2. The system of claim 1, wherein determining the camera path includes:
   determining the camera path using the at least one region of interest and at least one focus of expansion,
   wherein the at least one region of interest is determined using saliency detection.

3. The system of claim 1, wherein determining the camera path includes:
   determining the camera path by minimizing a cost function that includes a term that enforces following regions of interest, by the camera path.

4. The system of claim 1, wherein determining the set of frames includes:
   determining the set of frames to automatically reduce velocity of the hyperlapse video, by the camera path, when a distance to the at least one region of interest becomes less than a predetermined threshold value.

5. The system of claim 1, wherein determining the set of frames includes:
   determining the set of frames to automatically follow a focus of expansion point of the obtained set of panoramic video data, by the camera path.

6. The system of claim 5, wherein determining the set of frames includes:
   determining the set of frames to automatically change the viewpoint direction of the camera path when a distance to the at least one region of interest becomes less than a predetermined threshold value.

7. The system of claim 1, wherein the executable instructions, when executed, cause the one or more of the at least one hardware device processor to:
   initiate concurrent display on a graphical user interface of a preview of the immersive video and a preview of the hyperlapse video.

8. The system of claim 1, wherein the executable instructions, when executed, cause the one or more of the at least one hardware device processor to:
   obtain user input that includes at least one user-selected identification of an object that is indicated as an interesting object.

9. A method comprising:
   obtaining a set of panoramic video data;
   stabilizing the set of panoramic video data to smooth motion between frames of the panoramic video data;
   detecting regions of interest in frames of the stabilized set of panoramic video data;
   automatically determining a camera path using at least one of the regions of interest, the camera path defining a viewpoint direction for individual frames of the panoramic video data, wherein the viewpoint direction is changed to follow the at least one of the regions of interest in the frames; and
   automatically generating a hyperlapse video from the panoramic video data that presents a view of the panoramic video data using the viewpoint direction of the camera path, the hyperlapse video emphasizing a set of frames along the camera path containing the at least one of the regions of interest by modifying the view according to the defined viewpoint direction and by varying a velocity for the set of frames.

10. The method of claim 9, further comprising:
    determining the at least one of the regions of interest based on semantic information.

11. The method of claim 9, further comprising:
    obtaining a set of selected camera parameter values from a user interface.

12. The method of claim 11, wherein:
    the set of selected camera parameter values includes at least one of:
    a frame velocity value, or
    a field of view parameter value.

13. The method of claim 9, further comprising:
    obtaining a set of selected objects of interest from a user interface that includes at least one user-selected identification of an object that is indicated as an interesting object.

14. The method of claim 13, wherein:
    the interesting object includes at least one of:
    a person,
    a landmark, or
    a building.

15. The method of claim 9, wherein determining the camera path includes:
    determining the camera path using the at least one of the regions of interest and at least one focus of expansion.

16. The method of claim 9, further comprising determining a set of frames to automatically follow a focus of expansion point of the obtained set of panoramic video data, by the camera path.

17. The method of claim 16, further comprising determining a set of frames to automatically change the viewpoint direction of the camera path when a distance to the at least one of the regions of interest becomes less than a predetermined threshold value.

* * * * *